(12) United States Patent
Muhanna et al.

(10) Patent No.: US 10,873,464 B2
(45) Date of Patent: Dec. 22, 2020

(54) AUTHENTICATION MECHANISM FOR 5G TECHNOLOGIES

(71) Applicant: Futurewei Technologies, Inc., Plano, TX (US)

(72) Inventors: Ahmad Shawky Muhanna, Richardson, TX (US); Marcus Wong, Green Brook, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 371 days.

(21) Appl. No.: 15/670,964

(22) Filed: Aug. 7, 2017

(65) Prior Publication Data

US 2018/0013568 A1    Jan. 11, 2018

Related U.S. Application Data

(63) Continuation-in-part of application No. 15/453,776, filed on Mar. 8, 2017, now Pat. No. 10,382,206.
(Continued)

(51) Int. Cl.
*H04L 9/32* (2006.01)
*H04W 12/06* (2009.01)
(Continued)

(52) U.S. Cl.
CPC .......... *H04L 9/3242* (2013.01); *H04L 9/0822* (2013.01); *H04L 9/0825* (2013.01);
(Continued)

(58) Field of Classification Search
CPC ... H04L 9/3242; H04L 9/0825; H04L 9/0822; H04L 9/14; H04L 63/045; H04L 63/0428;
(Continued)

(56) References Cited

U.S. PATENT DOCUMENTS

| | | | |
|---|---|---|---|
| 6,373,949 B1 * | 4/2002 | Aura | H04W 12/02 380/247 |
| 8,861,732 B2 | 10/2014 | Suh et al. | |

(Continued)

FOREIGN PATENT DOCUMENTS

| | | |
|---|---|---|
| CN | 1767429 A | 5/2006 |
| CN | 101039180 A | 9/2007 |

(Continued)

OTHER PUBLICATIONS

Ginzboorg, et al., "Privacy of the long-term identitites in cellular networks", Jun. 18-20, 2016, IW5GS 2016, p. 167-175.
(Continued)

*Primary Examiner* — Christopher A Revak
(74) *Attorney, Agent, or Firm* — Slater Matsil, LLP

(57) ABSTRACT

Embodiments of this disclosure provide techniques for securely communicating an IMSI over the air from a UE to an SeAN, as well as for securely validating an unencrypted IMSI that the SeAN receives from the home network, during authentication protocols. In particular, the UE may either encrypt the IMSI assigned to the UE using an IMSI encryption key ($K_{IMSIenc}$) or compute a hash of the IMSI assigned to the UE using an IMSI integrity key ($K_{IMSIint}$), and then send the encrypted IMSI or the hash of the IMSI to the serving network. The encrypted IMSI or hash of the encrypted IMSI may then be used by the SeAN to validate an unencrypted IMSI that was previously received from an HSS in the home network of the UE.

27 Claims, 49 Drawing Sheets

Related U.S. Application Data

(60) Provisional application No. 62/463,521, filed on Feb. 24, 2017, provisional application No. 62/414,488, filed on Oct. 28, 2016, provisional application No. 62/306,550, filed on Mar. 10, 2016, provisional application No. 62/317,295, filed on Apr. 1, 2016, provisional application No. 62/383,223, filed on Sep. 2, 2016, provisional application No. 62/399,069, filed on Sep. 23, 2016, provisional application No. 62/399,055, filed on Sep. 23, 2016.

(51) Int. Cl.
| | |
|---|---|
| *H04L 29/06* | (2006.01) |
| *H04L 9/14* | (2006.01) |
| *H04L 9/08* | (2006.01) |
| *H04W 8/18* | (2009.01) |
| *H04L 9/00* | (2006.01) |
| *H04W 12/10* | (2009.01) |
| *H04W 12/00* | (2009.01) |

(52) U.S. Cl.
CPC .............. *H04L 9/14* (2013.01); *H04L 63/045* (2013.01); *H04L 63/0428* (2013.01); *H04W 12/06* (2013.01); *H04L 9/006* (2013.01); *H04L 2209/80* (2013.01); *H04W 8/18* (2013.01); *H04W 12/00514* (2019.01); *H04W 12/10* (2013.01)

(58) Field of Classification Search
CPC ...... H04L 2209/80; H04L 9/00; H04W 12/06; H04W 12/00514; H04W 12/10; H04W 8/18

See application file for complete search history.

(56) References Cited

U.S. PATENT DOCUMENTS

| | | | |
|---|---|---|---|
| 9,037,112 B2 | 5/2015 | Rajadurai et al. | |
| 9,055,437 B2 | 6/2015 | Kurokawa et al. | |
| 9,504,011 B1 | 11/2016 | Batchu et al. | |
| 10,111,089 B2 | 10/2018 | Park et al. | |
| 10,382,206 B2 * | 8/2019 | Muhanna | H04L 9/30 |
| 2006/0171536 A1 | 8/2006 | Lim | |
| 2007/0264997 A1 | 11/2007 | Chaudhary et al. | |
| 2010/0228967 A1 | 9/2010 | Hahn et al. | |
| 2012/0170745 A1 * | 7/2012 | Bai | H04L 9/0866 380/270 |
| 2013/0163762 A1 | 6/2013 | Zhang et al. | |
| 2013/0170643 A1 | 7/2013 | Xiao et al. | |
| 2013/0178191 A1 * | 7/2013 | Hwang | H04W 12/06 455/411 |
| 2013/0227663 A1 | 8/2013 | Cadenas Gonzalez | |
| 2014/0237559 A1 | 8/2014 | Zhang et al. | |
| 2014/0298433 A1 | 10/2014 | McLaughlin et al. | |
| 2015/0359026 A1 | 12/2015 | Iwai et al. | |
| 2016/0005042 A1 | 1/2016 | Tervo et al. | |
| 2016/0205550 A1 * | 7/2016 | Rajadurai | H04W 4/90 455/411 |
| 2016/0210612 A1 | 7/2016 | Tervo et al. | |
| 2016/0255504 A1 * | 9/2016 | Marsden | H04W 4/70 713/168 |
| 2016/0294783 A1 * | 10/2016 | Piqueras Jover | H04L 63/0442 |
| 2017/0064586 A1 | 3/2017 | Sharma | |
| 2018/0013568 A1 | 1/2018 | Muhanna et al. | |
| 2018/0063135 A1 | 3/2018 | Hahn et al. | |
| 2018/0331830 A1 * | 11/2018 | Jerichow | H04L 9/3073 |
| 2019/0007376 A1 * | 1/2019 | Norrman | H04L 9/0643 |
| 2019/0238347 A1 * | 8/2019 | Martineau | H04L 9/0822 |

FOREIGN PATENT DOCUMENTS

| | | | |
|---|---|---|---|
| CN | 101336000 A | 12/2008 | |
| CN | 101511082 A | 8/2009 | |
| CN | 101938741 A | 1/2011 | |
| CN | 102026178 A | 4/2011 | |
| CN | 102036242 A | 4/2011 | |
| CN | 102905266 A | 1/2013 | |
| CN | 103974248 A | 8/2014 | |
| CN | 104754581 A | 7/2015 | |
| CN | 105306406 A | 2/2016 | |
| EP | 2317694 B1 | 5/2019 | |
| JP | 2006211687 A | 8/2006 | |
| JP | 2008177998 A | 7/2008 | |
| JP | 2013537374 A | 9/2013 | |
| JP | 2014099727 A | 5/2014 | |
| JP | 2016504776 A | 2/2016 | |
| WO | 9849856 A2 | 11/1998 | |
| WO | 2011121713 A1 | 10/2011 | |
| WO | 2014097517 A1 | 6/2014 | |
| WO | WO 2016/209126 A1 * | 12/2016 | H04W 12/02 |

OTHER PUBLICATIONS

Huerta-Canepa, et al., "An Encryption Scheme Based on Trust for Device-to-Device Communication on 5G", 2015, IEEE, p. 360-362.

NEC Corporation, "Relay authentication and secure channel," 3GPP TSG-SA3 (Security), S3-101075, SA3#Ad Hoc, Sep. 27-29, 2010, Riga, Latvia, 6 pages.

3rd Generation Partnership Project; Technical Specification Group Services and System Aspects; Rationale and track of security decisions in Long Term Evolved (LTE) RAN / 3GPP System Architecture Evolution (SAE) (Release 8), 3GPP TR 33.821, V0.7. 0, Feb. 2008, 122 pages.

3GPP TS 33.401 V13.1.0 (Dec. 2015); 3rd Generation Partnership Project; Technical Specification Group Services and System Aspects; 3GPP System Architecture Evolution (SAE); Security architecture(Release 13),135 pages.

Huawei et al., "A clarification for 4G USIM term in solution 2.12", 3GPP TSG SA WG3 (Security) Meeting #86 S3-170429-was 170041, Feb. 6-10, 2017, 3 pages, Sophia-Antipolis (France).

Huawei et al., "Removing EN on More sophisticated replay protection in solution 2.12", 3GPP TSG SA WG3 (Security) Meeting #86 S3-170431 was 170046, Feb. 6-10, 2017, 2 pages, Sophia-Antipolis (France).

Nokia, "pCR on evaluation of solution 2.12 (MASA)", 3GPP TSG SA WG3 (Security) Meeting #86 S3-170433, Feb. 6-10, 2017, 4 pages, Sophia Antipolis (France).

Huawei et al., "MASA Update",3GPP TSG SA WG3 (Security) Meeting #87 S3-171193, May 15-19, 2017, 12 Pages, Ljubljana, Slovenia.

"3rd Generation Partnership Project; Technical Specification Group Services and System Aspects; 3GPP System Architecture Evolution (SAE); Security architecture (Release 13)," 3GPP TS 33.401 V13. 0.0, Sep. 2015, 131 pgs.

"3rd Generation Partnership Project; Technical Specification Group Services and System Aspects; 3G Security; Security architecture (Release 13)," 3GPP TS 33.102 V13.0.0, Jan. 2016, 76 pgs.

* cited by examiner

AUTHENTICATION MECHANISM FOR 5G TECHNOLOGIES

This application claims priority to both U.S. Provisional Application 62/463,521 filed on Feb. 24, 2017 and U.S. Provisional Application 62/414,488 filed on Oct. 28, 2016, as well as is a continuation-in-part of U.S. Non-Provisional application Ser. No. 15/453,776 filed on Mar. 8, 2017, which claims priority to each of U.S. Provisional Application 62/306,550 filed on Mar. 10, 2016, U.S. Provisional Application 62/317,295 filed on Apr. 1, 2016, U.S. Provisional Application 62/383,223 filed on Sep. 2, 2016, U.S. Provisional Application 62/399,069 filed on Sep. 23, 2016, and U.S. Provisional Application 62/399,055 filed on Sep. 23, 2016, all of which are incorporated by reference herein as if reproduced in their entireties.

TECHNICAL FIELD

The present disclosure relates generally to wireless telecommunications, and, in particular embodiments, to a system and method for authentication mechanisms for 5G technologies while providing privacy to subscriber and UE permanent identifiers.

BACKGROUND

Modern wireless networks typically include various security features to prevent unauthorized third parties from access and/or manipulating data. In particular, long term evolution (LTE) networks provide three basic security features, namely: LTE authentication, non-access stratum (NAS) security, and access stratum (AS) security. The LTE authentication feature ensures that a user is an authorized subscriber to the network (or network service) that the user is attempting to access, while the NAS security and AS security features ensure that control and user data communicated over a radio access network (RAN) is secure at the NAS and AS levels, respectively.

SUMMARY

Technical advantages are generally achieved, by embodiments of this disclosure which describe authentication mechanisms for 5G technologies.

In accordance with an embodiment, a method for secure authentication is provided. In this example, the method includes generating a first integrity key based at least on a pre-provisioned key (K key) of the UE and a first random number (RAND1), and generating a message authentication code (MAC) signature by computing a hash function of UE specific information using the first integrity key. The UE specific information includes at least an International Mobile Subscriber Identity (IMSI) of the UE and the RAND1. The method further includes encrypting the UE specific information and the MAC signature using a public key to form an encrypted portion, and sending an initial authentication request message to a base station in a serving network. The initial authentication request message carrying the encrypted portion and an unencrypted network identifier. An apparatus for performing this method is also provided.

In accordance with another embodiment, another method for secure authentication is provided. In this example, the method includes receiving a user authentication information request message from a mobility management entity (MME) in a serving network that includes a home network identifier (HID) and an encrypted portion, and decrypting the encrypted portion using a home network private key associated with the HID to obtain user equipment (UE) specific information and a first Message authentication code (MAC) signature. The UE specific information includes at least an International Mobile Subscriber Identity (IMSI) of the UE and a first random number (RAND1). The method further includes obtaining a first integrity key based on the IMSI of the UE and the RAND1, and verifying the integrity of the user authentication information request message. Verifying the integrity of the user authentication information request message comprises generating a second MAC signature by computing a hash function of UE specific information using the first integrity key, and comparing the second MAC signature with the first MAC signature to determine whether the UE specific information originated from the UE. An apparatus for performing this method is also provided.

In accordance with yet another embodiment, yet another method for secure authentication is provided. In this example, the method includes generating a first encryption key based on a pre-provisioned key of the UE and a first random number (RAND1), encrypting at least an International Mobile Subscriber Identity (IMSI) of the UE and the RAND1 using the first encryption key to form an encrypted inner portion, encrypting at least the inner portion, the RAND1, and the IMSI using a public key to form an encrypted outer portion, and sending an initial authentication request message to a base station in a serving network. The initial authentication request message carries the encrypted outer portion and an unencrypted network identifier. An apparatus for performing this method is also provided.

In accordance with yet another embodiment, yet another method for secure authentication is provided. In this example, the method includes receiving an initial authentication request message from a user equipment (UE) that includes an encrypted outer portion and an unencrypted network identifier, decrypting the encrypted outer portion using a private key associated with the serving network to obtain an International Mobile Subscriber Identity (IMSI) of the UE, a first random number (RAND1), and an encrypted inner-portion, and sending an authentication and data request message to a home subscriber server (HSS) in a home network of the UE. The authentication and data request message includes at least the IMSI, RAND1, and the encrypted inner portion. An apparatus for performing this method is also provided.

According to one aspect of the present disclosure, there is provided a method for secure authentication that includes sending, an encrypted International Mobile Subscriber Identity (IMSI) or a hash of the IMSI to a base station in a serving network, the encrypted IMSI or the hash of the IMSI having been generated using an IMSI encryption key ($K_{IMSIenc}$) or an IMSI integrity key ($K_{IMSIint}$) associated with a serving network. In one example, the method of claim further includes computing a response parameter (RES) based on a pre-provisioned key (K_key) associated with the UE and a random number (RAND), and sending the RES to the base station in the serving network. Optionally, in any one of the above mentioned examples, or another example, the $K_{IMSIenc}$ or the $K_{IMSIint}$ is a NAS encryption or integrity key. Optionally, in any one of the above mentioned examples, or another example, the $K_{IMSIenc}$ or the $K_{IMSIint}$ is derived based on an NG-$K_{ASME}$.

Optionally, in any one of the above mentioned examples, or another example, the $K_{IMSIenc}$ or the $K_{IMSIint}$ is an IAS encryption or integrity key ($K_{IASenc}$). Optionally, in any one of the above mentioned examples, or another example the $K_{IMSIenc}$ or the $K_{IMSIint}$ is derived based on pre-provisioned key ("k-key") assigned to the UE, a COUNTER received from the base station, and a random number received from the base station.

Optionally, in any one of the above mentioned examples, or another example, the $K_{IMSIenc}$ or the $K_{IMSIint}$ is a serving network public key (SPuK). Optionally, in any one of the above mentioned examples, or another example, the encrypted IMSI or the Hash of the IMSI is sent to the base station in an initial authentication response (IAS) message or a user authentication request message.

According to one aspect of the present disclosure, there is provided a method for secure authentication that includes receiving an unencrypted International Mobile Subscriber Identity (IMSI) from a home subscriber server (HSS) in a home network of a user equipment (UE), receiving, by the SeAN, an encrypted IMSI or a hash of an IMSI from the UE, and validating the unencrypted IMSI received from the HSS in accordance with either the unencrypted IMSI received from the UE and an IMSI encryption key ($K_{IMSIenc}$) or the hash of the IMSI received from the UE and an IMSI integrity key ($K_{IMSIint}$). In one example, validating the unencrypted IMSI received from the HSS comprises decrypting the encrypted IMSI received from the UE using the $K_{IMSIenc}$ to obtain a decrypted IMSI, and validating the unencrypted IMSI received from the HSS when the unencrypted IMSI matches the decrypted IMSI. In another example, validating the unencrypted IMSI received from the HSS comprises computing a hash of the unencrypted IMSI received from the HSS using the $K_{IMSIint}$, and validating the unencrypted IMSI received from the HSS when the computed hash of the unencrypted IMSI matches the hash of the IMSI received from the UE. Optionally, in any one of the above mentioned examples, or another example, the $K_{IMSIenc}$ or the $K_{IMSIint}$ is a NAS encryption or integrity key. Optionally, in any one of the above mentioned examples, or another example, the $K_{IMSIenc}$ or the $K_{IMSIint}$ is derived based on an NG-$K_{ASME}$. Optionally, in any one of the above mentioned examples, or another example, the $K_{IMSIenc}$ or the $K_{IMSIint}$ is an IAS encryption or integrity key ($K_{IASenc}$). Optionally, in any one of the above mentioned examples, or another example, the $K_{IMSIenc}$ or the $K_{IMSIint}$ is a serving network private key (SPuK).

According to one aspect of the present disclosure, there is provided a method for secure authentication that includes encrypting an International Mobile Subscriber Identity (IMSI) of the UE using home network public key (HPuK) associated with a home network of the UE to obtain an HPuK-encrypted IMSI, sending a first initial authentication request (IAR) message carrying the HPuK-encrypted IMSI to a Security Anchor Node (SeAN) in a serving network, and receiving an initial authentication response (IAS) message from the SeAN, the IAS message including an IAR message resend flag. In response to identifying the IAR message resend flag in the IAS message, the method further includes encrypting, or otherwise computing a hash of, the IMSI using an serving network public key (SPuK) to obtain an $K_{IMSIenc}$-encrypted IMSI or an $K_{IMSIint}$-signed hash of the IMSI, and sending a second IAR message that includes the $K_{IMSIenc}$-encrypted IMSI or the $K_{IMSIint}$-signed hash of the IMSI to the SeAN. In one example, the IAR resend flag instructs the UE to send IMSI encrypted using the SN SPuK in the Security and Authentication Complete message.

According to one aspect of the present disclosure, there is provided a method for secure authentication that includes sending an attach request message to a Security Anchor Node (SeAN) in a serving network that requests access to the serving network, receiving an attach reject message indicating that the attach request has been rejected by the SeAN and carrying a message authentication code (MAC) signature, attempting to validate the received attach reject message by processing the MAC signature carried by the received attach reject message according to a serving network public key (SPuK) assigned to the serving network, and ignoring the received attach reject message upon determining that the attach reject message is invalid.

In one example, the SPuK belongs to a public-private key pair associated with the serving network, and the signed attach reject message can only be successfully validated using the SPuk when the underlying attach reject message was signed using a serving network private key (SPrK) of the public-private key pair. Optionally, in any one of the above mentioned examples, or another example, the method further includes setting a back-off timer according to the attach reject message upon determining that the attempt to validate the attach reject message signature using the SPuK is successful, where the UE is unable to initiate mobility management signaling prior to expiration of the back-off timer. Optionally, in any one of the above mentioned examples, or another example, attempting to validate the integrity of the received attach reject message by processing the MAC signature carried by the received attach reject message according to the SPuK comprises generating a separate MAC signature by computing a hash function of information carried by the attach reject message according to the SPuK, and comparing the MAC signature generated by the UE with the MAC signature carried by the attach reject message. Optionally, in any one of the above mentioned examples, or another example, the method further comprises receiving a system information message from the SeAN carrying its own a MAC signature, attempting to validate the integrity of the received system information message by processing the MAC signature carried by the received system information message according to the SPuK, and ignoring the received system information message upon determining that the system information message is invalid.

According to one aspect of the present disclosure, there is provided a method for secure authentication that includes encrypting an International Mobile Subscriber Identity (IMSI) using a home network public key (HPuK) associated with a home network of the UE, sending an initial authentication request (IAR) message carrying the encrypted IMSI to a Security Anchor Node (SeAN) in a serving network. The encrypted IMSI is relayed from the SeAN to a home subscriber server (HSS) without being decrypted. The method further includes receiving an initial authentication response (IAS) message carrying a home network temporary identifier (Home-Temp-ID) from the SeAN, where the Home-Temp-ID was assigned to the UE by the HSS, and sending a subsequent attach message carrying the Home-Temp-ID to the SeAN. In one example, the IAS message further includes a Home-UE-Security-Policy assigned to the UE by the HSS. The Home-UE-Security-Policy indicates how often non-access stratum (NAS) or access stratum (AS) security keys should be updated.

According to one aspect of the present disclosure, there is provided a method for secure authentication that includes sending a first authentication message carrying UE-specific network access stratum (NAS) security capabilities of the UE to a Security Anchor Node (SeAN) in a serving network, receiving a second authentication message from the SeAN carrying NAS layer encryption algorithm supported by the SeAN according to at least the UE-specific NAS security capabilities included in the first authentication message. In one example, the UE-specific NAS security capabilities include a NAS encryption algorithm, a NAS integrity protection algorithm, an RRC encryption algorithm, an RRC integrity algorithm, a user plane encryption algorithm, a user plane integrity algorithm, an IMSI concealment algorithm, or combinations thereof.

According to one aspect of the present disclosure, there is provided a method for secure authentication that include receiving a first authentication message carrying serving network specific (SN-specific) network access stratum (NAS) security capabilities of a serving network from a Security Anchor Node (SeAN) in the serving network, generating NAS layer encryption keys according to the SN-specific NAS security capabilities, and sending a second protected authentication using the NAS layer encryption and integrity keys to the SeAN.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
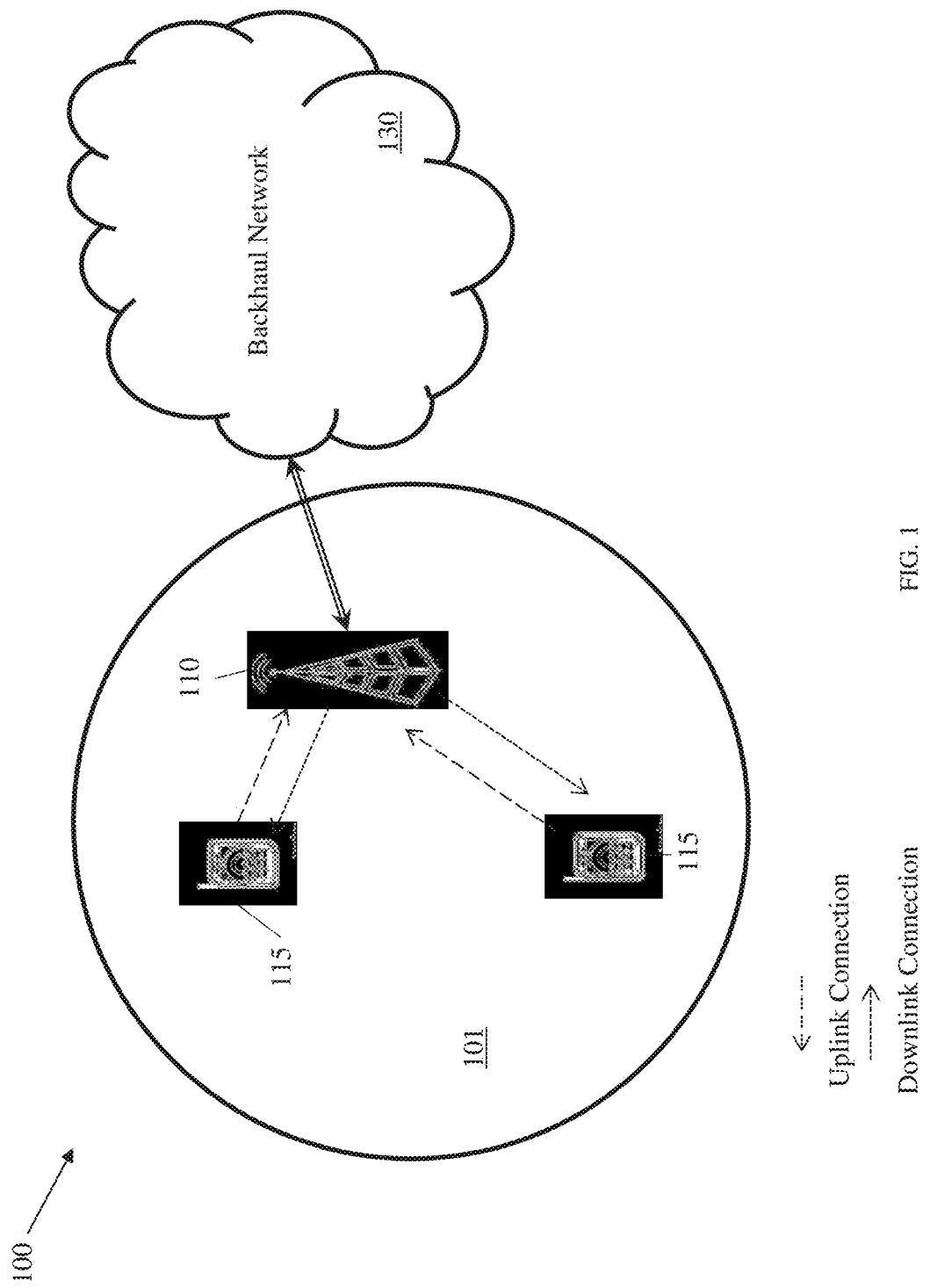
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While the inventive aspects are described primarily in the context of 5G wireless networks, it should also be appreciated that those inventive aspects may also be applicable to 4G and 3G wireless networks.

The LTE authentication and NAS security protocols are usually performed sequentially, during which time mutual authentication is established between the UE and the serving network and NAS layer encryption keys are generated. In particular, a UE sends an International Mobile Subscriber Identity (IMSI) to a mobility management entity (MME) in a serving network. The MME then sends the IMSI to a home subscriber server (HSS) in a home network of the UE, which generates Evolved Packet System (EPS) authentication vectors. The EPS authentication vectors are then communicated to the MME, where they are used to authenticate the UE and generate NAS layer encryption keys in accordance with an authentication and key agreement (AKA) procedure. Thereafter, the NAS layer encryption keys are used to encrypt signaling exchanged between the UE and the MME.

When using conventional LTE authentication protocols, an unencrypted IMSI is communicated from the UE to the access point. This creates a potential security vulnerability because the IMSI is private information that can be exploited by malicious third parties to engage in unauthorized activities, such as tracking the UE and/or engaging denial of service attacks. Accordingly, techniques for securely communicating the IMSI during LTE authentication are desired.

Embodiments of this disclosure provide techniques for securely communicating an IMSI over the air from a UE to an SeAN, as well as for securely validating an unencrypted IMSI that the SeAN receives from the home network, during authentication protocols. In particular, the UE may either encrypt the IMSI assigned to the UE using an IMSI encryption key ($K_{IMSIenc}$) or compute a hash of the IMSI assigned to the UE using an IMSI integrity key ($K_{IMSIint}$), and then send the encrypted IMSI or the hash of the IMSI to the serving network. The encrypted IMSI or hash of the encrypted IMSI may then be used by the SeAN to validate an unencrypted IMSI that was previously received from an HSS in the home network of the UE. These and other aspects are explained in greater detail below.

Aspects of this disclosure provide embodiment mutual authentication and security agreement (MASA) protocols that use independently generated integrity and/or encryption keys to securely communicate private information exchanged between UEs and various network-side devices (e.g., base stations, MMEs, HSSs, etc.). In particular, embodiment MASA protocols may use an initial authentication request (IAR) encryption key ($KIAR_{ENC}$) to encrypt UE specific information (e.g., an IMSI, etc.) in an IAR message and/or an initial authentication response (IAS) encryption key ($KIAS_{ENC}$) to encrypt private information in an IAS message. Additionally, embodiment MASA protocols may use an IAR integrity protection key ($KIAR_{INT}$) to verify the integrity of information in an IAR message and/or an IAS integrity protection key ($KIAS_{INT}$) to verify the integrity of information in an IAS message. The $KIAR_{ENC}$, $KIAR_{INT}$, $KIAS_{ENC}$, and/or $KIAS_{INT}$ may be independently computed by the UE and a home subscriber server (HSS) based on, for example, a pre-provisioned key (K-key) of the UE and one or more random numbers (e.g., RAND1, RAND2, UE random number ($RAND_{UE}$), home network random number ($RAND_{HN}$), and/or a COUNTER. Using a COUNTER to compute an instance of a given key may be useful in ensuring that each generated instance of the key differs from previous generated instances of the key, as it is possible that the same random number could be selected to generate different instances of a key, which could constitute a security vulnerability.

Different levels of encryption and/or integrity protection can be achieved depending on the complexity of the embodiment MASA protocol. In one embodiment, a low complexity MASA protocol use integrity keys (e.g., a $KIAR_{INT}$ and/or a $KIAS_{INT}$) to provide integrity protection when communicating IAR and/or IAS messages having a single layer of encryption protection. In particular, a UE may encrypt UE specific information (e.g., an IMSI, random numbers, etc.) using a home network public key (HPuK) to form an encrypted portion, and then generate a media access control (MAC) signature by computing a hash function of the encrypted portion, and potentially additional information (e.g., a random number) in an outer portion of the IAR message, using a $KIAR_{INT}$. The UE may then send an IAR message carrying the encrypted portion and the MAC signature to a base station in a serving network, which may relay the IAR message to an MME. The MME may encapsulate the IAR message into a user authentication data request message, which may then be sent to a home subscriber server (HSS) in the UE's home network. The HSS may independently compute a MAC signature of the contents of the IAR message based on an independently generate integrity key (e.g., the $KIAR_{INT}$), and then compare the independently generated MAC signature with the MAC signature included in the IAR message to verify the integrity of the encrypted portion of the IAR message. A similar procedure can be used to provide integrity protection for the IAS message.

In another embodiment, a higher complexity MASA protocol uses encryption keys (e.g., $KIAR_{ENC}$ and/or $KIAS_{ENC}$) in conjunction with the home network public-private key pair to provide two layers of encryption for the contents of IAR and/or IAS messages. In particular, a UE may use a pre-provisioned key and a first random number (RAND1) to generate an initial authentication request encryption key ($KIAR_{ENC}$). The $KIAR_{ENC}$ is then used to encrypt private information to form an encrypted inner portion of an authentication request message. The private information may include the IMSI of the UE, the RAND1, a second random number (RAND2), UE-Security-Capabilities, and/or a counter. Next, the UE may encrypt the RAND1, the IMSI, and the encrypted inner portion to obtain an encrypted outer portion of the authentication request message. Other information may also be encrypted when generating the encrypted outer portion. The public key used to generate the encrypted outer portion may belong to a private-public-key-pair. In one embodiment, the public key is a home network public key (HPuK). In another embodiment, the public key is a serving network public key (SPuK). Thereafter, the UE may send the authentication request message carrying the encrypted outer portion and an unencrypted network identifier to an MME in the serving network. If the public key used to generate the encrypted outer portion was a SPuK, then the unencrypted network identifier in the authentication request message may be a serving network identifier (SID). In that case, the MME may use a serving network private key to decrypt the encrypted outer portion and obtain the RAND1, the IMSI, and the encrypted inner portion, which may then be forwarded to a home subscriber server (HSS) in a home network of the UE. Alternatively, if the public key used to generate the encrypted outer portion was a HPuK, then the unencrypted network identifier in the authentication request message may be a home network identifier (HID). In that case, the MME would send an authentication and data request carrying the encrypted outer portion, along with the HID, MME security capability identifiers, to the HSS in the home network. The HSS would then decrypt the encrypted outer portion using a home network private key and obtain the RAND1, the IMSI, and the encrypted inner portion.

In both cases, the HSS would then use the RAND1 and a K key associated with the UE to independently generate the $KIAR_{ENC}$, which the HSS would subsequently use to decrypt the encrypted inner portion. The HSS would then verify that IMSI in the decrypted inner portion matched the IMSI in the decrypted outer portion to verify that the encrypted outer portion had not been tampered with by an unauthorized third party. Thereafter, the HSS may verify that the counter in the decrypted inner portion matched a counter maintained by the HSS initial authentication request (IAR) was fresh (i.e., not stale). If the validations were successful, then the HSS may generate an initial authentication response encryption key ($KIAS_{ENC}$) based on the RAND2 and the K key associated with the IMSI. The HSS may also generate one or more authentication vectors. The HSS may then send an initial authorization and data response to the MME that includes the $KIAS_{ENC}$ and the authentication vectors. In some embodiments, the initial authorization and data response includes a UE security capability parameter. The MME may then select one of the authentication vectors, as well as a non-access stratum (NAS) ciphering algorithm. The MME may also assign a temporary network identifier (e.g., a globally unique temporary identifier (GUTI)) to the UE. Thereafter, the MME may encrypt the $KIAS_{ENC}$, the temporary network identifier, and a key set identifier (KSI) associated with the selected NAS ciphering algorithm using the $KIAS_{ENC}$ to obtain encrypted NAS security data. The encrypted NAS security data may include other information as well, such as the counter and the RAND2. The MME may then send an initial authentication and data response to the UE carrying the encrypted NAS security data as well as an unencrypted RAND2. The UE may then independently generate the $KIAS_{ENC}$ based on the RAND2 and the K key. The UE may then generate a ciphering key using the NAS ciphering algorithm associated with the KSI in the decrypted NAS security data. The UE may then return a security authentication complete message to the MME, confirming that the serving network has been authenticated. Encrypting the IMSI, as well as the temporary network ID, in the manner described herein allows that information to be securely exchanged during LTE authentication and NAS security protocols. Additionally, the embodiment procedures described herein reduce the number of messages exchanged between the UE and the base station during LTE authentication and NAS security protocols. These and other details are discussed in greater detail below.

FIG. 1 illustrates a network 100 for communicating data. The network 100 comprises a base station no having a coverage area 101, a plurality of mobile devices 115, and a backhaul network 130. As shown, the base station no establishes uplink (dashed line) and/or downlink (dotted line) connections with the mobile devices 115, which serve to carry data from the mobile devices 115 to the base station no and vice-versa. Data carried over the uplink/downlink connections may include data communicated between the mobile devices 115, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
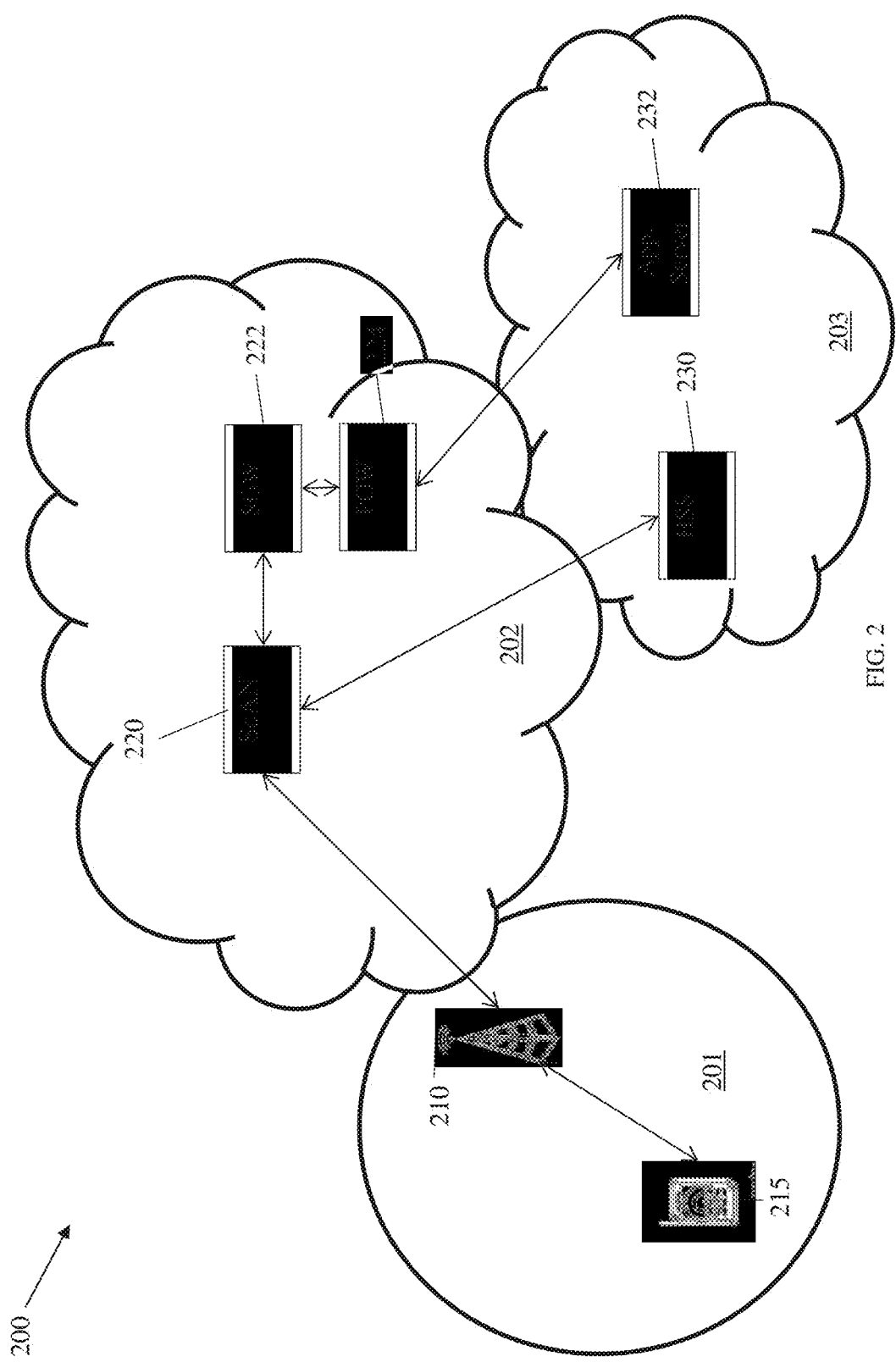
FIG. 2 is a diagram of a 5G network architecture.

FIG. 2 illustrates a network architecture 200 for a 5G LTE wireless network. As shown, the network architecture 200 includes a radio access network (RAN) 201, an evolved packet core (EPC) 202, and a home network 203 of a UE 215 attempting to access the RAN 201. The RAN 201 and the EPC 202 form a serving wireless network. The RAN 201 includes a base station 210, and the EPC 202 includes a Security Anchor Node (SeAN) 220, a serving gateway (SGW) 222, and a packet data network (PDN) gateway (PGW) 224. The SeAN 220 is the termination point in the network for ciphering/integrity protection for NAS signaling and handles the security key management. It should be appreciated that the SeAN 220 may perform similar functions, and have similar responsibilities, as a Mobility Management Entity (MME) and/or a Security Access Function (SeAF), such as providing a control plane function for mobility between LTE and 2G/3G access networks, as well as providing an interface to home networks of roaming UEs. Because of those similarities, the terms "MME," "SeAN," and "SEAF" are used interchangeably throughout this document. The SGW 222 routes and forwards user data packets, while also acting as a mobility anchor for the user plane during handovers. The PGW 224 provides connectivity from UEs to external packet data networks by being the point of exit and entry of traffic for the UEs. The HSS 230 is a central database that contains user-related and subscription-related information.

Figure 3:
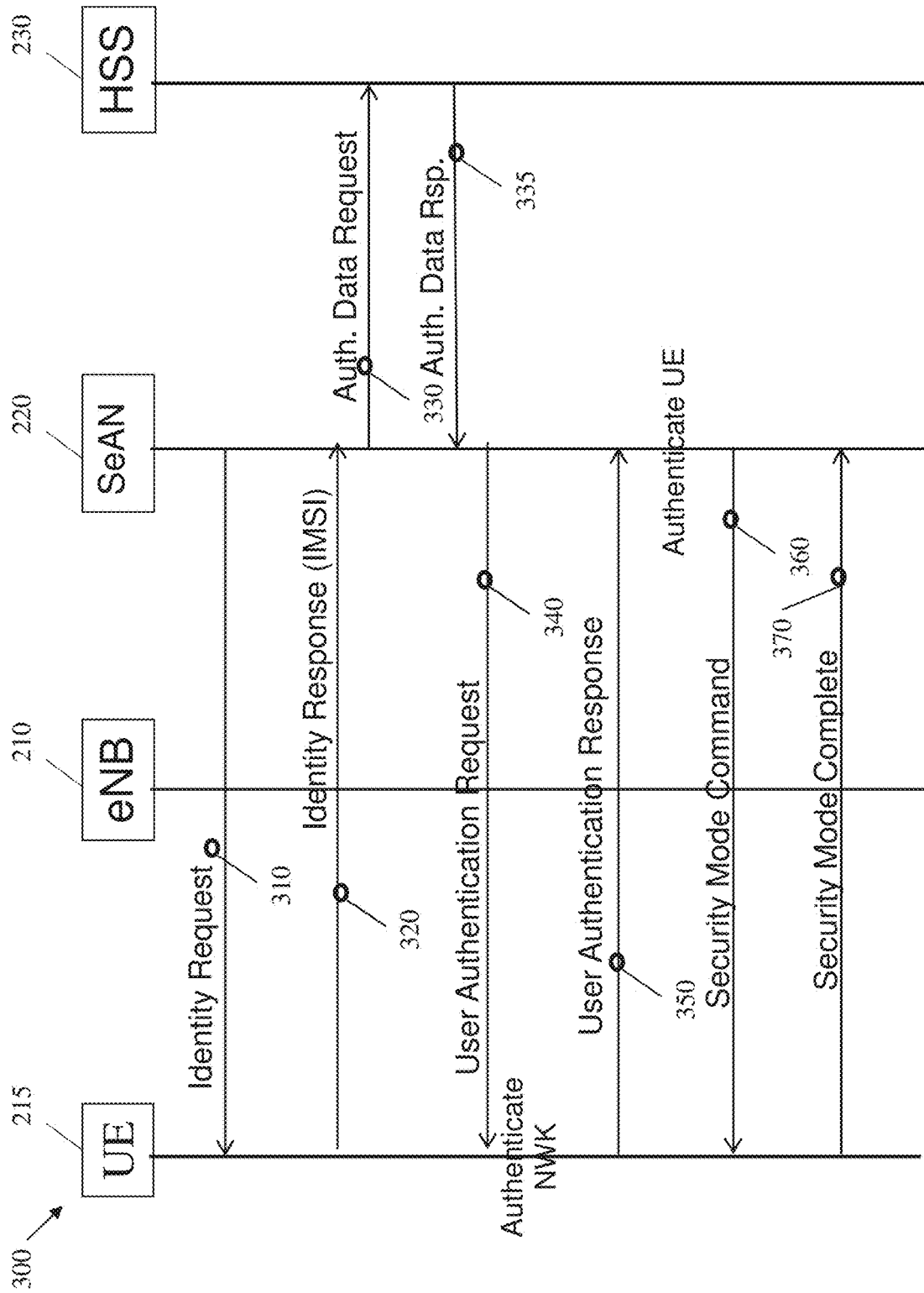
FIG. 3 is a protocol diagram of a conventional communications sequence for authenticating a UE in a wireless network.

Conventional LTE authentication protocols communicate an unencrypted IMSI of the UE over the radio access network, which presents security vulnerability. FIG. 3 illustrates a protocol diagram of a conventional communications sequence 300 for authenticating the UE 215 in a wireless network. As shown, the communications sequence 300 begins when the SeAN 220 communicates an identity request 310 to the UE 215. Next, the UE 215 communicates an identity response 320 to the SeAN 220. The identity response 320 includes an unencrypted IMSI of the UE 215. Thereafter, the SeAN 220 communicates an authorization data request 330 to the HSS 230. The authorization data request 330 may include the IMSI. The HSS 230 then computes EPS authentication vectors, and sends an authorization data response 335 carrying the EPS authentication vectors to the SeAN 220. Subsequently, the SeAN 220 communicates a user authentication request 340 to the UE 215. The user authentication request 340 includes a random number (RAND) and an authentication parameter (AUTN). The UE 215 computes an authentication response (RES) based on the RAND, AUTN, and a secret key. The secret key may be a priori information to the UE 215. For example, the secret key (e.g., a subscriber-specific master key (K)) may be stored in a Universal Subscriber Identity Module (USIM) of the UE 215. The UE 215 may then send a user authentication response 350 carrying the authentication response (or RES) to the SeAN 220.

Thereafter, the SeAN 220 communicates a security mode command message 360 to the UE 215. The security mode command message 360 may indicate an integrity protection algorithm and a ciphering algorithm. The UE 215 may use the integrity protection algorithm to verify the integrity of the security mode command message 360. After verifying the integrity of the security mode command message 360, the UE 215 uses the ciphering algorithm to derive NAS encryption keys. The UE 215 then sends the security mode complete message 370 to the SeAN 220 to verify that the UE 215 validated the security mode command message 360, and derived the NAS encryption keys.

In some instances, a third party may eavesdrop on the communications sequence 300 in an attempt to intercept one or more of the messages 310-370. If the identity response 320 is intercepted, then the third party may use the unencrypted IMSI to perform unauthorized activities, such as to track the UE 215.

Aspects of this disclosure prevent, or at least inhibit, unauthorized third parties from obtaining an IMSI of a UE during LTE authentication by encrypting the IMSI using a public key. The public key may be a part of a public-private key pair such that information encrypted with the public key can only be decrypted with the private key. In one example, the public key is a home network public key, and the encrypted IMSI is decrypted by an HSS in the home network of the UE using a home network private key. In such an example, the home network public key may be a priori information of the UE, e.g., the home network public key may be stored in a USIM of the UE. In another example, the public key is a serving network public key (SPuK), and the encrypted IMSI is decrypted by an SeAN in the serving network using a serving network private key. Other examples are also possible.

Figure 4:
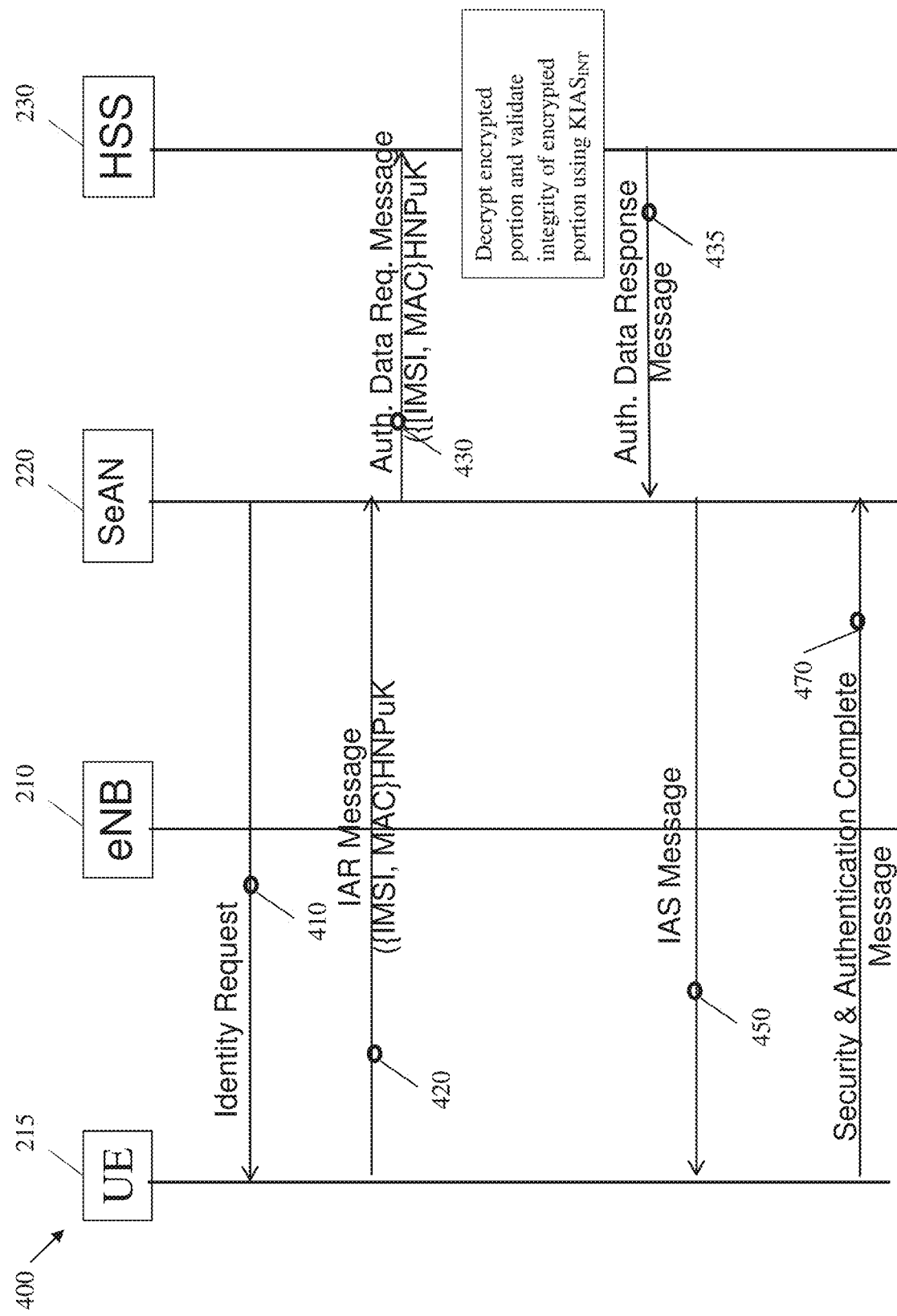
FIG. 4 is a protocol diagram of an embodiment communications sequence for authenticating a UE in a wireless network.

FIG. 4 illustrates a protocol diagram of an embodiment communications sequence 400 for authenticating a UE 215 in a wireless network. As shown, the communications sequence 400 begins when the SeAN 220 communicates an identity request 410 to the UE 215. Upon receiving the identity request 410, the UE 215 generates a MAC signature by computing a hash of UE specific information (e.g., an IMSI, a RAND1, etc.) using a $KIAR_{INT}$, and then encrypts the UE specific information along with the MAC signature using a HPuK to obtain an encrypted portion. The UE 215 sends an initial authentication request (IAR) message 420 carrying the encrypted portion to the base station 210, which relays the IAR message 420 to the SeAN 220. The IAR message 420 may also include a unencrypted home network ID (HID) of the home network of the UE 215.

Upon receiving the IAR message 420, the SeAN 220 may identify the home network of the UE 215 based on the unencrypted HID, and communicate an authentication and data request message 430 to the HSS 230 in the identified home network. Upon receiving the authentication and data request message 430, the HSS 230 may decrypt encrypted portion using a HPrK, and verify the integrity of the encrypted portion based on the MAC signature. In one example, the HSS 230 independently generates a MAC signature by computing a hash of the information in the authentication and data request message 430 using an independently generated integrity key (e.g., a $KIAR_{INT}$), and then compares the independently generated MAC signature with the MAC signature carried by the encrypted portion in the authentication and data request 430. The HSS 230 may also take further steps to validate the encrypted portion. For example, the HSS 230 may verify that a COUNTER in the encrypted portion of the authentication and data request message 430 (e.g., a counter originally in the IAR message 420) exceeds an independent COUNTER maintained by the HSS 230 in order to confirm that the encrypted portion in the authentication and data request message 430 is fresh (e.g., not stale). If the encrypted portion is stale, then it may have been intercepted by a malicious man-in-the-middle entity.

After verifying the integrity of the encrypted portion(s), the HSS 230 may generate authentication vectors based on an EPS-AKA procedure, and send an authentication and data response message 435 carrying the EPS authentication vectors to the SeAN 220. The authentication and data response message 435 may include other information in addition to the EPS authentication vectors, such as integrity/encryption keys (e.g., a $KIAS_{INT}$, $KIAS_{ENC}$, etc.), the IMSI of the UE, a COUNTER, and/or a UE security capabilities. The UE security capabilities may indicate protocol capabilities supported by the UE, such as, for example, NAS ciphering algorithms supported by the UE.

The SeAN 220 may then send an initial authentication response (IAS) message 450 to the UE 215. The IAS message 450 may have various different frame formats, and the contents of the IAS message 450 may vary depending on the frame format being used. In one example, the IAS message 450 includes encrypted NAS security data and a key set identifier (KSI) associated with a NAS ciphering algorithm. The UE 215 may use the NAS ciphering algorithm along with an independently generated encryption key (e.g., a $KIAS_{ENC}$) to decrypt the encrypted NAS security data. After decrypting the encrypted NAS security data, the UE 215 may send a security and authentication complete message 470 to the SeAN 220.

Figure 5:
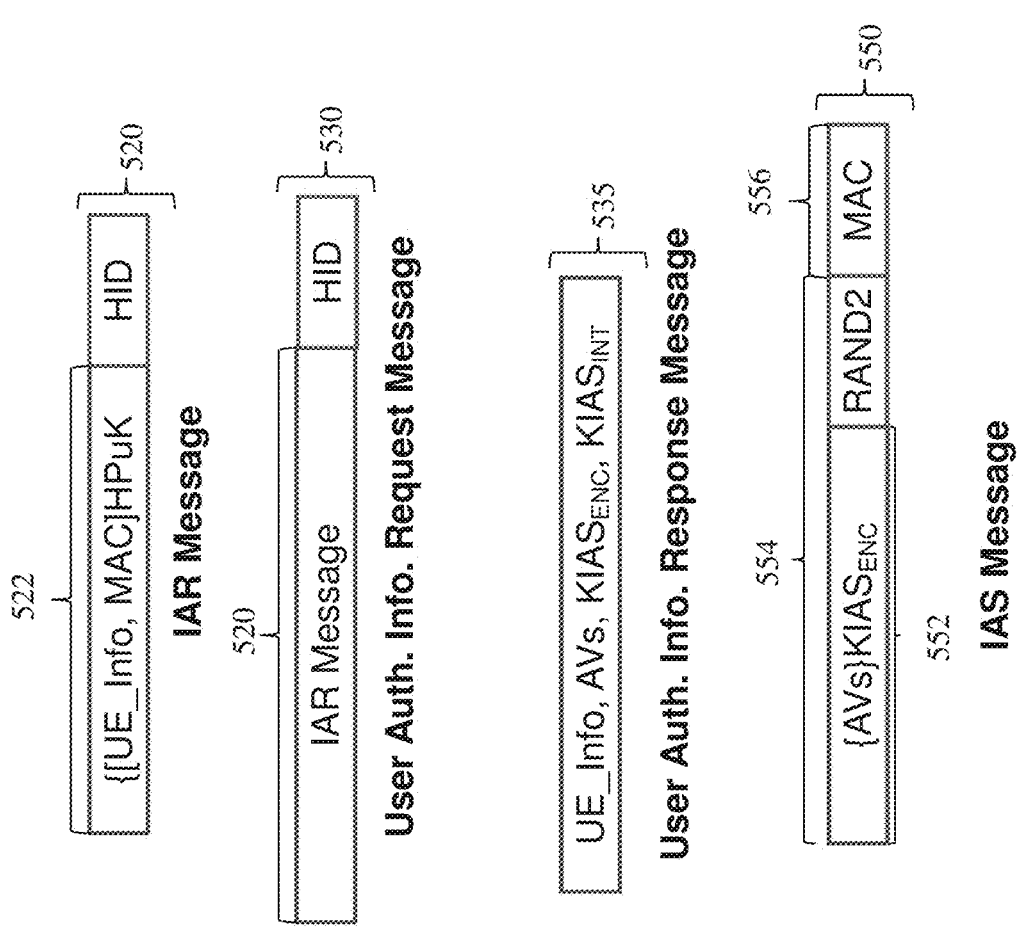
FIG. 5 is a diagram of embodiment frame formats for messages exchanged during the embodiment communications sequence depicted by FIG. 4.

As mentioned above, the IAR message 420, the authentication and data request message 430, the user authentication information response message 435, and the IAS message 450 may have various different frame formats. FIG. 5 illustrates frame formats for an embodiment IAR message 520, an embodiment authentication and data request message 530, an embodiment authentication and data response message 535, and an embodiment IAS message 550.

The embodiment IAR message 520 corresponds to the IAR message 420 sent from the UE 215 to the SeAN 220. In this example, the embodiment IAR message 520 includes UE Specific information (UE_info), a MAC signature, and a home network identifier (HID). The UE_info may include various information associated with, or generated by, the UE, including (but not limited to) an IMSI, one or more random numbers (e.g., RAND1, RAND2, etc.), a counter, and/or UE security capability parameters. The MAC signature may be generated by computing a hash function of the UE_info according to an integrity key (e.g., a $KIAR_{INT}$) and/or a random number (e.g., RAND1). The MAC signature and the UE_info are encrypted using a HPuK to form an encrypted portion 522 of the embodiment IAR message 520.

The embodiment authentication and data request message 530 corresponds to the authentication and data request message 430 sent from the SeAN 220 to the HSS 230. As shown, the embodiment authentication and data request message 530 includes the embodiment IAR message 520 and an HID.

The embodiment authentication and data response message 535 corresponds to the authentication and data response message 435 sent from the HSS 230 to the SeAN 220. As shown, the user authentication information response message 535 includes UE_info (e.g., an IMSI, counter, RAND1, RAND2, UE security capabilities, etc.), as well as authentication vectors (AVs), a $KIAS_{ENC}$, and a $KIAS_{INT}$.

The embodiment IAS message 550 corresponds to the IAS message 450 sent from the SeAN 220 to the UE 215. As shown, the IAS message 450 includes an encrypted inner portion 552, an outer portion 554, and a MAC 556. The encrypted inner portion 552 is formed by encrypting the AVs using a $KIAS_{ENC}$. It should be appreciated that the encrypted inner portion 552 may include other information (e.g., a KSI) in addition to the AVs. The outer portion 554 includes a RAND2 and the encrypted inner portion 552. The MAC signature 556 is generated by computing a hash of the outer portion 554 using the $KIAS_{INT}$.

Figure 6:
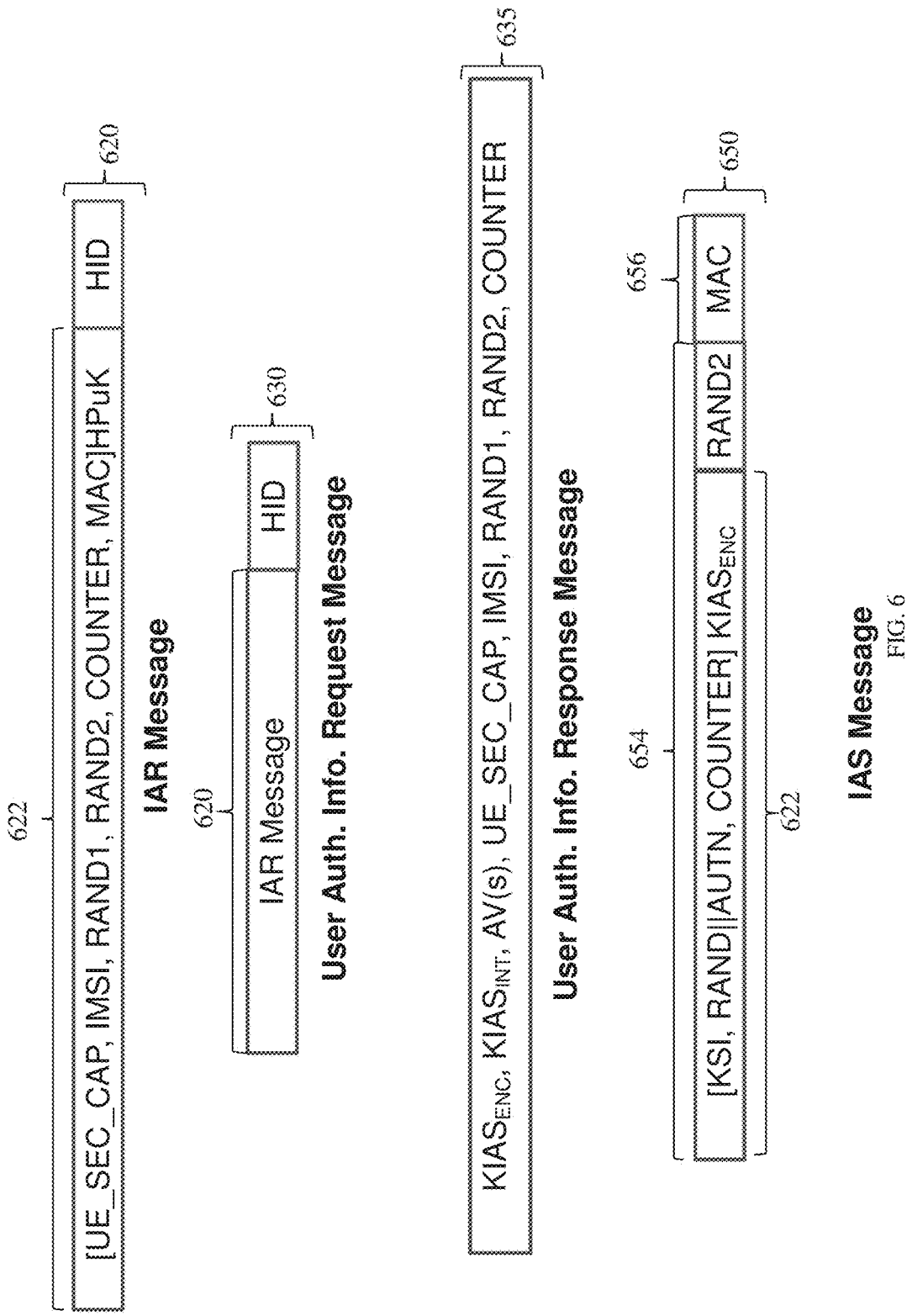
FIG. 6 is a diagram of additional embodiment frame formats for messages exchanged during the embodiment communications sequence depicted by FIG. 4.

Other frame formats are also possible. FIG. 6 illustrates frame formats for an embodiment IAR message 620, an embodiment authentication and data request message 630, an embodiment authentication and data response message 635, and an embodiment IAS message 650.

The embodiment IAR message 620 corresponds to the IAR message 420 sent from the UE 215 to the SeAN 220. In this example, the embodiment IAR message 620 includes an encrypted portion 622 and a home network identifier (HID). The encrypted portion 622 is generated by using an HPuK to encrypt a UE security capability parameter (UE_SEC_CAP), an IMSI, a RAND1, a RAND2, a COUNTER, and a MAC signature. The MAC signature is generated by computing by using a $KIAR_{INT}$ to compute a hash of the UE_SEC_CAP, the IMSI, the RAND1, the RAND2, and the COUNTER.

The embodiment authentication and data request message 630 corresponds to the authentication and data request message 430 sent from the SeAN 220 to the HSS 230. As shown, the embodiment authentication and data request message 630 includes the embodiment IAR message 620 and an HID.

The embodiment authentication and data response message 635 corresponds to the authentication and data response message 435 sent from the HSS 230 to the SeAN 220. As shown, the authentication and data response message 635 includes a $KIAS_{ENC}$, a $KIAS_{INT}$, AV(s), a UE_SEC_CAP, an IMSI, a RAND1, a RAND2, and a COUNTER.

The embodiment IAS message 650 corresponds to the IAS message 450 sent from the SeAN 220 to the UE 215. As shown, the IAS message 450 includes an encrypted inner portion 652, an outer portion 654, and a MAC signature 656. The encrypted inner portion 652 is formed by encrypting a KSI, and a RAND∥AUTN using the $KIAS_{ENC}$. The RAND∥AUTN may specify two or more parameters included in, or derived by the AVs, and may be used by the UE to authenticate the network and generate a response, e.g., the security and authentication complete message 470, etc. It should be appreciated that the encrypted inner portion 652 may include other UE specific information. The outer portion 654 includes a RAND2 and the encrypted inner portion 652. The MAC signature 656 is generated by computing a hash of the outer portion 654 using the $KIAS_{INT}$.

Figure 7:
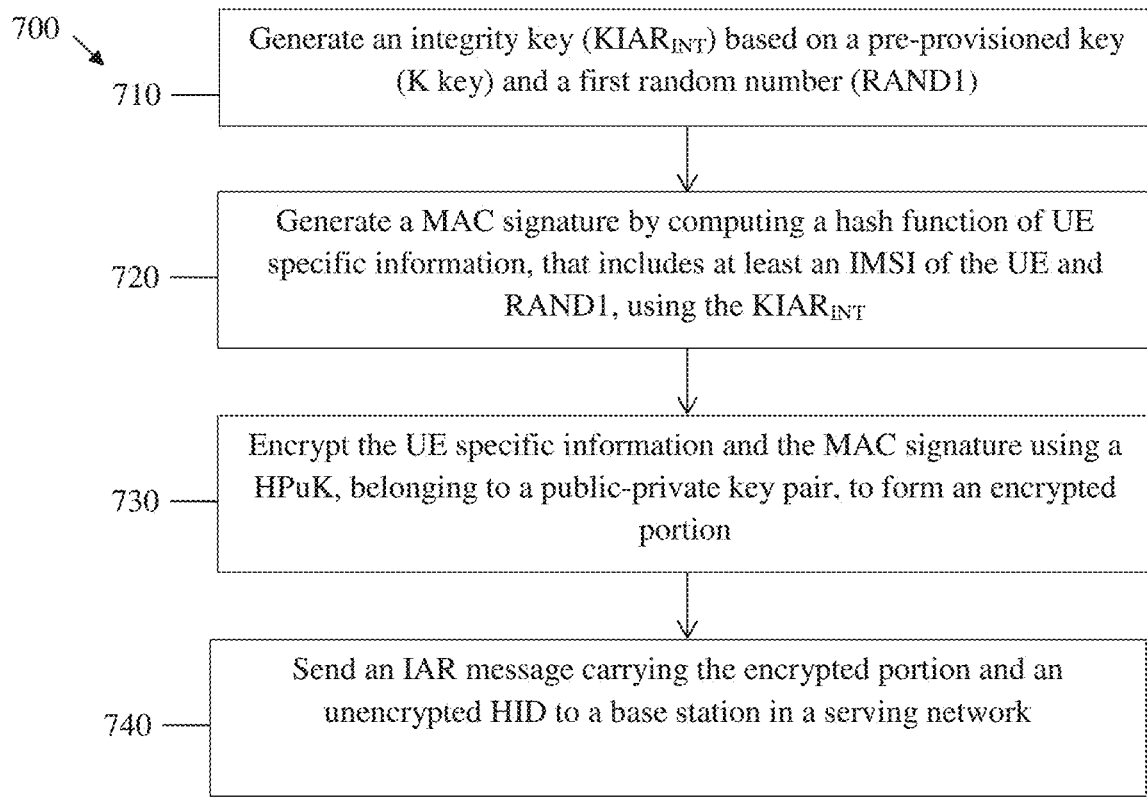
FIG. 7 is a flow chart of an embodiment method for generating an initial authentication request (IAR) message according to a MASA protocol.

Embodiments of this disclosure provide methods for performing MASA protocols. FIG. 7 is a flowchart of an embodiment method 700 for generating an IAR message according to a MASA protocol, as may be performed by a UE. At step 710, the UE generates a $KIAR_{INT}$ based on a pre-provisioned key (K key) and a first random number (RAND1). At step 720, the UE generates a MAC signature by computing a hash function of UE specific information using the $KIAR_{INT}$. The UE specific information includes at least an IMSI of the UE and the RAND1. At step 730, the UE encrypts the UE specific information and the MAC signature using a home network public key (HPuK) to form an encrypted portion. The HPuK belongs to a public-private key pair such that the encrypted portion can only be decrypted using a home network private key (HPrK) belonging to the public-private key pair. At 740, the UE sends an IAR message carrying the encrypted portion and an unencrypted home network identifier (HID) to a base station in a serving network. The base station relays the IAR message to an SeAN, which sends an authentication and data request message that includes the encrypted portion of the IAR message to an HSS server in a home network associated with the unencrypted network identifier in the IAR message.

Figure 8:
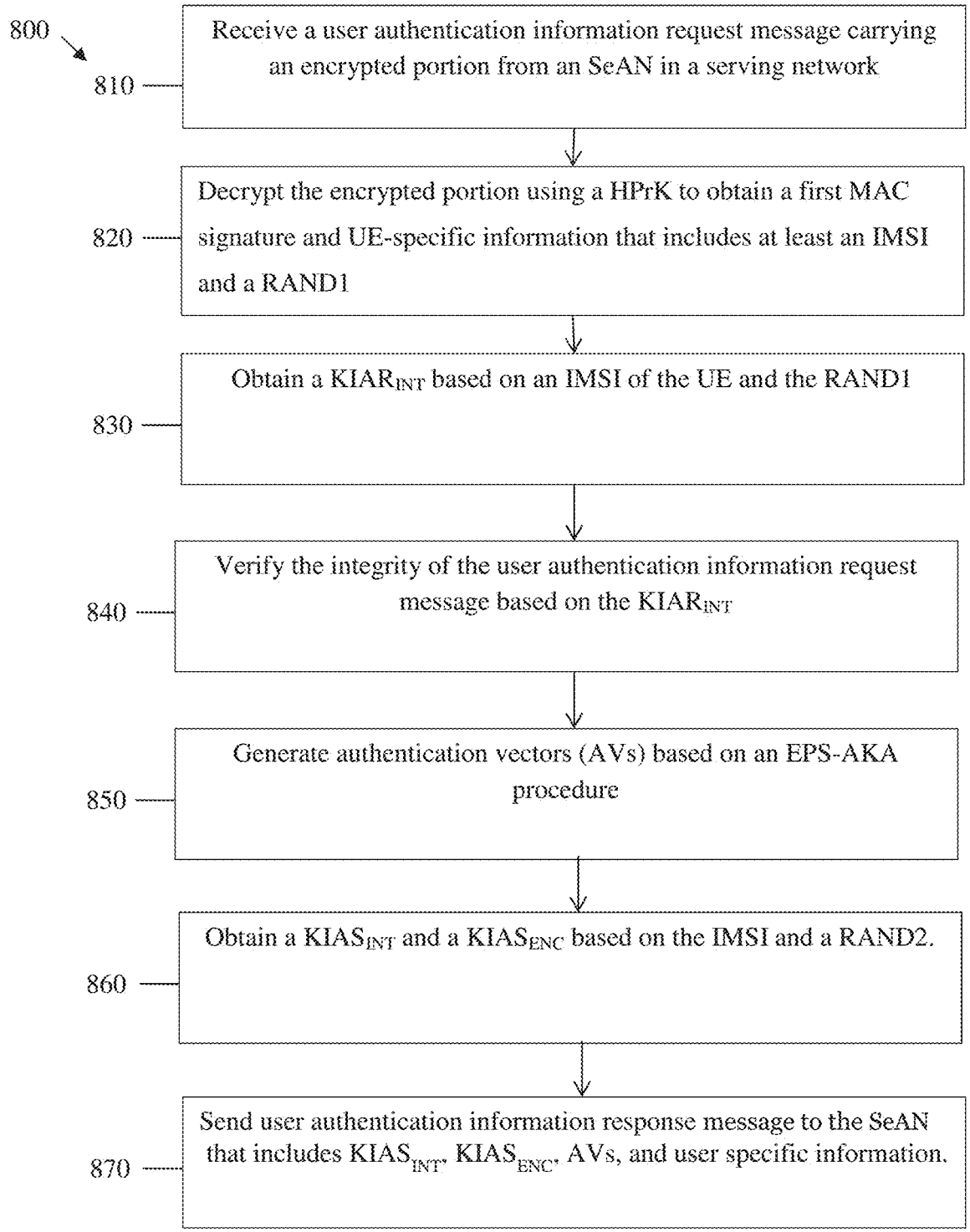
FIG. 8 is a flow chart of an embodiment method for processing an authentication and data request message and generating an authentication and data response message according to a MASA protocol.

FIG. 8 is a flowchart of an embodiment method 800 for processing an authentication and data request message and generating an authentication and data response message according to a MASA protocol, as may be performed by an HSS. At step 810, the HSS receives an authentication and data request message from an SeAN in a serving network. The authentication and data request message carries an encrypted portion.

At step 820, the HSS decrypts the encrypted portion using a HPrK to obtain a first MAC signature and UE-specific information. The UE-specific information includes at least an IMSI and a RAND1. At step 830, the HSS obtains a $KIAR_{INT}$ based on the IMSI and the RAND1. In one example, the HSS obtains the $KIAR_{INT}$ by sending the IMSI and the RAND1 to an authentication server, which looks up a pre-provisioned key (K-key) based on the IMSI, generates the $KIAR_{INT}$ based on the K-key and the RAND1, and returns the $KIAR_{INT}$ to the HSS. At step 840, the HSS verifies the integrity of the encrypted portion based on the $KIAR_{INT}$. In particular, the HSS generates a second MAC signature by computing a hash of UE-specific information in the encrypted portion according to the $KIAR_{INT}$, and then compares the second MAC signature with the first MAC signature. If the MAC signatures match, then the integrity of the encrypted portion is verified.

At step 850, the HSS generates authentication vectors (AVs) based on an EPS-AKA procedure. At step 860, the HSS obtains a $KIAS_{INT}$ and a $KIAS_{ENC}$ based on the IMSI of the UE and a RAND2. In one example, the HSS obtains the $KIAS_{INT}$ and the $KIAS_{ENC}$ by sending the IMSI and the RAND2 to an authentication server. The authentication server looks up a pre-provisioned key (K-key) based on the IMSI, generates the $KIAS_{INT}$ and the $KIAS_{ENC}$ based on the K-key and the RAND2, and returns the $KIAS_{INT}$ and the $KIAS_{ENC}$ to the HSS. In some embodiments, steps 830 and 860 are performed in parallel such that the IMSI, RAND1, and RAND2 are sent from the HSS to the authentication server in the same request message, and the $KIAR_{INT}$, $KIAS_{ENC}$, and $KIAS_{INT}$ are returned from the authentication server to the HSS in the same response message. At step 870, the HSS sends an authentication and data response message to the SeAN. The authentication and data response message includes the $KIAS_{INT}$, the $KIAS_{ENC}$, the AVs, and UE_info. In some embodiments, a COUNTER is also used when generating $KIAR_{INT}$, $KIAS_{INT}$, and $KIAS_{ENC}$.

Figure 9:
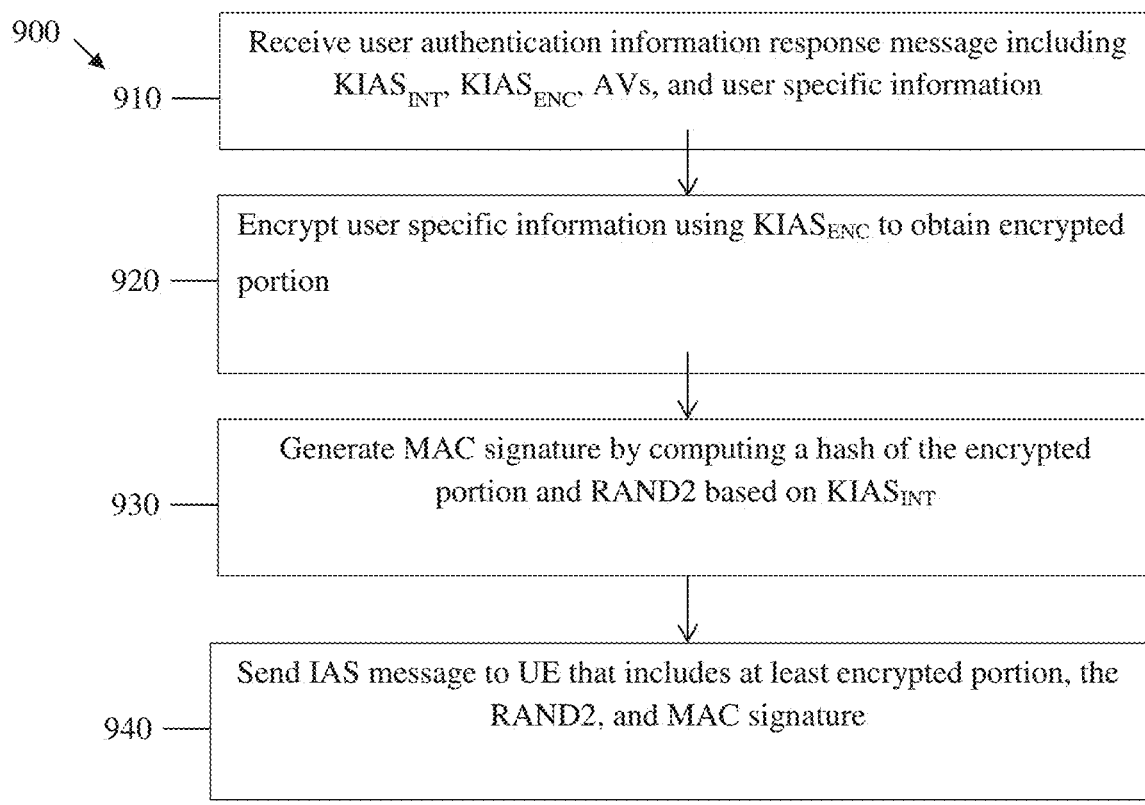
FIG. 9 is a flowchart of an embodiment method for processing an authentication and data response message and generating an initial authentication response (IAS) message according to a MASA protocol.

FIG. 9 is a flowchart of an embodiment method 900 for processing an authentication and data response message and generating an IAS message according to a MASA protocol, as may be performed by an SeAN. At step 910, the SeAN receives an authentication and data response message from an HSS that includes a $KIAS_{INT}$, a $KIAS_{ENC}$, AVs, and user specific information. The user specification information may include a UE security capabilities parameter, an IMSI, a RAND2, and/or a COUNTER.

At step 920, the SeAN encrypts the user specific information using the $KIAS_{ENC}$ to obtain an encrypted portion. At step 930, the SeAN generates a MAC signature by computing a hash of the encrypted portion and the RAND2 based on the $KIAS_{INT}$. At step 940, the SeAN sends an IAS message to a UE that includes at least the encrypted portion, the RAND2, and MAC signature.

Figure 10:
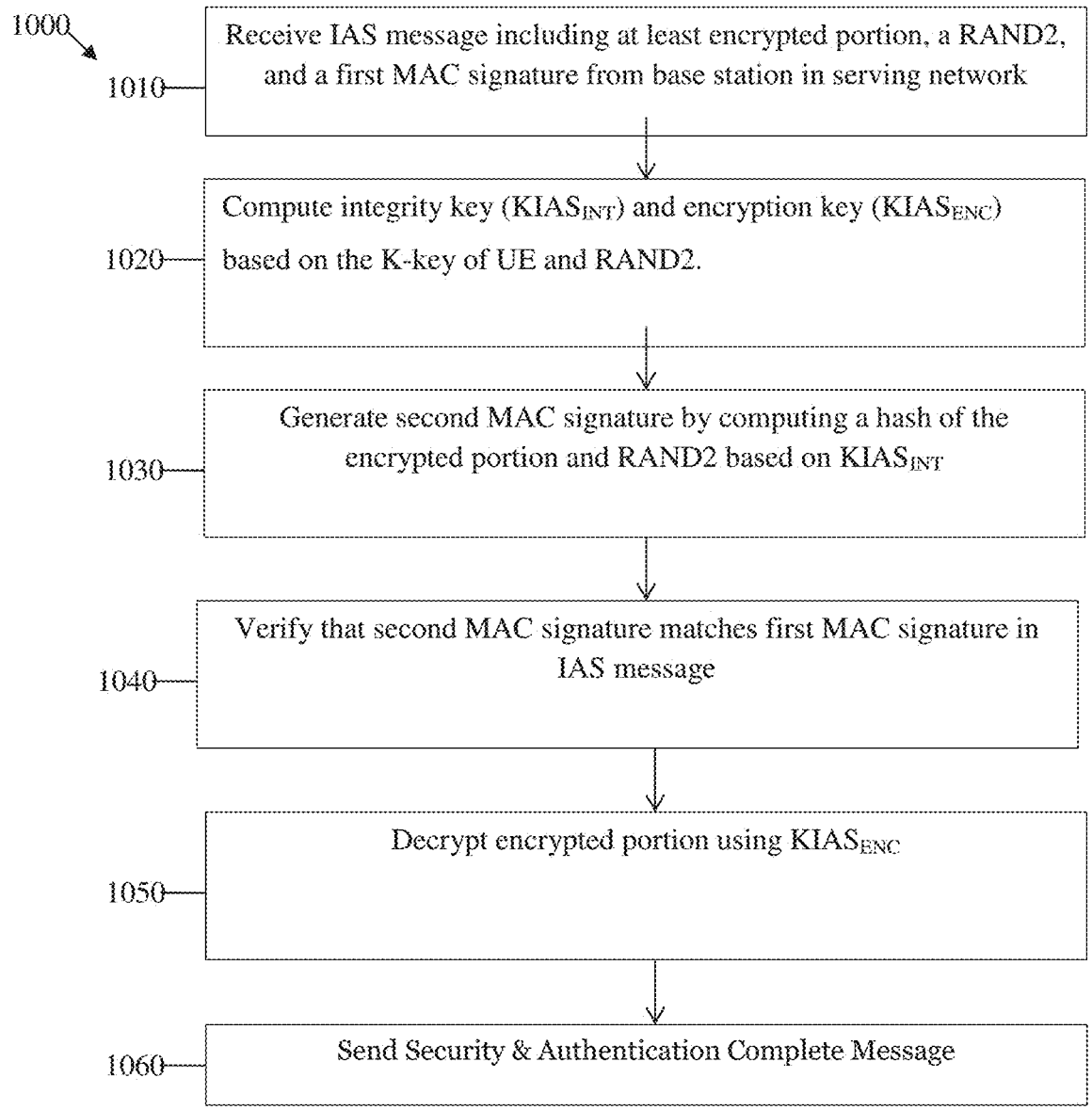
FIG. 10 is a flowchart of an embodiment method for processing an IAS message according to a MASA protocol.

FIG. 10 is a flowchart of an embodiment method 1000 for processing an IAS message according to a MASA protocol, as may be performed by a UE. At step 1010, the UE receives an IAS message from a base station in a serving network. The IAS message includes at least an encrypted portion, a RAND2, and a first MAC signature. At step 1020, the UE computes a $KIAS_{INT}$ and a $KIAS_{ENC}$ based on a K-key of UE and the RAND2. In some embodiments, step 1020 and 720 may be performed in parallel (e.g., by a SIM card in the UE) prior to sending an initial IAR message. At step 1030, the UE generates a second MAC signature by computing a hash of the encrypted portion and the RAND2 based on the $KIAS_{INT}$. At step 1040, the UE verifies that the second MAC signature matches the first MAC signature in the IAS message. At step 1050, the UE decrypts the encrypted portion using the $KIAS_{ENC}$. At step 1060, the UE sends a security and authentication complete message to the SeAN confirming that the network has been authenticated.

Figure 11:
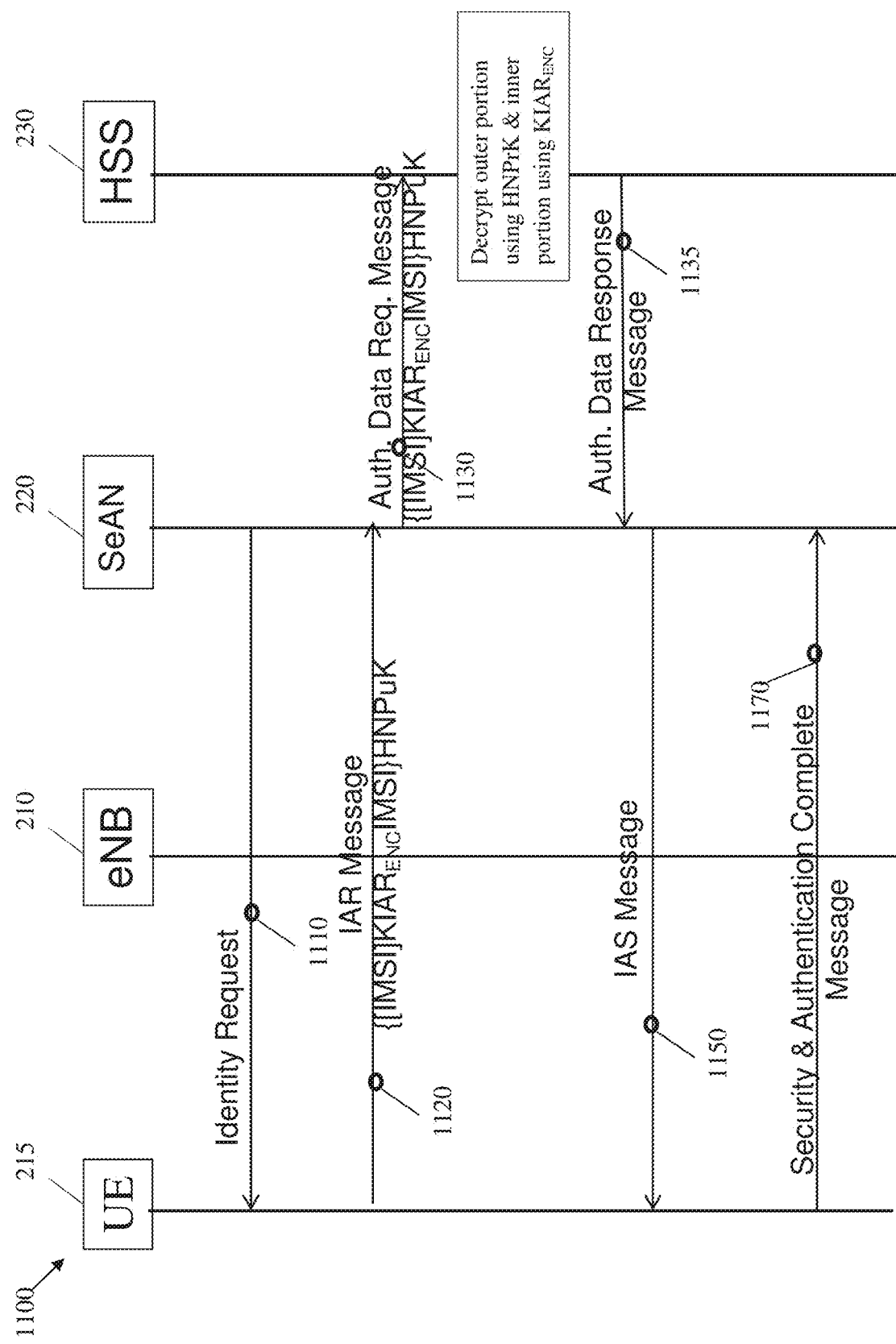
FIG. 11 is a protocol diagram of another embodiment communications sequence for authenticating a UE in a wireless network.

Aspects of this disclosure prevent, or at least inhibit, unauthorized third parties from obtaining an IMSI of a UE during LTE authentication by encrypting the IMSI using a $KIAR_{ENC}$. FIG. 11 illustrates a protocol diagram of an embodiment communications sequence 1100 for authenticating a UE in a wireless network. As shown, the communications sequence 1100 begins when the SeAN 220 communicates an identity request 1110 to the UE 215. Next, the UE 215 encrypts a first copy of the IMSI using a $KIAR_{ENC}$ to form an encrypted inner portion, and encrypts a second copy of the IMSI and the encrypted inner portion using an HPuK to form an encrypted outer portion. It should be appreciated that other UE specific information (e.g., RAND1, RAND2, COUNTER, UE_SEC_CAP, etc.) may be encrypted along with the IMSI when forming the encrypted inner portion and/or the encrypted outer portion. Thereafter, the UE sends an IAR message 1120 carrying the encrypted outer portion to the SeAN 220. In some embodiments, the UE 215 sends the IAR message 1120 without having received the identity request 1110. The IAR message 1120 may include an unencrypted home network ID (HID) of the home network of the UE 215. Upon receiving the IAR message 1120, the SeAN 220 forwards an authentication and data request message 1130 carrying the encrypted outer portion to the HSS 230. The authentication and data request message 1130 may include other information in addition to the encrypted outer portion, such as SeAN security capability parameters that identify the NAS security capabilities of the SeAN 220, e.g., which NAS ciphering algorithms are supported by the SeAN 220. The authentication and data request 1130 may also include a serving network identifier (SID) and network type (NWK Type) of the serving network of the SeAN 220.

Upon receiving the authentication and data request message 1130, the HSS 230 may decrypt the encrypted outer portion using a HPrK to obtain the second copy of the IMSI and the encrypted inner portion. The HSS 230 may then decrypt the encrypted inner portion using the $KIAR_{ENC}$ to obtain the first copy of the IMSI. In some embodiments, the HSS 230 validates the authentication and data request message 1130 by comparing the first copy of IMSI with the second copy of the IMSI. The HSS 230 may also compare the COUNTER with a corresponding COUNTER maintained by the HSS 230 to determine whether the authentication and data request 1130 is fresh (e.g., not stale). If the validation is successful, then the HSS 230 generates authentication vectors based on an EPS-AKA procedure, and sends an authentication and data response message 1135 carrying the EPS authentication vectors and a $KIAS_{ENC}$ to the SeAN 220.

Subsequently, the SeAN 220 selects one of the authentication vectors, as well as a non-access stratum (NAS) ciphering algorithm. The SeAN 220 may also assign a temporary network identifier (e.g., a globally unique temporary identifier (GUTI)) to the UE. Thereafter, the SeAN 220 may encrypt, the temporary network identifier, and a key set identifier (KSI) associated with the selected NAS ciphering algorithm using the $KIAS_{ENC}$ to obtain encrypted NAS security data. The encrypted NAS security data may include other information as well, such as the counter and the RAND2. The encrypted NAS security data may be included in the IAS message 1150 sent by the SeAN 220 to the UE 215. The IAS message 1150 may further include an unencrypted version of the RAND2. The UE 215 may authenticate the network by comparing RAND2 to a local version of RAND2 stored by the UE 215 and by decrypting the encrypted private information of the Authentication Response using the $KIAS_{ENC}$ key. The UE 215 then sends a security and authentication complete message 1170 to the SeAN 220.

Figure 12:
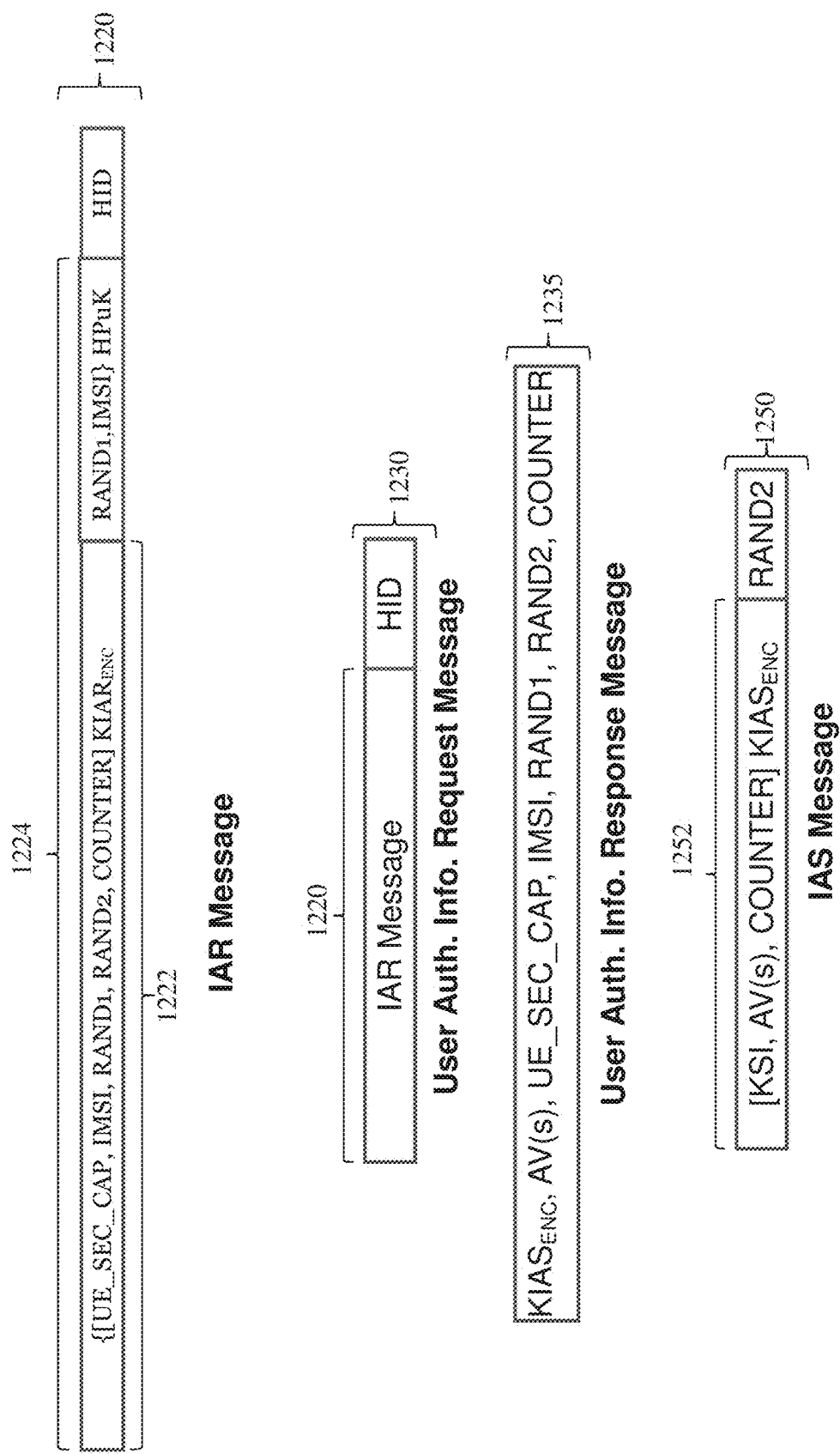
FIG. 12 is a diagram of embodiment frame formats for messages exchanged during the embodiment communications sequence depicted by FIG. 11.

FIG. 12 illustrates frame formats for an embodiment TAR message 1220, an embodiment authentication and data request message 1230, an embodiment authentication and data response message 1235, and an embodiment IAS message 1250.

The embodiment IAR message 1220 corresponds to the IAR message 1120 sent from the UE 215 to the SeAN 220. In this example, the embodiment IAR message 1220 includes an encrypted inner portion 1222, an encrypted outer portion 1224, and an HID. The encrypted inner portion 1222 is formed by encrypting a UE_SEC_CAP, a first copy of an IMSI, a first copy of a RAND1, a RAND2, and a COUNTER using a $KIAR_{ENC}$. The encrypted outer portion 1224 is generated by encrypting the encrypted inner portion 1222 along with a second copy of the IMSI and a second copy of the RAND1 using a HPuK. It should be appreciated that additional information may be included in the encrypted inner portion 1222 and/or the encrypted outer portion 1224.

The embodiment authentication and data request message 1230 corresponds to the authentication and data request message 1130 sent from the SeAN 220 to the HSS 230. As shown, the embodiment authentication and data request message 1230 includes the embodiment IAR message 1220 and an HID.

The embodiment authentication and data response message 1235 corresponds to the authentication and data response message 1135 sent from the HSS 230 to the SeAN 220. As shown, the authentication and data response message 1235 includes a $KIAS_{ENC}$, the UE_SEC_CAP, the IMSI, the RAND2, and the COUNTER.

The embodiment IAS message 1250 corresponds to the IAS message 1150 sent from the SeAN 220 to the UE 215. As shown, the IAS message 1150 includes an encrypted portion 1252 and the RAND2. The encrypted portion 1252 is formed by encrypting a KSI, the AVs, and the COUNTER using the $KIAS_{ENC}$.

Figure 13:
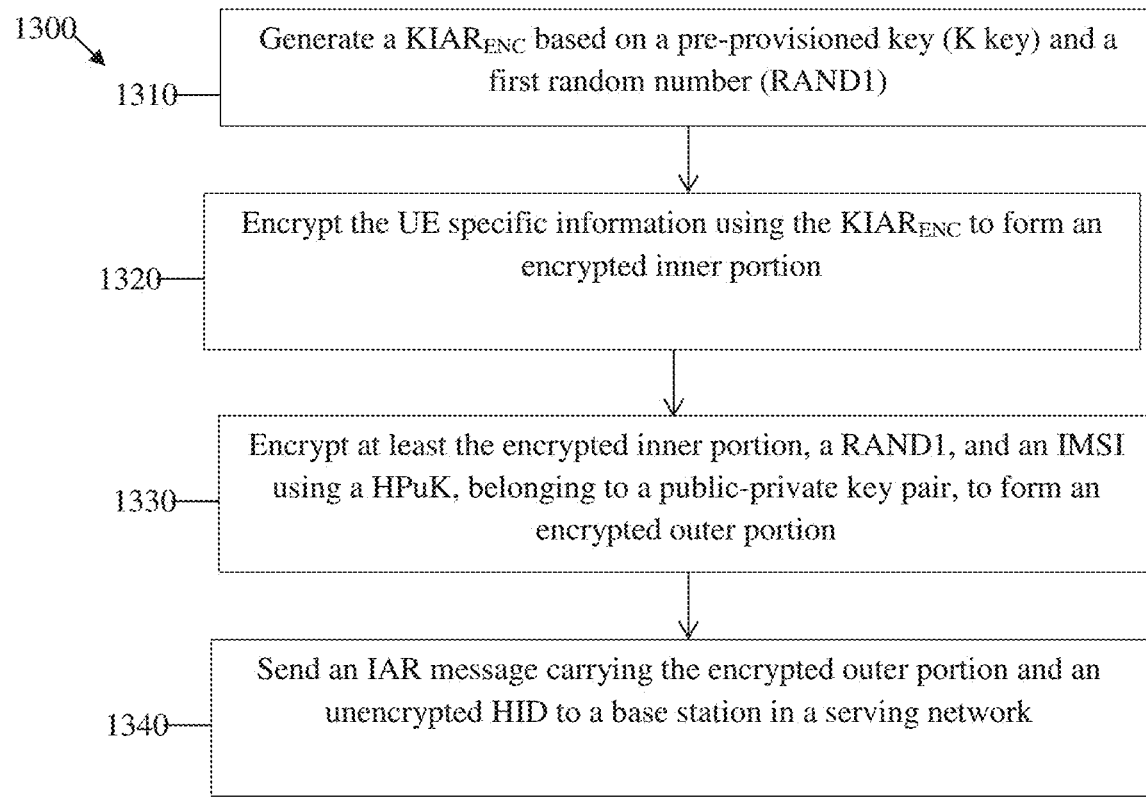
FIG. 13 is a flow chart of an embodiment method for generating an IAR message according to a MASA protocol.

Embodiments of this disclosure provide methods for performing MASA protocols. FIG. 13 is a flowchart of an embodiment method 1300 for generating an IAR message according to a MASA protocol, as may be performed by a UE. At step 1310, the UE generates a $KIAR_{ENT}$ based on a pre-provisioned key (K key) and a RAND1. At step 1320, the UE encrypts UE specific information using the $KIAR_{ENC}$ to form an encrypted inner portion. At step 1330, the UE encrypts at least the encrypted inner portion, a RAND1, and an IMSI using an HPuK to form an encrypted outer portion. At step 1340, the UE sends an IAR message carrying the encrypted outer portion and an unencrypted HID to a base station in a serving network.

Figure 14:
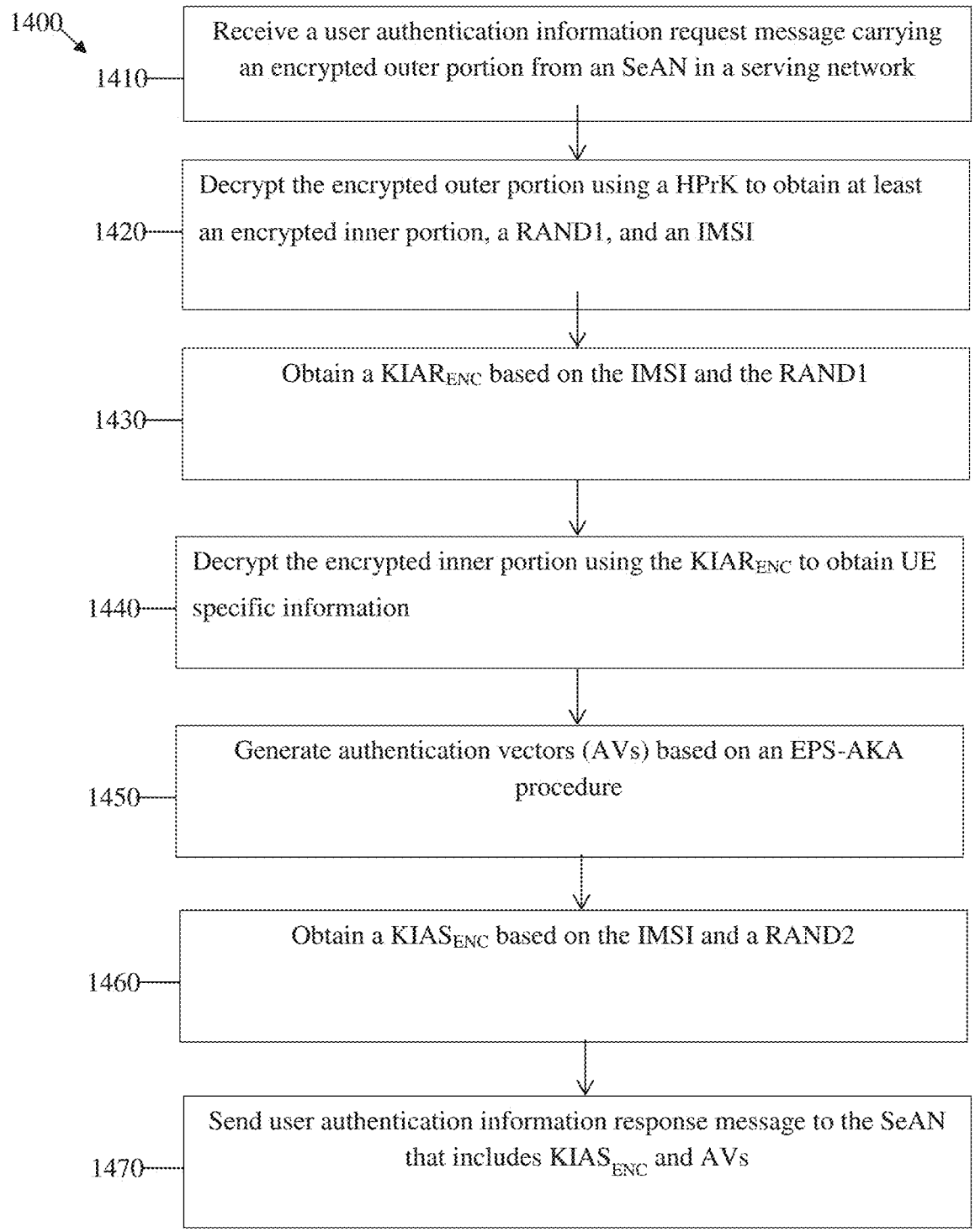
FIG. 14 is a flow chart of an embodiment method for processing an authentication and data request message and generating an authentication and data response message according to a MASA protocol.

FIG. 14 is a flowchart of an embodiment method 1400 for processing an authentication and data request message and generating an authentication and data response message according to a MASA protocol, as may be performed by an HSS. At step 1410, the HSS receives an authentication and data request message from a SeAN in a serving network. The authentication and data request message carries an encrypted outer portion.

At step 1420, the HSS decrypts the encrypted portion using an HPrK to obtain a first MAC signature and UE-specific information. The UE-specific information includes at least an IMSI and a RAND1. At step 1430, the HSS obtains a $KIAR_{ENC}$ based on the IMSI and the RAND1. At step 1440, the HSS decrypts the encrypted inner portion using the $KIAR_{ENC}$ to obtain UE specific information. At step 1450, the HSS generates authentication vectors (AVs) based on an EPS-AKA procedure. At step 1460, the HSS obtains a $KIAS_{ENC}$ based on the IMSI and a RAND2. In some embodiments, steps 1430 and 1460 are performed in parallel such that the IMSI, RAND1, and RAND2 are sent from the HSS to the authentication server in the same request message, and the $KIAR_{ENC}$ and $KIAS_{ENC}$ are returned from the authentication server to the HSS in the same response message. At step 1470, the HSS sends an authentication and data response message to the SeAN. The authentication and data response message includes the $KIAS_{INT}$, the $KIAS_{ENC}$, the AVs, and UE_info.

Figure 15:
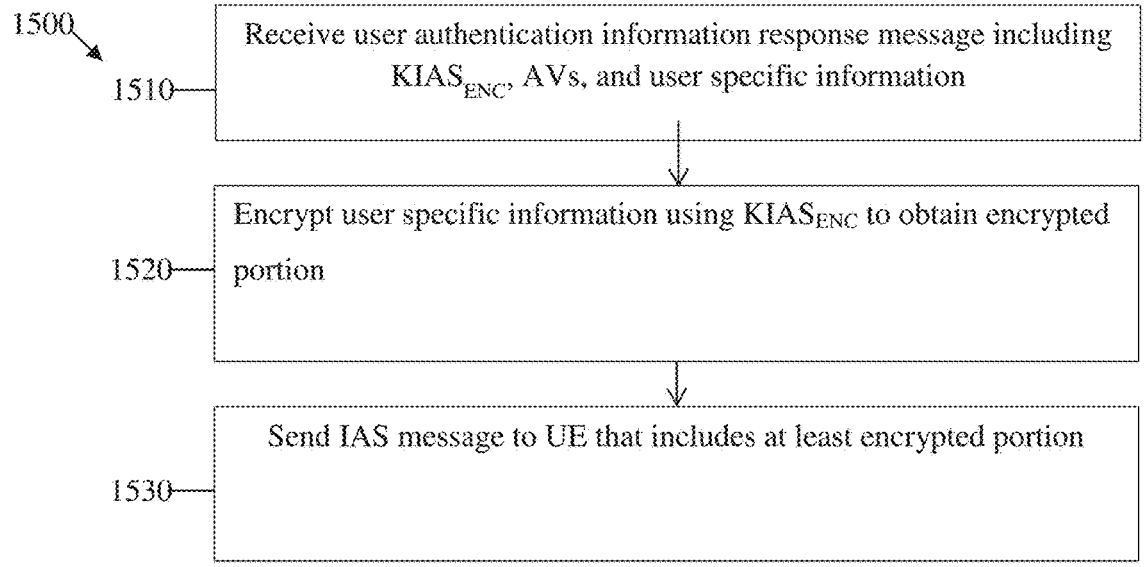
FIG. 15 is a flowchart of an embodiment method for processing an authentication and data response message and generating an IAS message according to a MASA protocol.

FIG. 15 is a flowchart of an embodiment method 1500 for processing an authentication and data response message and generating an IAS message according to a MASA protocol, as may be performed by an SeAN. At step 1510, the SeAN receives an authentication and data response message from an HSS that includes a $KIAS_{ENC}$, AVs, and user specific information. The user specification information may include a UE security capabilities parameter, an IMSI, a RAND2, and/or a COUNTER.

At step 1520, the SeAN encrypts at least the user specific information and the AVs using the $KIAS_{ENC}$ to obtain an encrypted portion. It should be appreciated that the encrypted portion may include other information, such as a KSI. At step 1530, the SeAN sends an IAS message to a UE that includes at least the encrypted portion.

Figure 16:
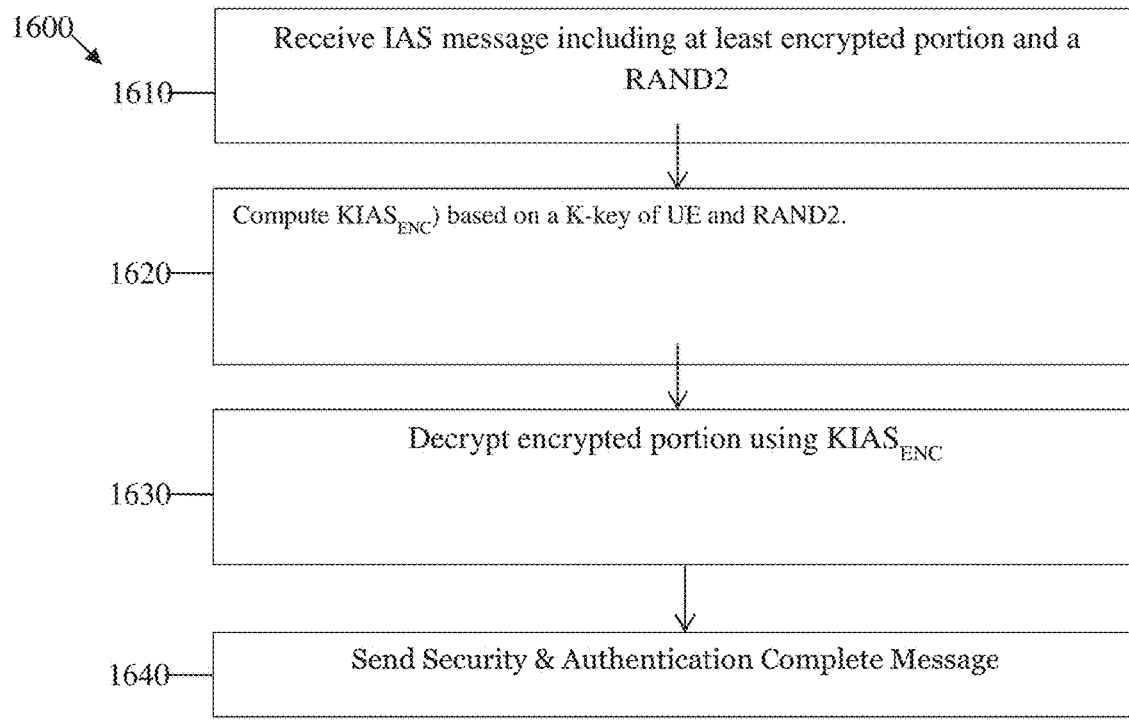
FIG. 16 is a flowchart of an embodiment method for processing an IAS message according to a MASA protocol.

FIG. 16 is a flowchart of an embodiment method 1600 for processing an IAS message according to a MASA protocol, as may be performed by a UE. At step 1610, the UE receives an IAS message from a base station in a serving network. The IAS message includes at least an encrypted portion, a RAND2, and a first MAC signature. At step 1620, the UE computes a $KIAS_{INT}$ and a $KIAS_{ENC}$ based on a K-key of UE and the RAND2. In some embodiments, step 1620 and 1310 may be performed in parallel (e.g., by a SIM card in the UE) prior to sending an initial IAR message. At step 1630, the UE decrypts the encrypted portion using the $KIAS_{ENC}$. At step 1640, the UE sends a security and authentication complete message to the SeAN confirming that the network has been authenticated.

Figure 17:
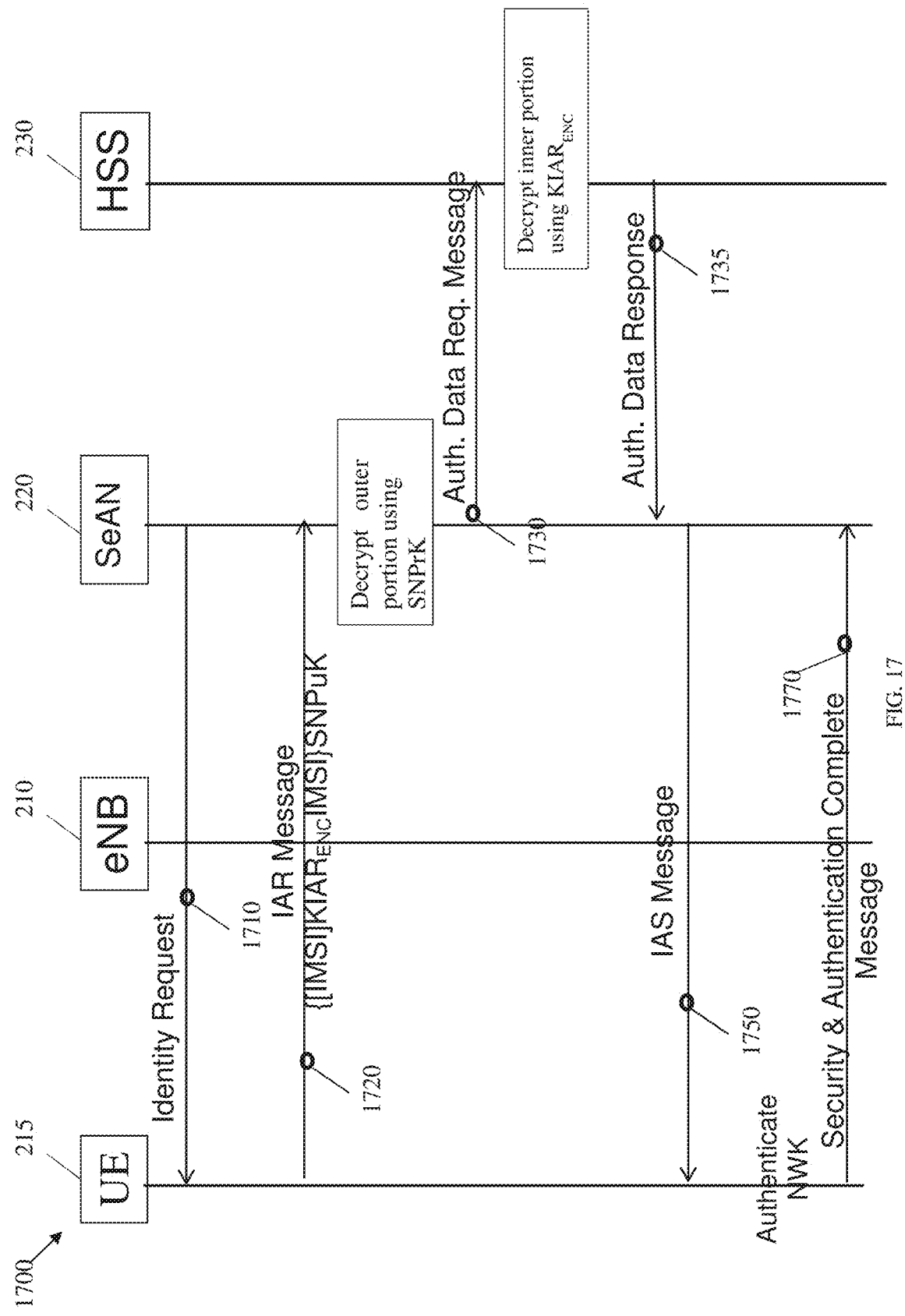
FIG. 17 is a protocol diagram of yet another embodiment communications sequence for authenticating a UE in a wireless network.

In some embodiments, the UE uses a serving network public key (SPuK) to encrypt a portion of an IAR message. FIG. 17 illustrates a protocol diagram of an embodiment communications sequence 1700 for authenticating a UE in a wireless network. As shown, the communications sequence 1700 begins when the SeAN 220 communicates an identity request 1710 to the UE 215. Next, the UE 215 encrypts a first copy of an IMSI using a $KIAR_{ENC}$ to form an encrypted inner portion, and encrypts a second copy of the IMSI and the encrypted inner portion using a SPuK to form an encrypted outer portion. It should be appreciated that other UE specific information (e.g., a RAND1, a RAND2, a COUNTER, a UE_SEC_CAP, etc.) may be encrypted along with the IMSI when forming the encrypted inner portion and/or the encrypted outer portion. Thereafter, the UE sends an IAR message 1720 carrying the encrypted outer portion to the SeAN 220. In some embodiments, the UE 215 sends the IAR message 1720 without having received the identity request 1710. The TAR message 1720 may include an unencrypted home network ID (SID). Upon receiving the IAR message 1720, the SeAN 220 determines a serving network private key (SPrK) based on the unencrypted SID, and decrypts the encrypted outer portion of the IAR message using the SPrK. The SeAN 220 then forwards an authentication and data request message 1730 carrying the encrypted inner portion, the second copy of the IMSI, and a RAND1 to the HSS 230. The authentication and data request message 1730 may include other information in addition to the encrypted outer portion, such as SeAN security capability parameters, the SID, and a NWK Type.

Upon receiving the authentication and data request message 1730, the HSS 230 may obtain the $KIAR_{ENC}$ based on the second copy of the IMSI and the RAND1, and decrypt the encrypted inner portion using the $KIAR_{ENC}$ to obtain the first copy of the IMSI. The HSS 230 may then compare the first copy of the IMSI (carried in the encrypted inner portion of the authentication and data request message 1730) with the second copy of the IMSI (carried in an unencrypted outer portion of the authentication and data request message 1730) to verify the integrity of the authentication information request message 1730. The HSS 230 may also take other steps to validate the authentication and data request message 1730. For example, the HSS 230 may compare the COUNTER in the encrypted inner portion with a corresponding COUNTER maintained by the HSS 230 to determine whether the authentication and data request 1730 is fresh (e.g., not stale). If the validation is successful, then the HSS 230 may obtain a $KIAS_{ENC}$ based on the IMSI and a random number (e.g., RAND1, RAND2, etc.), generate authentication vectors based on an EPS-AKA procedure, and send an authentication and data response message 1735 carrying the EPS authentication vectors and the $KIAS_{ENC}$ to the SeAN 220.

Subsequently, the SeAN 220 encrypts UE specific information using the $KIAS_{ENC}$ to obtain an encrypted portion, which is sent to the UE 215 via an IAS message 1750. The encrypted portion of the IAS message 1750 may include other information in addition to the UE specific information, such as a temporary network identifier and a KSI associated with a NAS ciphering algorithm. The IAS message 1750 may further include an unencrypted version of the RAND2. The UE 215 may decrypt the encrypted portion of the IAS message 1750 using a $KIAS_{ENC}$, and send a security and authentication complete message 1770 to the SeAN 220.

Figure 18:
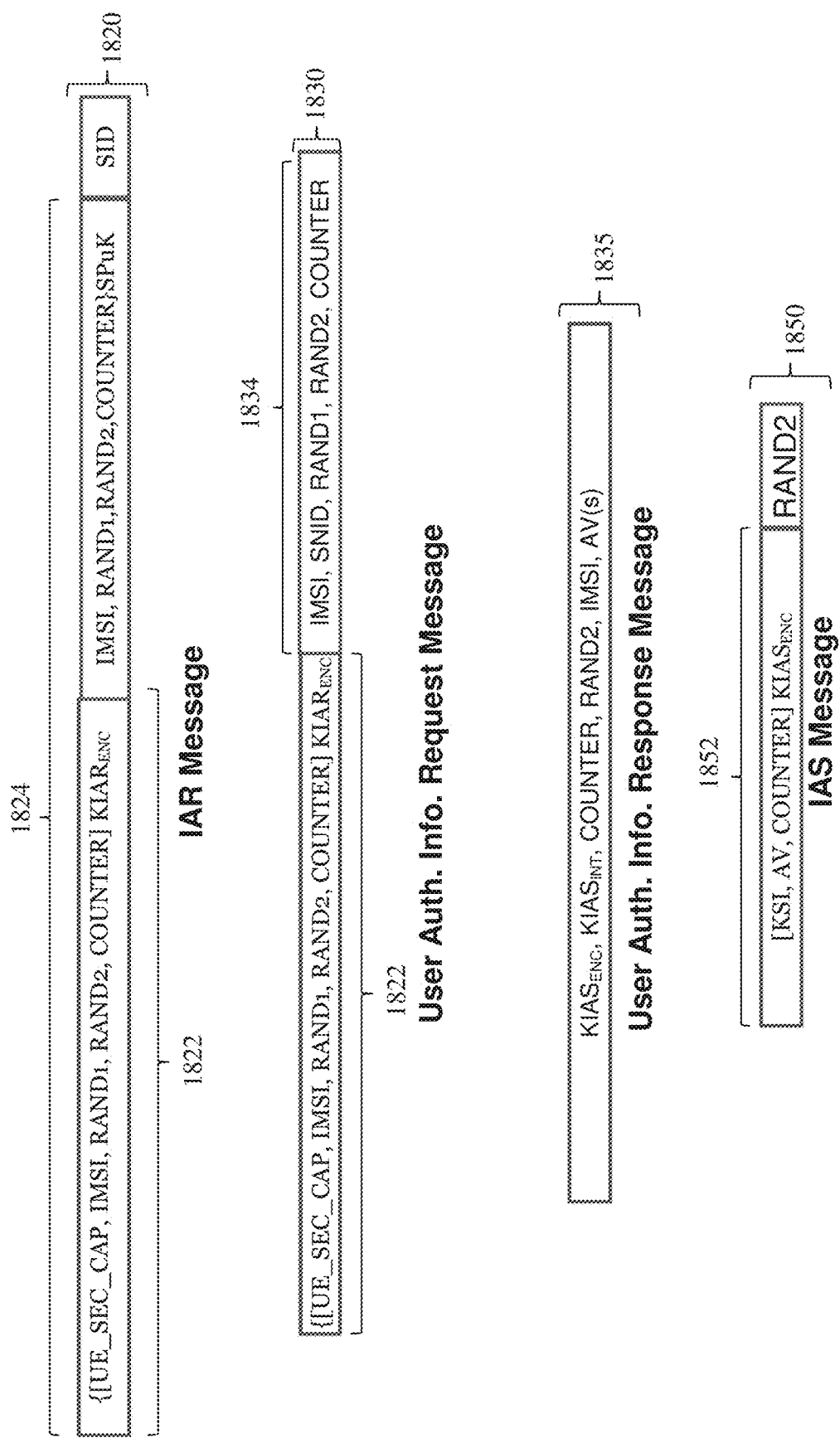
FIG. 18 is a diagram of embodiment frame formats for messages exchanged during the embodiment communications sequence depicted by FIG. 17.

FIG. 18 illustrates frame formats for an embodiment TAR message 1820, an embodiment authentication and data request message 1830, an embodiment authentication and data response message 1835, and an embodiment IAS message 1850.

The embodiment IAR message 1820 corresponds to the IAR message 1780 sent from the UE 215 to the SeAN 220. In this example, the embodiment IAR message 1820 includes an encrypted inner portion 1822, an encrypted outer portion 1824, and an SID. The encrypted inner portion 1822 is formed by encrypting a UE_SEC_CAP, a first copy of an IMSI, a first copy of a RAND1, a first copy of a RAND2, and a first copy of a COUNTER using a $KIAR_{ENC}$. The encrypted outer portion 1824 is generated by encrypting the encrypted inner portion 1822 along with a second copy of the IMSI, a second copy of the RAND1, a second copy of the RAND2, and a second copy of the COUNTER using a SPuK. It should be appreciated that additional information may be included in the encrypted inner portion 1822 and/or the encrypted outer portion 1824. In one embodiment, a MAC signature generated by computing a hash of the encrypted outer portion 1824 using a $KIAR_{INT}$ is also included in the IAR message 1820.

The embodiment authentication and data request message 1830 corresponds to the authentication and data request message 1730 sent from the SeAN 220 to the HSS 230. As shown, the embodiment authentication and data request message 1830 the encrypted inner portion 1822 from the IAR message 1820, as well as unencrypted information 1834. The unencrypted information 1834 includes the second copy of the IMSI, the second copy of the RAND1, the second copy of the RAND2, and the second copy of the COUNTER, which were obtained from decrypting the encrypted outer portion 1824 of the IAR message 1820 using the SPrK.

The embodiment authentication and data response message 1835 corresponds to the authentication and data response message 1735 sent from the HSS 230 to the SeAN 220. As shown, the authentication and data response message 1835 includes a $KIAS_{ENC}$, a $KIAS_{INT}$, the first copy of the COUNTER, the first copy of the RAND2, the first copy of the IMSI, and AV(s). The first copy of the RAND2 and/or the COUNTER in the authentication and data response message 1835 may provide replay protection. In this example the authentication and data response message 1835 includes both the RAND2 and the COUNTER. In another example, the authentication and data response message 1835 includes the RAND2 but excludes the COUNTER.

The embodiment IAS message 1850 corresponds to the IAS message 1750 sent from the SeAN 220 to the UE 215. As shown, the IAS message 1850 includes an encrypted portion 1852 and the RAND2. The encrypted portion 1852 is formed by encrypting a KSI, the AVs, and the COUNTER using the $KIAS_{ENC}$. In some examples, the embodiment IAS message 1850 includes a MAC signature that is generated by computing a hash of the encrypted portion 1852 using the $KIAS_{INT}$.

Figure 19:
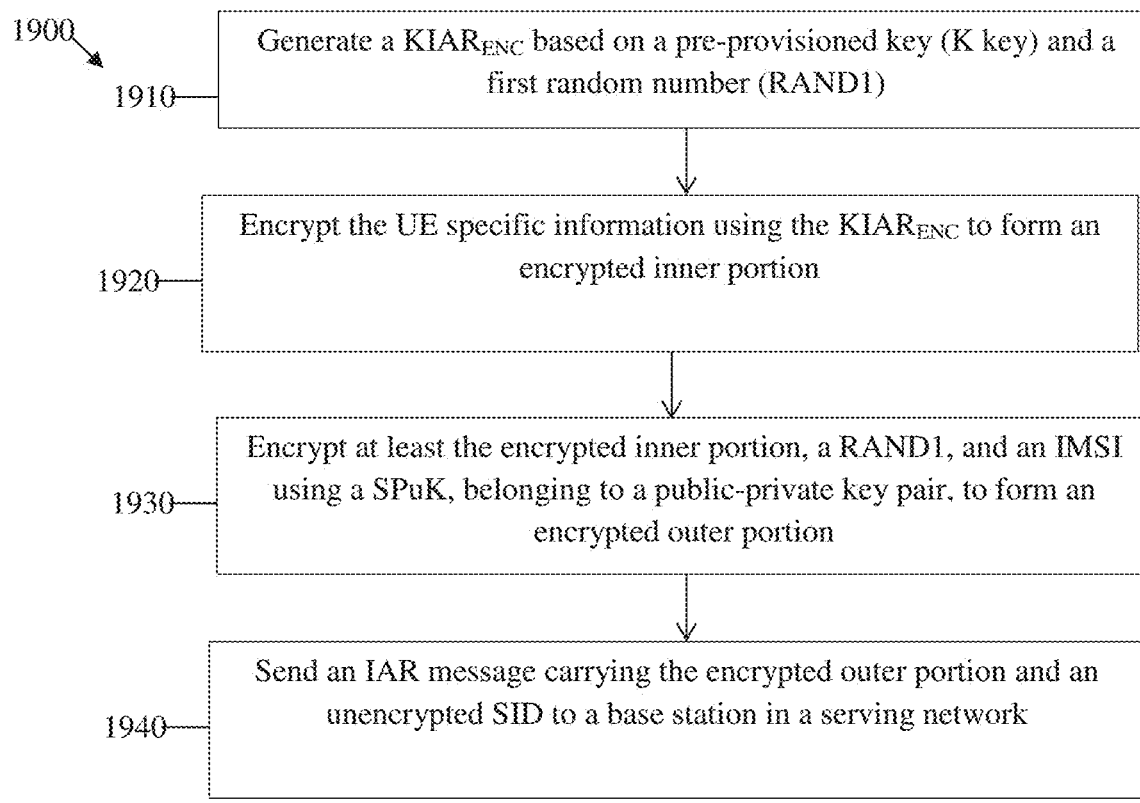
FIG. 19 is a flow chart of an embodiment method for generating an IAR message according to a MASA protocol.

Embodiments of this disclosure provide methods for performing MASA protocols. FIG. 19 is a flowchart of an embodiment method 1900 for generating an IAR message according to a MASA protocol, as may be performed by a UE. At step 1910, the UE generates a $KIAR_{ENC}$ based on a pre-provisioned key (K key) and a RAND1. At step 1920, the UE encrypts UE specific information using the $KIAR_{ENC}$ to form an encrypted inner portion. At step 1930, the UE encrypts at least the encrypted inner portion, a RAND1, and an IMSI using a SPuK to form an encrypted outer portion. At step 1940, the UE sends an TAR message carrying the encrypted outer portion and an unencrypted SID to a base station in a serving network.

Figure 20:
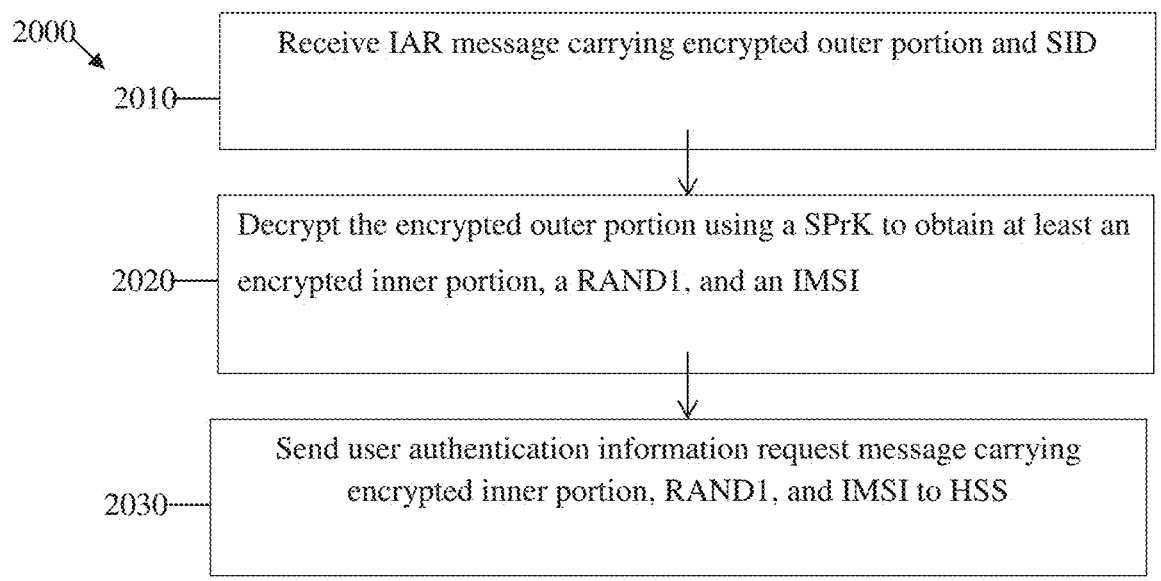
FIG. 20 is a flowchart of an embodiment method for processing an IAR message and generating an authentication and data request message according to a MASA protocol.

FIG. 20 is a flowchart of an embodiment method 2000 for processing an IAR message and generating an authentication and data request message according to a MASA protocol, as may be performed by an SeAN. At step 2010, the SeAN receives an IAR message carrying an encrypted outer portion and an SID. At step 2020, the SeAN decrypts the encrypted outer portion using a SPrK associated with the SID to obtain at least an encrypted inner portion, a RAND1, and an IMSI. At step 2030, the SeAN sends an authentication and data request message carrying the encrypted inner portion, the RAND1, and the IMSI to an HSS.

Figure 21:
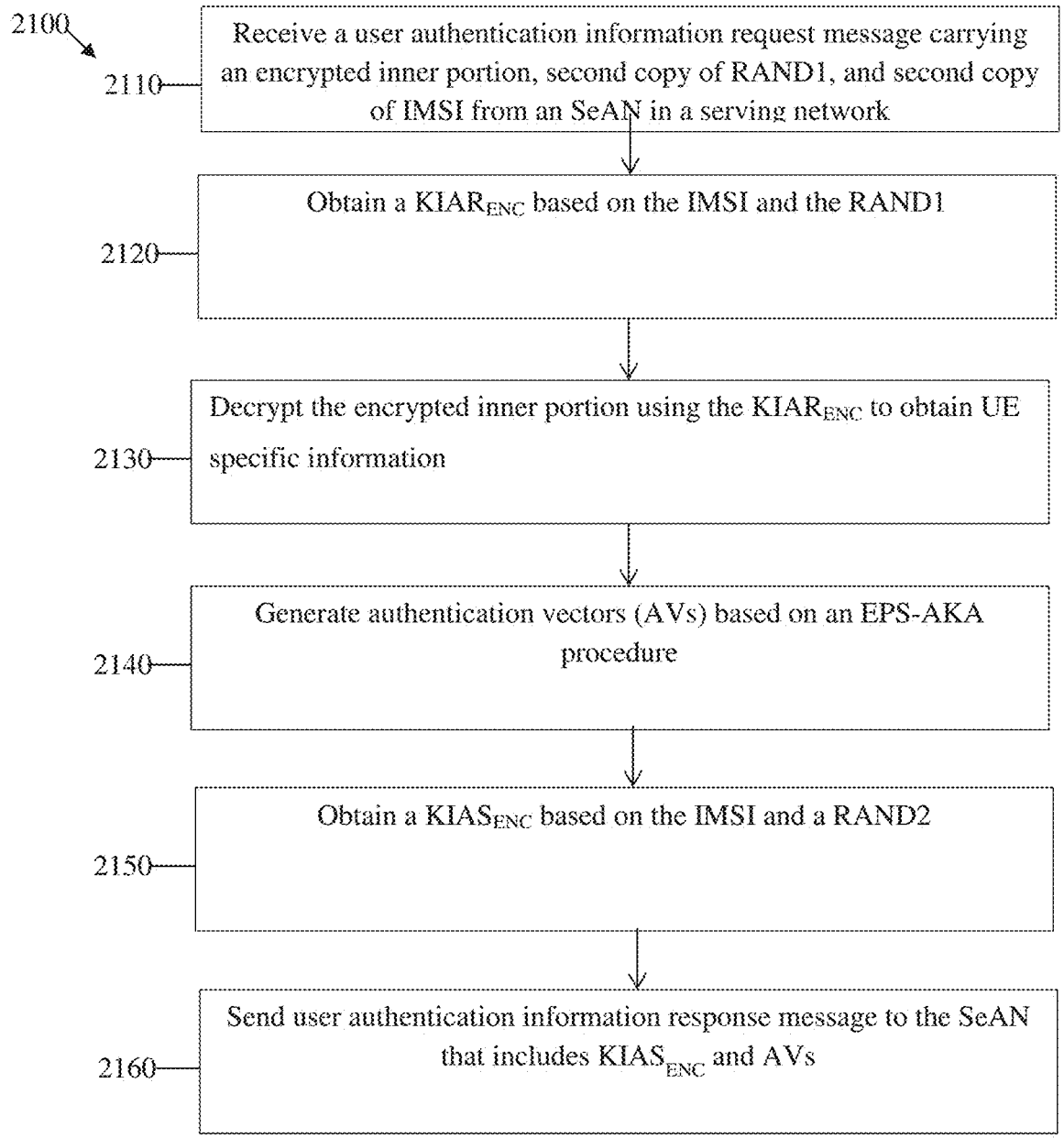
FIG. 21 is a flow chart of an embodiment method for processing an authentication and data request message and generating an authentication and data response message according to a MASA protocol.

FIG. 21 is a flowchart of an embodiment method 2100 for processing an authentication and data request message and generating an authentication and data response message according to a MASA protocol, as may be performed by an HSS. At step 2110, the HSS receives an authentication and data request message from a SeAN in a serving network. The authentication and data request message carries an encrypted inner portion, a second copy of a RAND1, and a second copy of an IMSI. In some embodiments, the authentication and data request message includes a second copy of a RAND2 and/or a second copy of COUNTER.

At step 2120, the HSS obtains a $KIAR_{ENC}$ based on the second copy of the IMSI and the second copy of the RAND1. At step 2130, the HSS decrypts the encrypted inner portion using the $KIAR_{ENC}$ to obtain at least a first copy of the IMSI, a first copy of the RAND1, and a RAND2. In some embodiments, the HSS compares the first copy of the IMSI, RAND1, RAND2, and/or COUNTER with the second copy of the IMSI, RAND1, RAND2, and/or COUNTER (respectively) to verify the integrity of the authentication and data request message.

At step 2140, the HSS generates authentication vectors (AVs) based on an EPS-AKA procedure. At step 2150, the HSS obtains a $KIAS_{ENC}$ based on the IMSI and a RAND2. In some embodiments, steps 2120 and 2150 are performed in parallel such that the second copy of the IMSI, the second copy of the RAND1, and the second copy of the RAND2 are sent from the HSS to the authentication server in the same request message, and the $KIAR_{ENC}$ and $KIAS_{ENC}$ are returned from the authentication server to the HSS in the same response message. At step 2160, the HSS sends an authentication and data response message to the SeAN. The authentication and data response message includes the KIAS$_{ENC}$, the AVs.

In some examples, the UE 215 generates the RAND2, and includes the RAND2 in the IAR message. The RAND2 is then used by the HSS 230 to independently generate the KIAS$_{ENC}$ and/or the KIAS$_{INT}$. In other examples, the HSS 230 independently generates the RAND2, and sends the RAND2 to the authentication server. The authentication server then generates the KIAS$_{INT}$ and/or the KIAR$_{ENC}$ based on the RAND2, the k-key and (in some cases) a COUNTER, and returns the KIAS$_{INT}$ and/or the KIAS$_{ENC}$ to the HSS 230. The HSS 230 then forwards the KIAS$_{INT}$ and/or the KIAS$_{ENC}$ to the SeAN 220, which may use the KIAS$_{ENC}$ and/or the KIAS$_{INT}$ to generate the IAS message. In such an example, the RAND2 and the COUNTER may be sent to the UE 214 via the IAS message, and the UE may use RAND2, the k-key, and the COUNTER to independently compute the KIAS$_{ENC}$ and/or the KIAS$_{INT}$. In an embodiment, a COUNTER is required to be included in an IAS message for purposes of replay protection when the RAND2 is independently generated by the HSS 230.

When a COUNTER is included in an authentication and data request message, the HSS may compare the COUNTER with an independent COUNTER maintained by the HSS to ensure that the COUNTER in the authentication and data request message exceeds the independent COUNTER maintained by the HSS. This may confirm that information in the authentication and data request message is fresh, as well as provide replay protection. Likewise, when a COUNTER is included in an IAS message, the UE may compare the COUNTER with an independent COUNTER maintained by the UE to ensure that the COUNTER in the IAS message exceeds the independent COUNTER maintained by the HSS. This may confirm that information within the IAS message is fresh, as well as provide replay protection.

It should be appreciated that encrypting an IMSI in an IAR message (as well as other messages) using, for example, a KIAR$_{ENC}$, a SNPuK, and/or a HNPuK serves to at least partially conceal the IMSI from malicious third parties.

It should be appreciated that a MAC signature may used to provide integrity protection for the contents of any message described herein.

Figure 22:
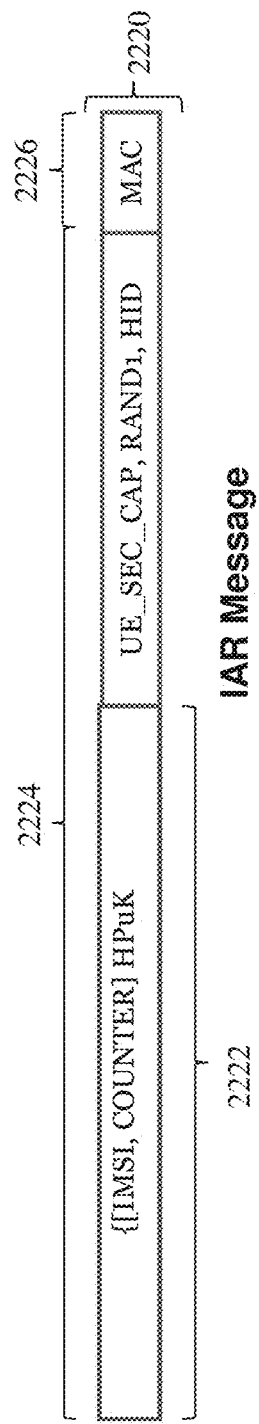
FIG. 22 is a diagram of an embodiment frame formats for an IAR message.

FIG. 22 illustrates a frame formats for an embodiment IAR message 2220. The embodiment IAR message 2220 includes an encrypted inner portion 2222, an outer portion 2224, and a MAC signature 2226. The encrypted inner portion 2222 is formed by encrypting an IMSI and a COUNTER using an HPuK. The outer portion 2224 includes the encrypted inner portion 2222, a UE_SEC_CAP, a RAND1, and an HID. The MAC 2226 is generated by computing a hash of the outer portion 2224 using a KIAR$_{INT}$.

Embodiments of this disclosure provide techniques for securely communicating an IMSI over the air from a UE to an SeAN, as well as for securely validating an unencrypted IMSI that the SeAN receives from the home network, during authentication protocols. In particular, the UE may either encrypt the IMSI assigned to the UE using an IMSI encryption key (K$_{IMSIenc}$) or compute a hash of the IMSI assigned to the UE using an IMSI integrity key (K$_{IMSIint}$), and then send the encrypted IMSI or the hash of the IMSI to the serving network. The encrypted IMSI or hash of the encrypted IMSI may then be used by the SeAN to validate an unencrypted IMSI that was previously received from an HSS in the home network of the UE.

Embodiments techniques for securely communicating an IMSI over the air and/or for securely validating an unencrypted IMSI received from a UE's home network may be compatible with EPS-AKA protocols. FIG. 23 illustrates a protocol diagram of an embodiment communications sequence 2300 for authenticating the UE 215 in a wireless network. As shown, the communications sequence 2300 begins when the SeAN 220 communicates an identity request 2310 to the UE 215. Next, the UE 215 communicates an identity response 2320 to the SeAN 220. The identity response 2320 includes an encrypted IMSI, which was generated by using a HPuK to encrypt an IMSI assigned to the UE 215. The identity response 2320 may also carry other information, such as an HN ID, etc.

Thereafter, the SeAN 220 communicates an authentication and data request 2330 to the HSS 230. The authentication and data request 2330 may include the encrypted IMSI that was carried in the identify response, as well as other parameters, such as a SN ID and network type (NWK type) parameter.

Upon receiving the authentication and data request 2330, the HSS 230 decrypts the encrypted IMSI using an HPrK, computes a response parameter (RES) based on a pre-provisioned key (k_key) of the UE as well as other EPS authentication vectors, and sends an authentication and data response 2335 carrying XRES, an unencrypted IMSI, and the EPS authentication vectors to the SeAN 220.

Upon receiving the authorization data response 2335, the SeAN 220 generates a KSI$_{ASME}$, and sends a user authentication request 2340 carrying the KSI$_{ASME}$, as well as a random number and authentication vector (AUTN), to the UE 215. The UE 215 computes an authentication response (RES) based on the RAND, the AUTN, and a secret key. The secret key may be a priori information to the UE 215. For example, the secret key may be a subscriber-specific master key (k_key) stored in a Universal Subscriber Identity Module (USIM) of the UE 215. The UE 215 may then send a user authentication response 2350 carrying the RES to the SeAN 220. The SeAN 220 may then authenticate the UE 215 by comparing the RES in the user authentication response 2350 received from the UE with the RES in the authorization data response 2335 received from the HSS 230.

Thereafter, the SeAN 220 may communicate a security mode command message 2360 to the UE 215. The security mode command message 2360 may include a serving network public key (SPuK), and may identify an integrity protection algorithm and/or a ciphering algorithm. The UE 215 may use the integrity protection algorithm to verify the integrity of the security mode command message 2360. After verifying the integrity of the security mode command message 2360, the UE 215 may use the ciphering algorithm to derive NAS encryption keys. In one embodiment, the UE encrypt the IMSI assigned to the UE using an IMSI encryption key (K$_{IMSIenc}$) and/or compute a hash of the IMSI assigned to the UE using an IMSI integrity key (K$_{IMSIint}$). The K$_{IMSIenc}$ and/or the K$_{IMSIint}$ may be NAS encryption and/or integrity keys. Alternatively, the K$_{IMSIenc}$ and/or the K$_{IMSIint}$ may be derived from the K$_{ASME}$ carried by the security mode command message 2360. As yet another alternative, the K$_{IMSIenc}$ and/or the K$_{IMSIint}$ may be derived based on a k_key of the UE as well as a COUNTER and RAND carried in the user authentication request 2340. As yet another alternative, the K$_{IMSIenc}$ and/or the K$_{IMSIint}$ may be the SPuK.

The UE 215 then sends the security mode complete message 2370 to the SeAN 220 to verify that the UE 215 validated the security mode command message 2360, and derived the NAS encryption keys. The security mode complete message 2370 may include the encrypted IMSI and/or the hash of the IMSI, which may be used to validate the unencrypted IMSI received from the HSS in order to verify that the home network provided accurate information. This validation step may be required by a legal or governmental agency that has been given authority to track the whereabouts and/or to monitor the communications of a specific user or UE, particularly in situations where the UE's home network is in a foreign country When the security mode complete message 2370 includes the encrypted IMSI, the SeAN 220 may validate the unencrypted IMSI received from the HSS by decrypting the encrypted IMSI received from the UE using a $K_{IMSIenc}$ to obtain a decrypted IMSI, and comparing the unencrypted IMSI received from the HSS with the decrypted IMSI to see if they match, in which case the unencrypted IMSI received from the HSS is validated by the SeAN 220. Alternatively, when the security mode complete message 2370 includes the hash of the IMSI, the SeAN 220 may validate the unencrypted IMSI received from the HSS by computing a hash of the unencrypted IMSI received from the HSS using the $K_{IMSIint}$, and comparing the computed hash with the hash of the IMSI received from the UE to see if they match, in which case the unencrypted IMSI received from the HSS is validated by the SeAN 220.

Figure 23A:
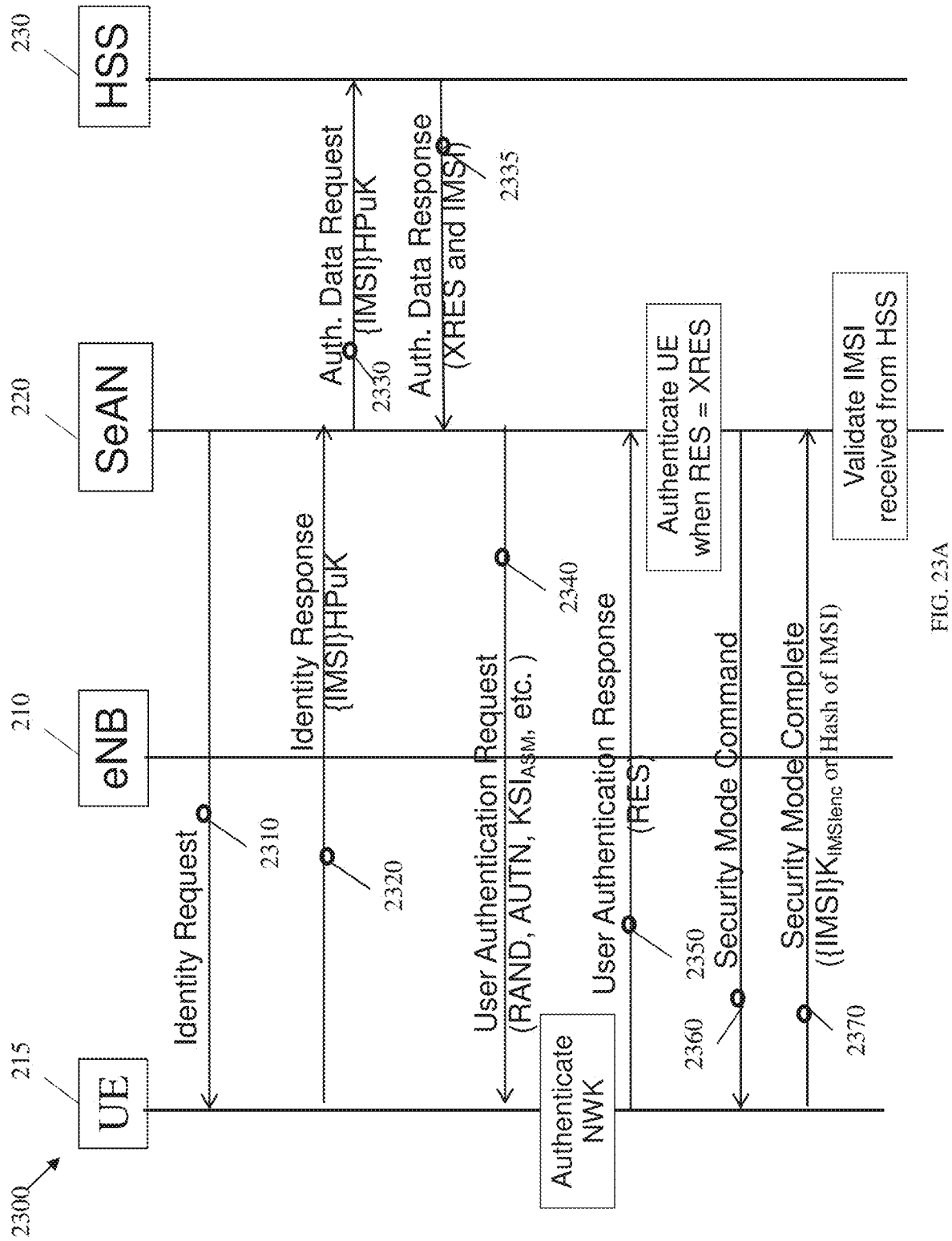
FIGS. 23A-23D are protocol diagrams of yet additional embodiment communications sequences for authenticating a UE in a wireless network.
Figure 23B:
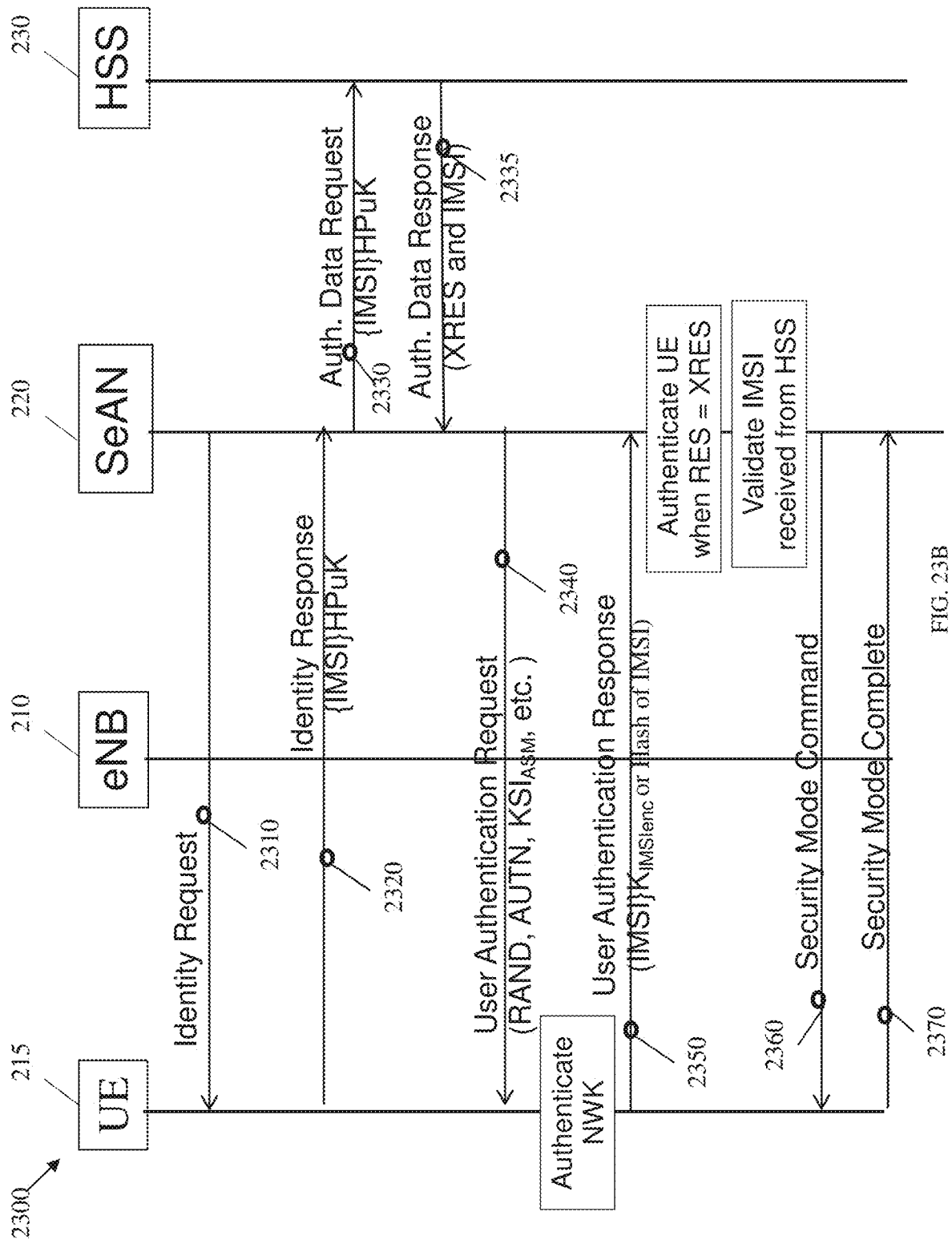
Figure 23C:
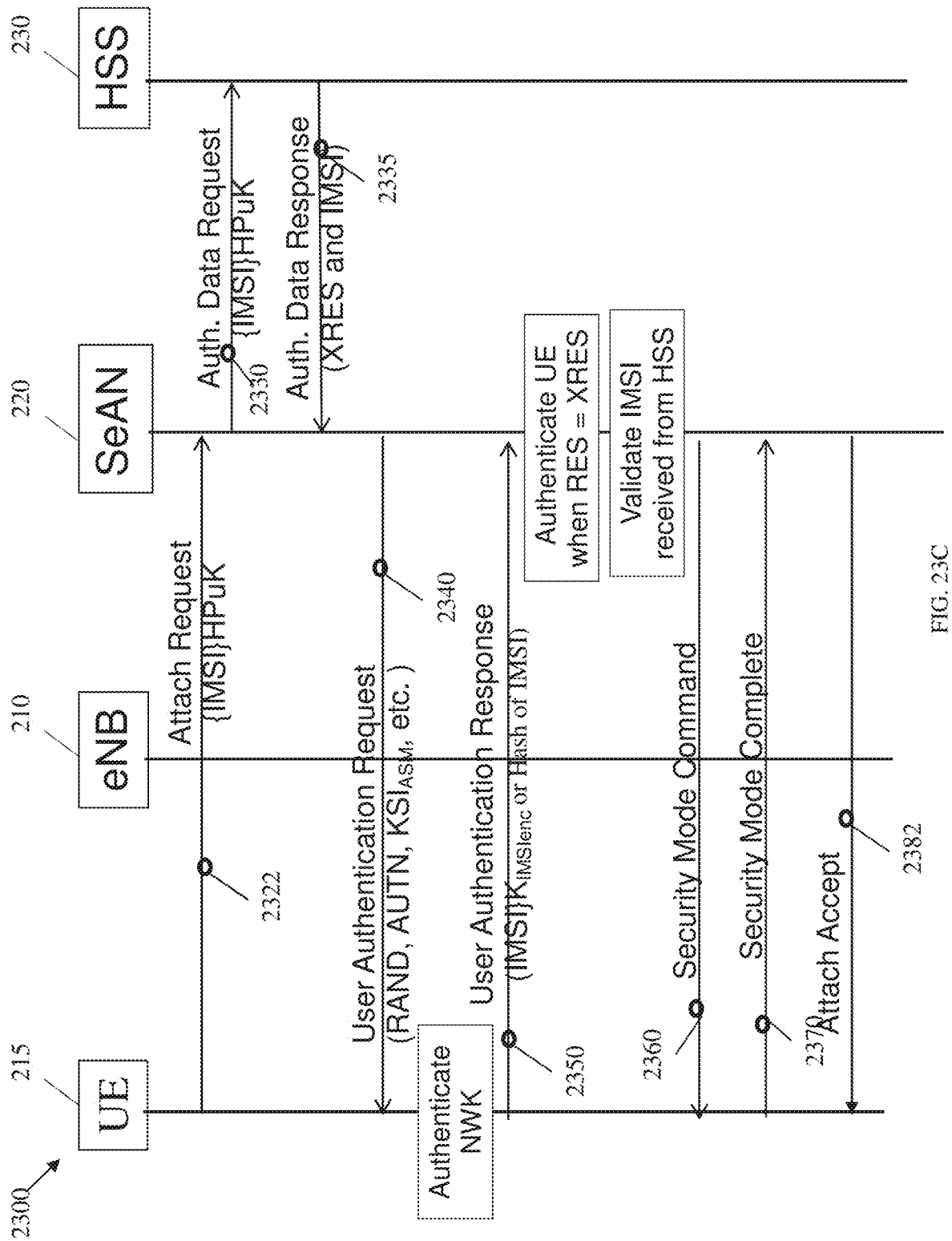
Figure 23D:
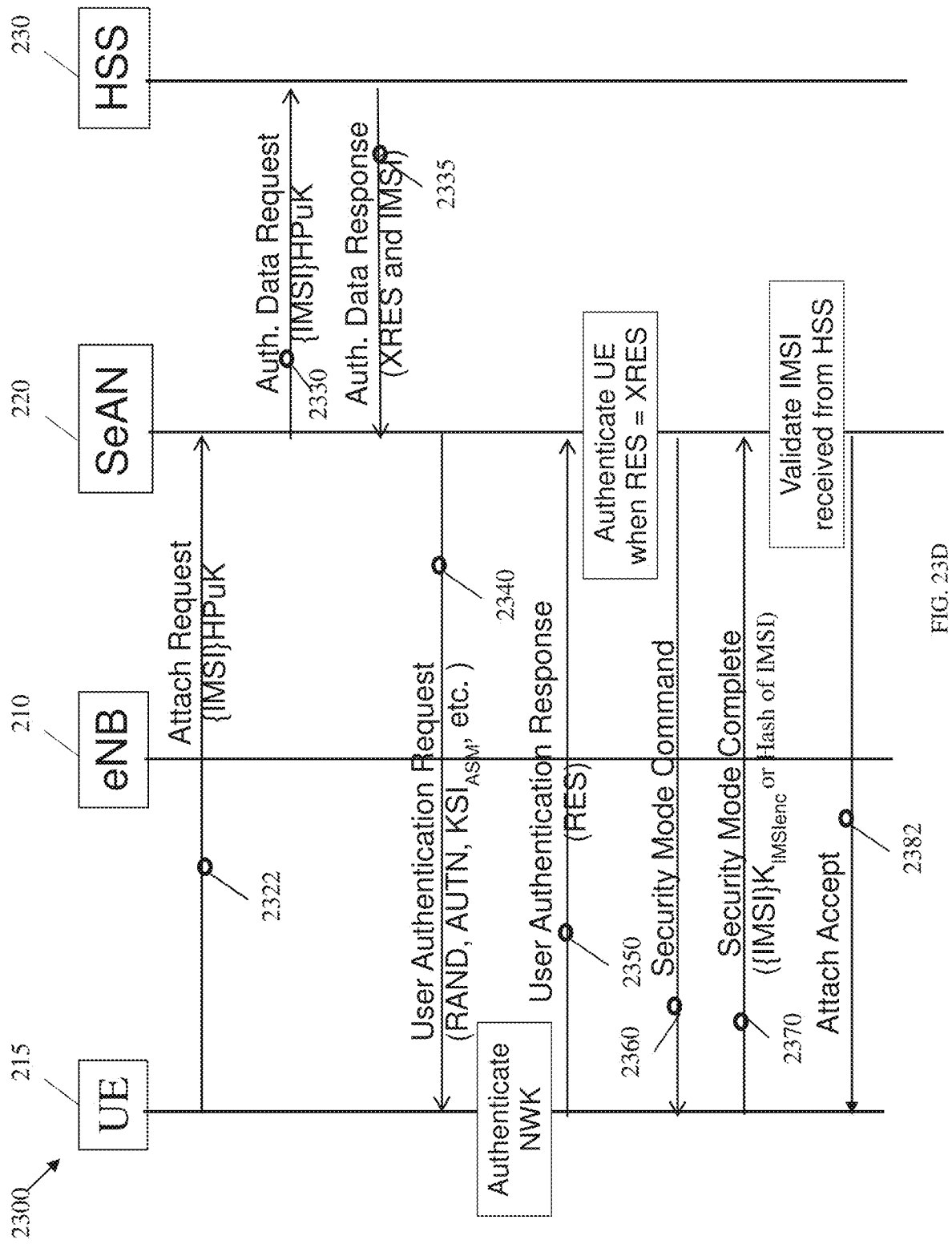

Although FIG. 23A depicts the $K_{IMSIenc}$-encrypted IMSI and/or $K_{IMSIint}$-signed hash of the IMSI being communicated in the security mode complete message 2370, it should be appreciated that other options are also possible. For example, the $K_{IMSIenc}$-encrypted IMSI and/or $K_{IMSIint}$-signed hash of the IMSI may be communicated in the user authentication response 2350 as shown in FIG. 23B. Furthermore, although FIG. 23A depicts the HPuK-encrypted IMSI as being communicated in the identify response 2320, it should be appreciated that the HPuK-encrypted IMSI can be communicated in other messages as well. For example, the HPuK-encrypted IMSI may be communicated in an Attach request 2322 sent from the UE 215 to the SeAN 220 as shown in FIGS. 23C-23D, in which case the SeAN 220 may return an attach accept 2382 at the end of the sequence.

Figure 24:
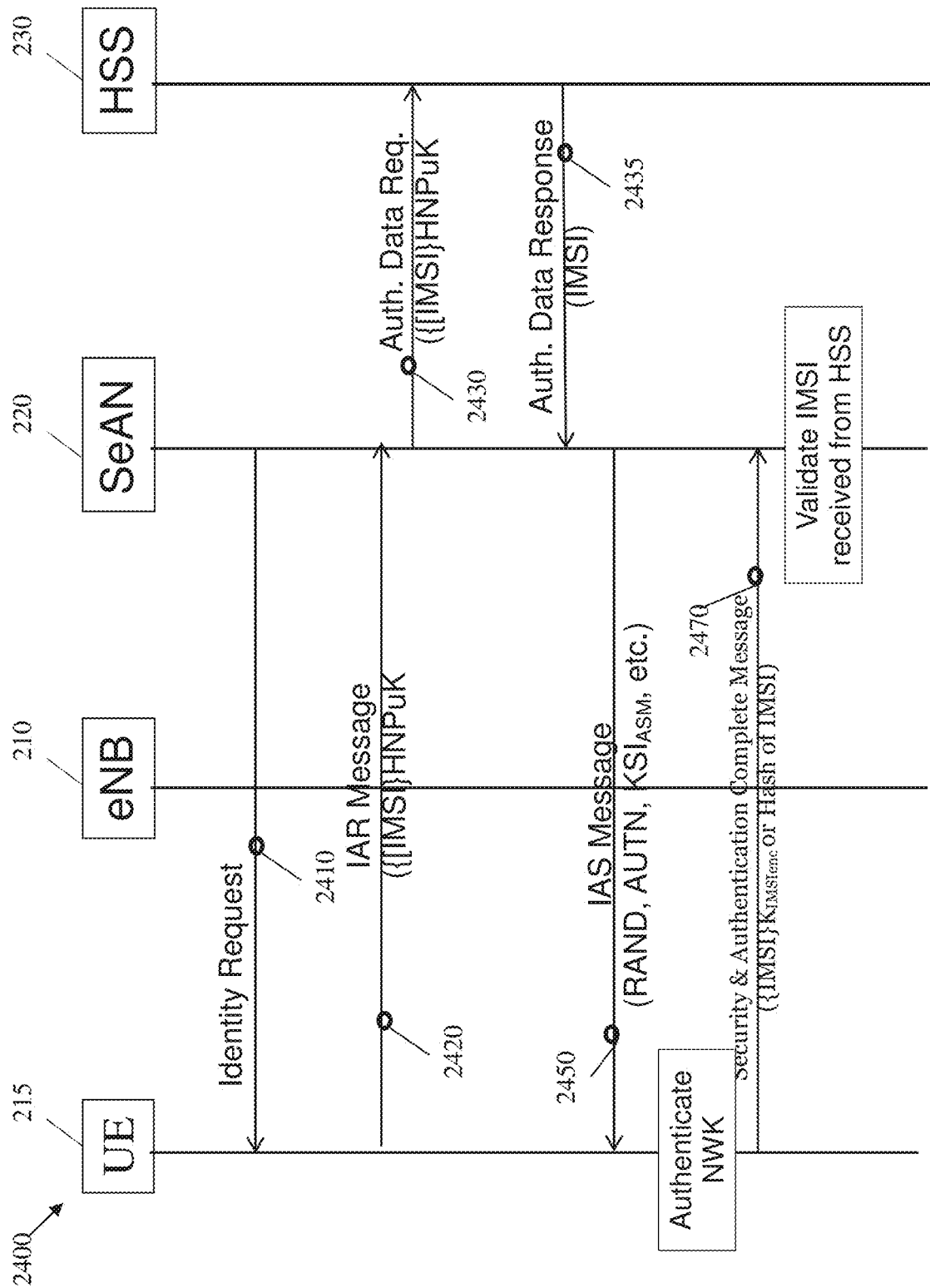
FIG. 24 is a protocol diagram of yet another embodiment communications sequence for authenticating a UE in a wireless network.

FIG. 24 illustrates a protocol diagram of an embodiment communications sequence 2400 for authenticating a UE in a wireless network. As shown, the communications sequence 2400 begins when the SeAN 220 communicates an identity request 2410 to the UE 215. Next, the UE 215 encrypts an IMSI assigned to the UE using an HPuK. Thereafter, the UE 215 sends an IAR message 2420 carrying an encrypted IMSI, which was generated by using a HPuK to encrypt an IMSI assigned to the UE 215. It should be appreciate that the IAR message 2420 may also include some or all of the additional information and/or layers of encryption/integrity protection that are included in any of the other IAR messages described in this document, such as the IAR messages described in conjunction with FIGS. 4, 5, 11, 12, 17, and 18.

Upon receiving the IAR message 2420, the SeAN 220 forwards an authentication and data request message 2430 carrying the encrypted IMSI to the HSS 230. It should be appreciate that the authentication and data request message 2430 may include some or all of the additional information and/or layers of encryption/integrity protection that are included in the corresponding authentication and data request messages described in conjunction with FIGS. 4, 5, 11, 12, 17, and 18.

Upon receiving the authentication and data request message 2430, the HSS 230 may decrypt the encrypted IMSI, and sends an authentication and data response message 2435 carrying an unencrypted version of the IMSI to the SeAN 220. It should be appreciated that the HSS 230 may also compute other parameters (e.g., EPS authentication vectors, encryption/integrity keys, etc.) upon receiving the authentication and data request message 2430 from the SeAN 220, and that the authentication and data request message 2430 may include some or all of the information carried by the corresponding authentication and data request messages described in conjunction with FIGS. 4, 5, 11, 12, 17, and 18.

Subsequently, the SeAN 220 may send an IAS message 2450 to the UE 215. The IAS message 2450 may include some or all of the information carried by the corresponding IAS messages described in conjunction with FIGS. 4, 5, 11, 12, 17, and 18.

Upon receiving the IAS message 2450, the UE 215 may authenticate the network based on information included in the IAS message 2450. The UE 215 may then encrypt the IMSI assigned to the UE using an IMSI encryption key ($K_{IMSIenc}$) and/or compute a hash of the IMSI assigned to the UE using an IMSI integrity key ($K_{IMSIint}$), and send a security and authentication complete message 2470 that includes the encrypted IMSI or hash of the IMSI to the SeAN 220. The SeAN 220 may then validate the unencrypted IMSI received from the HSS based on the unencrypted IMSI and/or hash of the IMSI received from the UE using the $K_{IMSIenc}$ and/or the $K_{IMSIint}$. It should be appreciated that the security and authentication complete message 2470 may include some or all of the information and/or additional layers of encryption/integrity protection included in the corresponding security and authentication complete messages described in conjunction with FIGS. 4, 5, 11, 12, 17, and 18.

Figure 25:
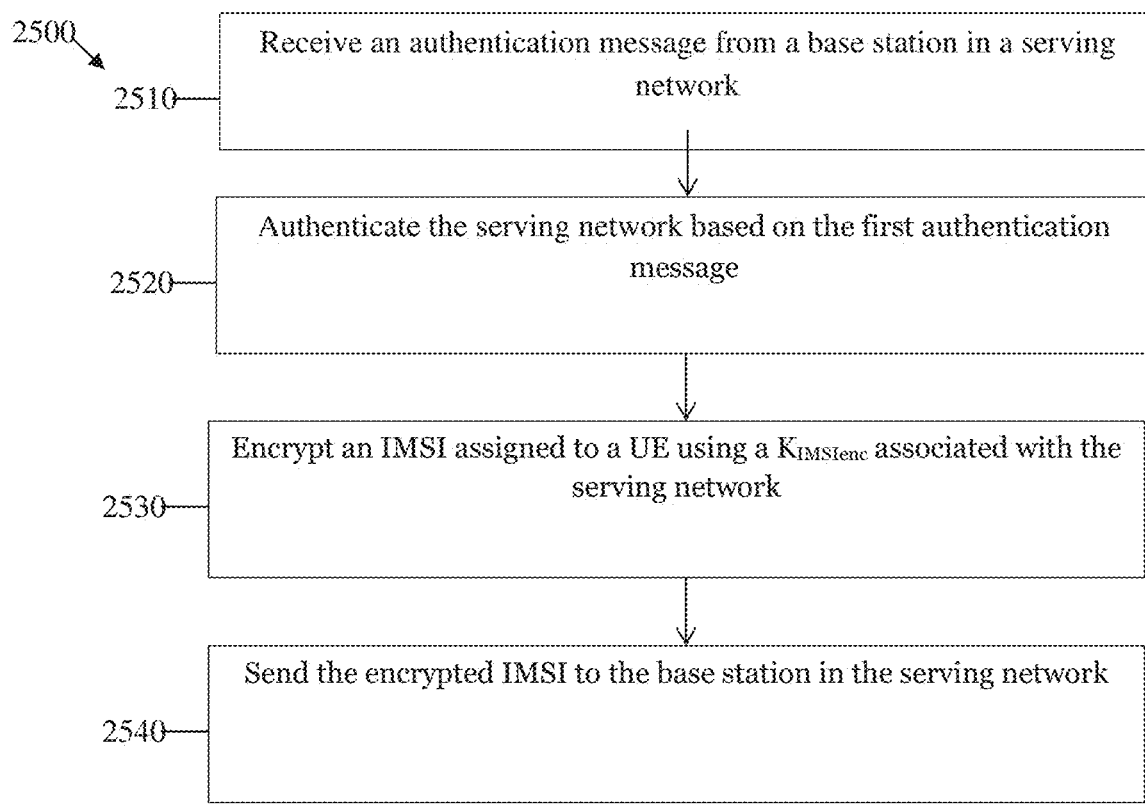
FIG. 25 is a flowchart of an embodiment method for securely transmitting an IMSI to a serving network.

FIG. 25 is a flowchart of an embodiment method 2500 for securely transmitting an IMSI to a serving network, as may be performed by a UE. At step 2510, the UE receives an authentication message from a base station in a serving network. At step 2520, the UE authenticates the serving network based on the first authentication message. At step 2530, the UE encrypts an IMSI assigned to the UE using a $K_{IMSIenc}$ associated with the serving network. At step 2540, the UE sends the encrypted IMSI to the base station in the serving network.

Figure 26:
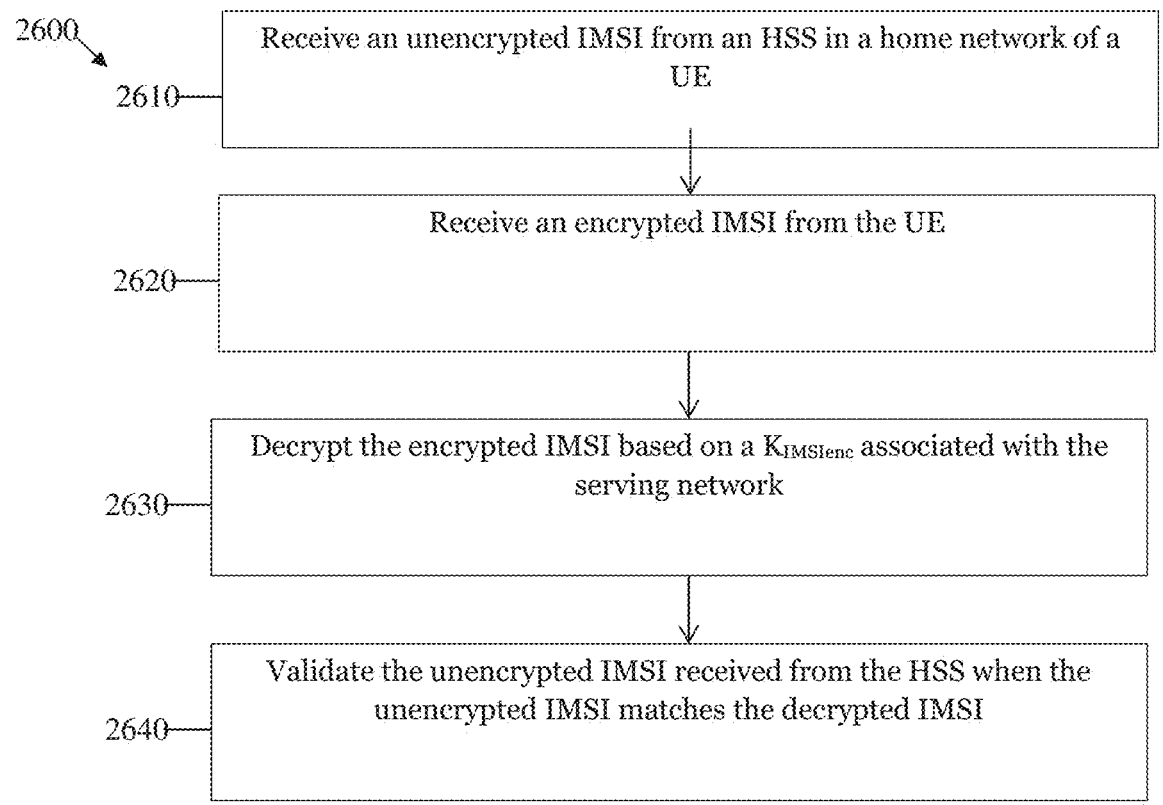
FIG. 26 is a flowchart of an embodiment method for securely validating an unencrypted IMSI received from a home network of a UE.

FIG. 26 is a flowchart of an embodiment method 2600 for securely validating an unencrypted IMSI received from a home network of a UE, as may be performed by an SeAN. At step 2610, the SeAN receives an unencrypted IMSI from an HSS in a home network of a UE. At step 2620, the SeAN receives an encrypted IMSI from the UE. At step 2630, the SeAN decrypts the encrypted IMSI based on a $K_{IMSIenc}$ associated with the serving network. At step 2640, the SeAN validates the unencrypted IMSI received from the HSS when the unencrypted IMSI matches the decrypted IMSI.

Figure 27:
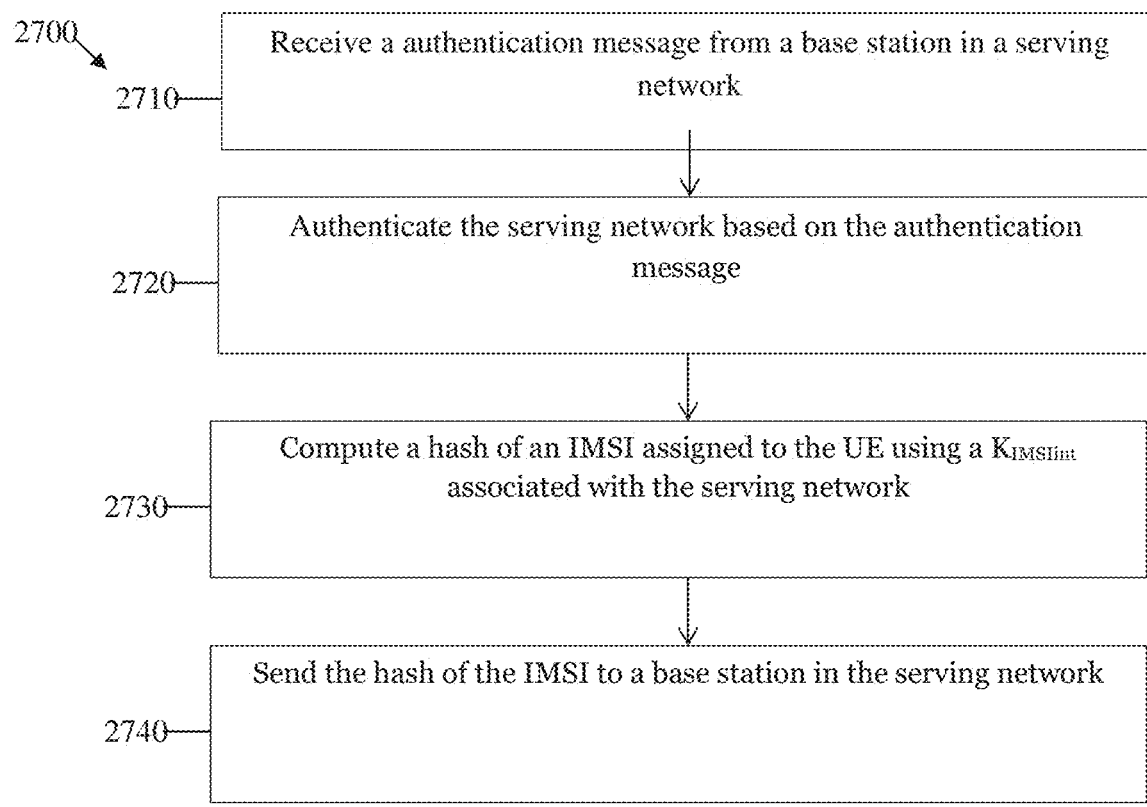
FIG. 27 is a flowchart of another embodiment method for securely transmitting an IMSI to a serving network.

FIG. 27 is a flowchart of an embodiment method 2700 for securely transmitting an IMSI to a serving network, as may be performed by a UE. At step 2710, the UE receives an authentication message from a base station in a serving network. At step 2720, the UE authenticates the serving network based on the authentication message. At step 2730, the UE computes a hash of an IMSI assigned to the UE using a $K_{IMSIint}$ associated with the serving network. At step 2740, the UE sends the hash of an IMSI to the base station in the serving network.

Figure 28:
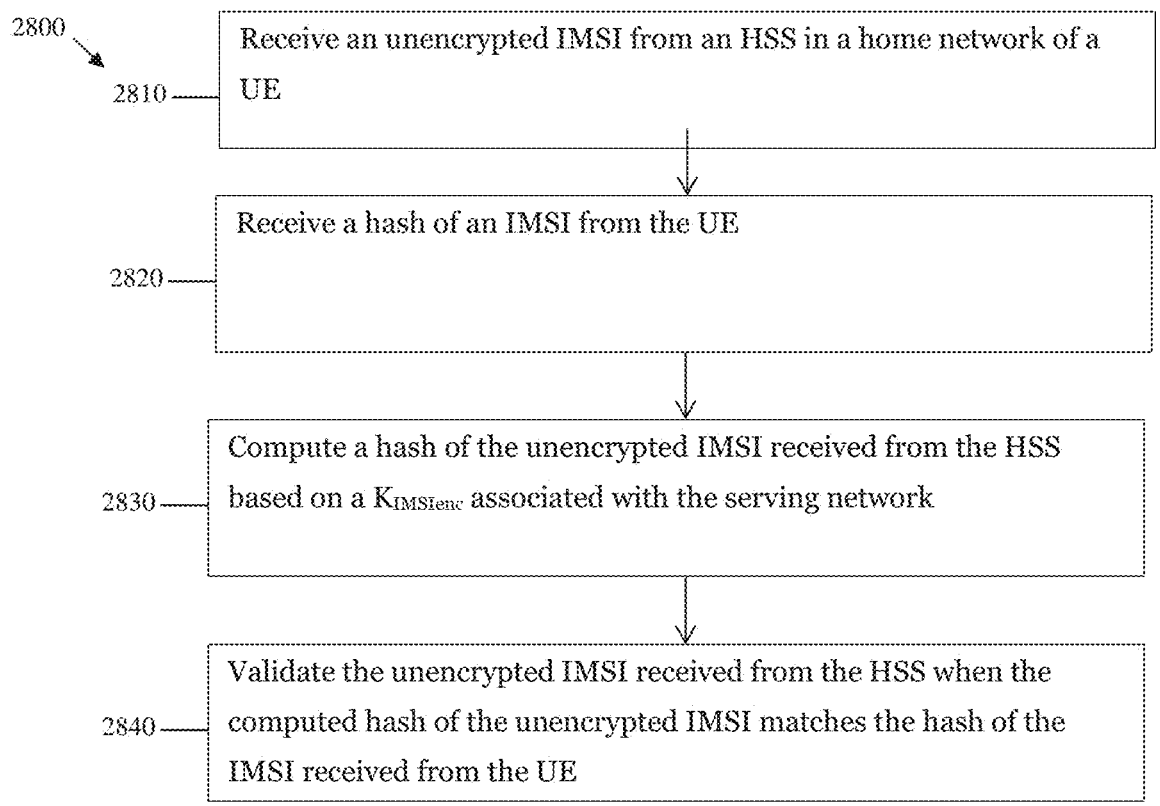
FIG. 28 is a flowchart of another embodiment method for securely validating an unencrypted IMSI received from a home network of a UE.

FIG. 28 is a flowchart of an embodiment method 2800 for securely validating an unencrypted IMSI received from a home network of a UE, as may be performed by an SeAN. At step 2810, the SeAN receives an unencrypted IMSI from an HSS in a home network of a UE. At step 2820, the SeAN receives a hash of an IMSI from the UE. At step 2830, the SeAN computes a hash of the unencrypted IMSI received from the HSS based on a $K_{IMSIint}$ associated with the serving network. At step 2840, the SeAN validates the unencrypted IMSI received from the HSS when the computed hash of the unencrypted IMSI matches the hash of the IMSI received from the UE.

Embodiments of this disclosure utilize an IAR_resend flag to trigger re-transmission of an IAR message carrying a $K_{IMSIenc}$-encrypted IMSI or a $K_{IMSIint}$-signed hash of the IMSI following the earlier transmission of an IAR message carrying an HPuK-encrypted IMSI.

Figure 29A:
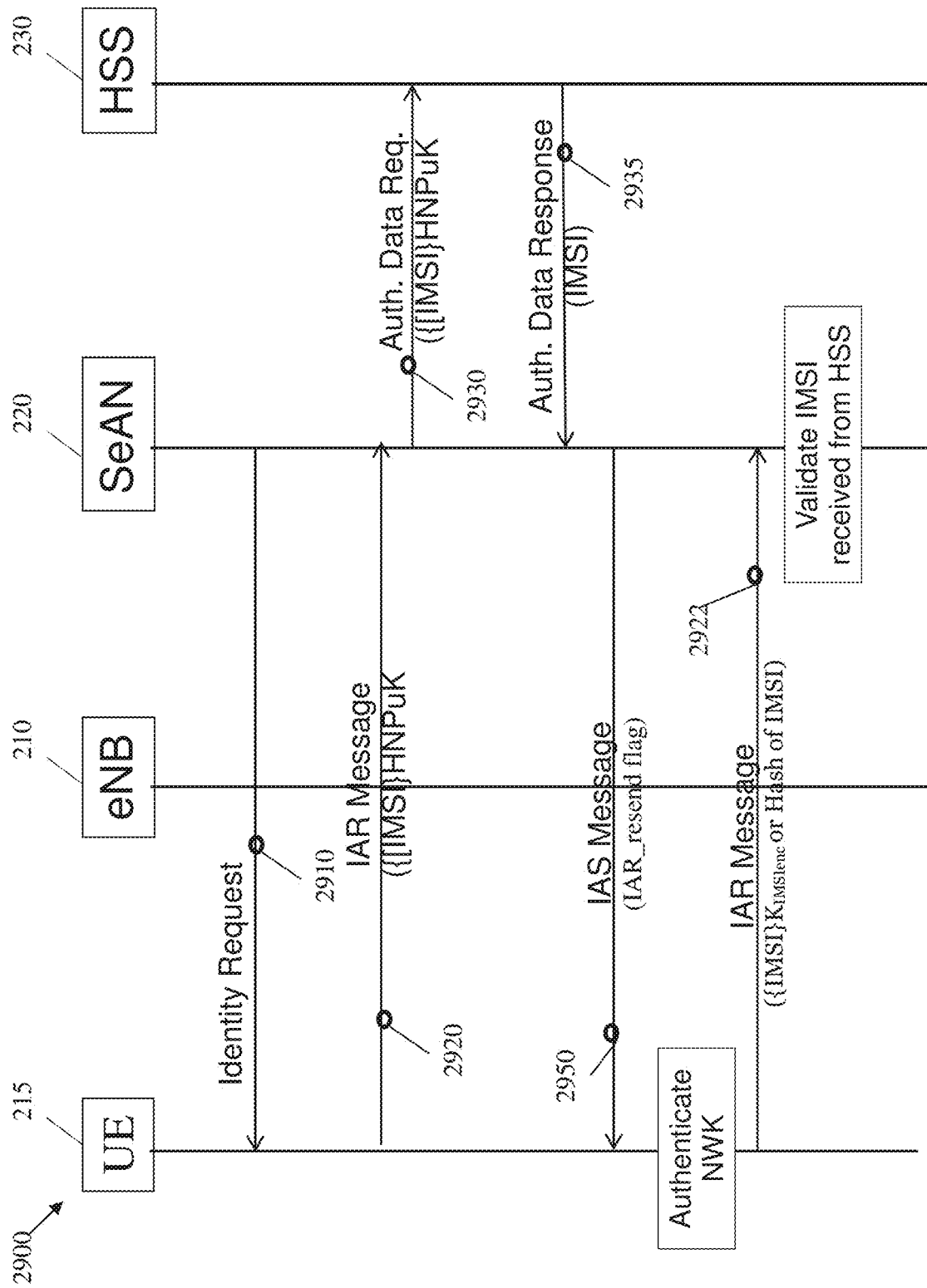
FIG. 29A-B are protocol diagrams of yet additional embodiment communications sequence for authenticating a UE in a wireless network.

FIG. 29A illustrates a protocol diagram of an embodiment communications sequence 2900 for using an IAR_resend flag to trigger re-transmission of an IAR message carrying a $K_{IMSIenc}$-encrypted IMSI or a $K_{IMSIint}$-signed hash of an IMSI by a UE. The identity request message 2910, the IAR message 2920, and the authentication and data request message 2930 may be similar to the identity request message 2410, the IAR message 2420, and the authentication and data request message 2430 in conjunction with FIG. 24.

Figure 29B:
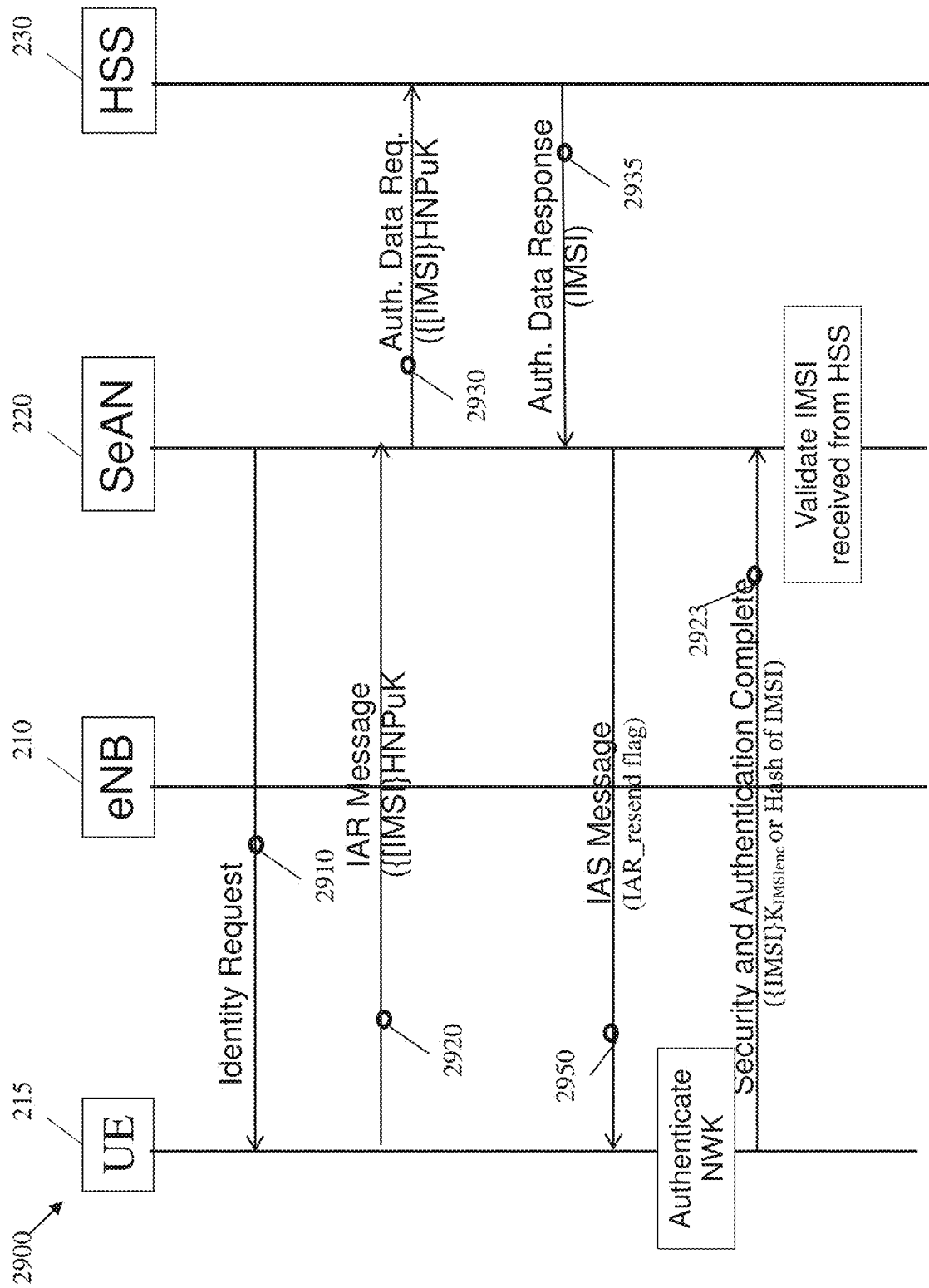

Upon receiving the authentication and data request message 2930, the SeAN 220 sends an IAS message 2950 that includes an IAR_resend flag to the UE 215. The IAR_resend flag may instruct the UE 215 to send a second IAR message 2922 that includes an $K_{IMSIenc}$-encrypted IMSI or a $K_{IMSIint}$-signed hash of an IMSI following authentication of the network. Alternatively, the IAR_resend flag may instruct the UE 215 to send an $K_{IMSIint}$-encrypted IMSI or an $K_{IMSIint}$-signed hash of the IMSI in an Authentication and Security Complete message 2923 following authentication of the network as shown in FIG. 29B.

Accordingly, upon receiving the IAS message 2950, the UE 215 may authenticate the network based on information included in the IAS message 2950, and then either encrypt an IMSI assigned to the UE using a SPuK to obtain an $K_{IMSIenc}$-encrypted IMSI or compute a hash of the IMSI using the $K_{IMSIint}$ to obtain a hash of the IMSI, as well as send the IAS message 2922 carrying the $K_{IMSIenc}$-encrypted IMSI or the $K_{IMSIint}$-signed hash of the IMSI to the SeAN 220. It should be appreciate that the IAS message 2950 and the IAR message 2922 may include some or all of the additional information and/or layers of encryption/integrity protection that are included in the respective IAS message 2450 and IAR message 2420 described in conjunction with FIG. 24.

Upon receiving the IAR message 2922, the SeAN 220 may validate the unencrypted IMSI received from the HSS based on the $K_{IMSIenc}$-encrypted IMSI or the $K_{IMSIint}$-signed hash of the IMSI carried in the IAR message 2922. Although the $K_{IMSIenc}$-encrypted IMSI or the $K_{IMSIint}$-signed hash of the IMSI are described as being generated using the SPuK, it should be appreciated that the encrypted IMSI and/or computed hash of the IMSI carried by the IAR message 2922 may be generated using any type of $K_{IMSIenc}$ or $K_{IMSIint}$ that is associated with the serving network.

Figure 30:
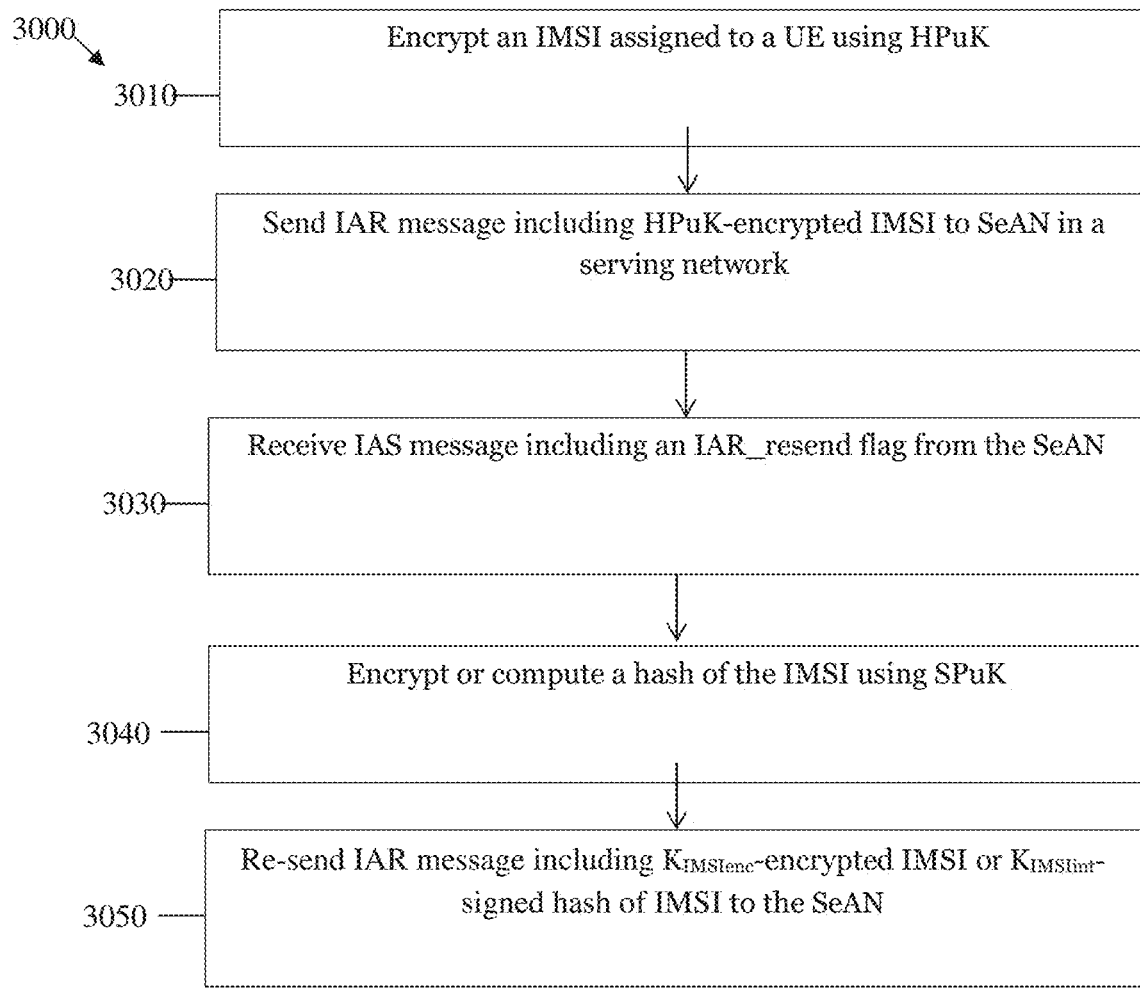
FIG. 30 is a protocol diagram of yet another embodiment communications sequence for authenticating a UE in a wireless network.

FIG. 30 is a flowchart of an embodiment method 3000 for securely transmitting an IMSI to a serving network, as may be performed by a UE. At step 3010, the UE encrypts an IMSI assigned to a UE using HPuK. At step 3110, the UE sends an IAR message that includes the HPuK-encrypted IMSI to a SeAN in a serving network. At step 3030, the UE receives an IAS message including an IAR_resend flag from the SeAN. At step 3040, the UE encrypts or computes a hash of the IMSI using a $K_{IMSIint}$ of the serving network. At step 3050, the UE re-sends an IAR message that includes the $K_{IMSIenc}$-encrypted IMSI or the $K_{IMSIint}$-signed hash of the IMSI to the SeAN.

Figure 31:
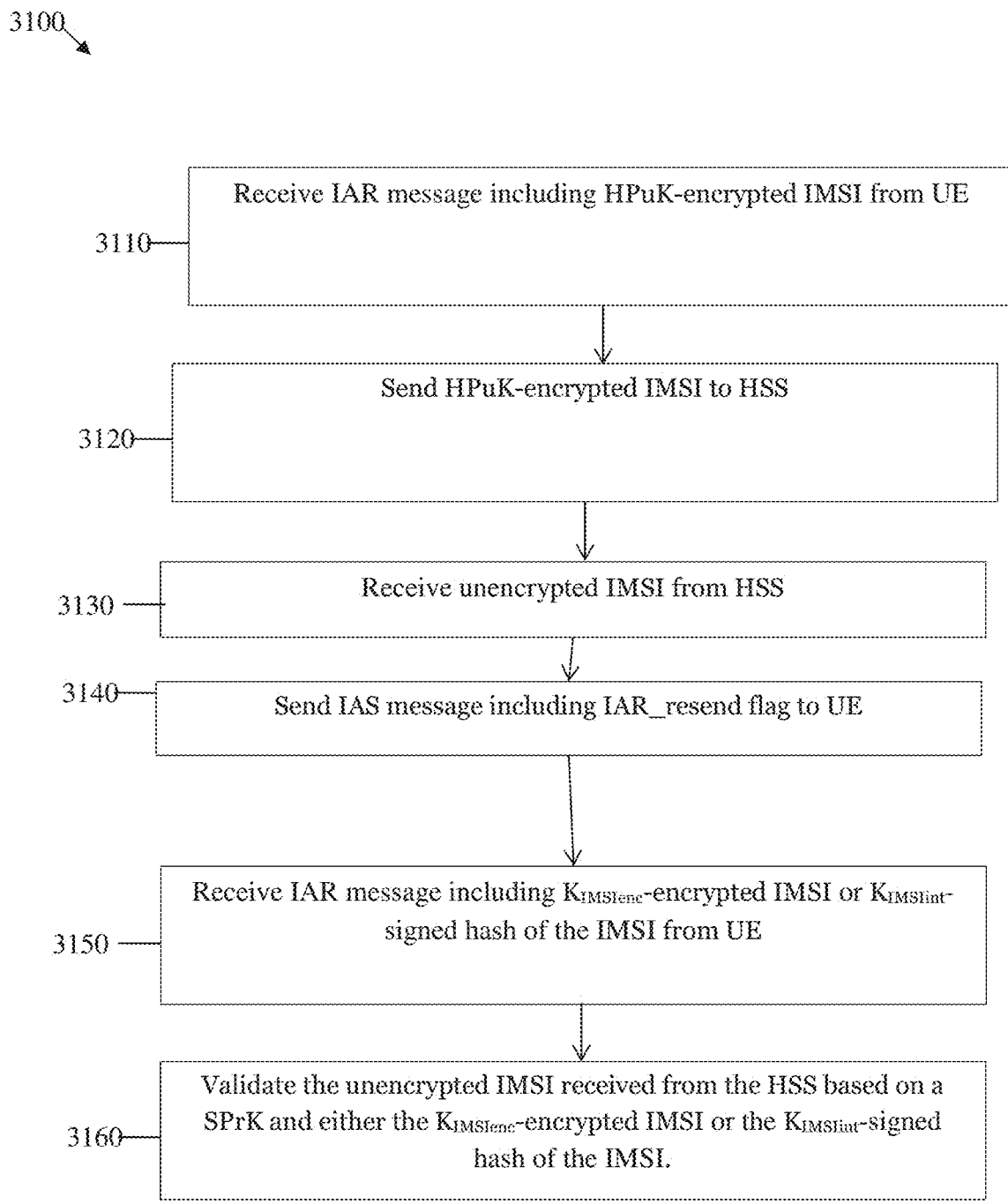
FIG. 31 is a flowchart of another embodiment method for securely validating an unencrypted IMSI received from a home network of a UE.

FIG. 31 is a flowchart of an embodiment method 3100 for securely validating an unencrypted IMSI received from a home network of a UE, as may be performed by an SeAN. At step 3110, the SeAN receives an IAR message that includes the HPuK-encrypted IMSI from a UE. At step 3120, the SeAN sends the HPuK-encrypted IMSI to HSS At step 3130, the SeAN receives an unencrypted IMSI from the HSS. At step 3140, the SeAN sends an IAS message including an IAR_resend flag to the UE. At step 3150, the SeAN receives an IAR message including a $K_{IMSIenc}$-encrypted IMSI or a $K_{IMSIint}$-signed hash of the IMSI from UE. At step 3150, the SeAN validates the unencrypted IMSI received from the HSS based on a SPrK and either the $K_{IMSIenc}$-encrypted IMSI or the $K_{IMSIint}$-signed hash of the IMSI.

Figure 32:
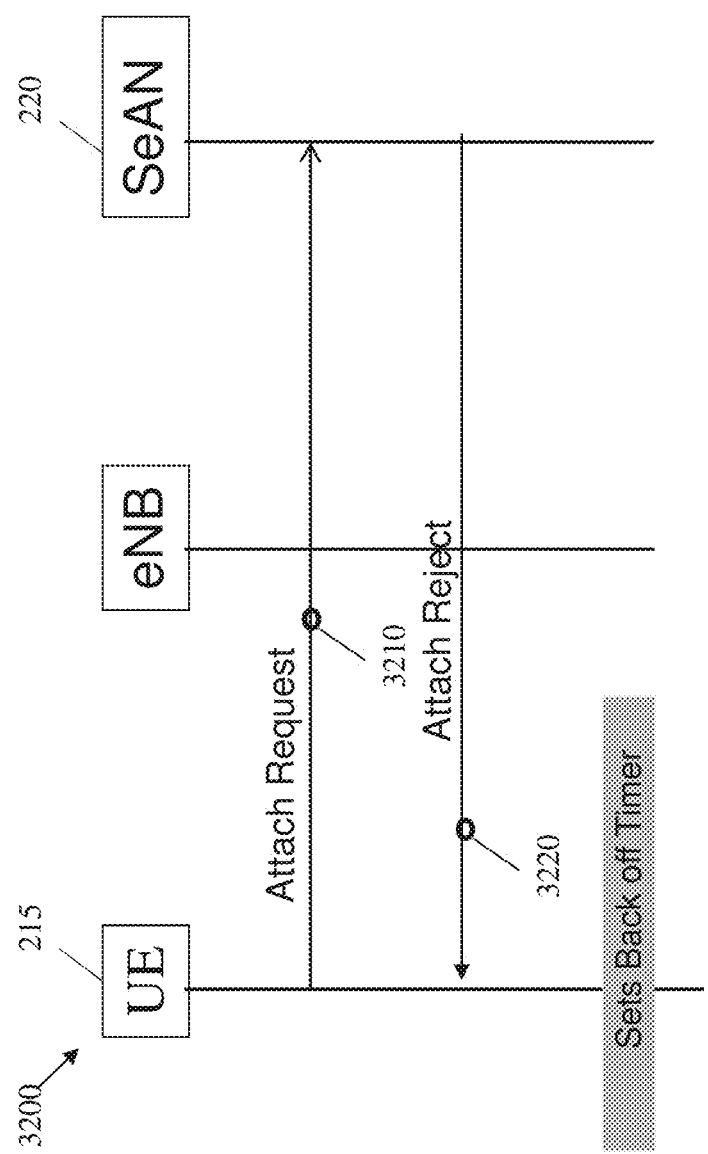
FIG. 32 is a diagram of a communications sequence in which a UE unsuccessfully attempts to attach to a wireless network.

Denial of service attacks can occur when a Man in the Middle (MITM) intercepts an attach request from a UE, and returns an attach reject to the UE because the attach reject may generally prompt the UE to set a back time, which may be referred to as off timer. Embodiments of this disclosure mitigate the likelihood that a MITM will use an attach reject message to perform a denial of service attack by signing the attach reject message with a SPrK. FIG. 32 is a diagram of a communications sequence 3200 in which a UE unsuccessfully attempts to attach to a wireless network. In this example, the UE 215 sends an attach request 3210 to an SeAN 220, who is unable to authenticate the UE 215, and returns an attach reject 3220 to the UE 215. The attach reject 3220 prompts the UE 215 to set a back off timer, and the UE 215 is unable to initiate mobility management signaling prior to expiration of the back-off timer.

Figure 33:
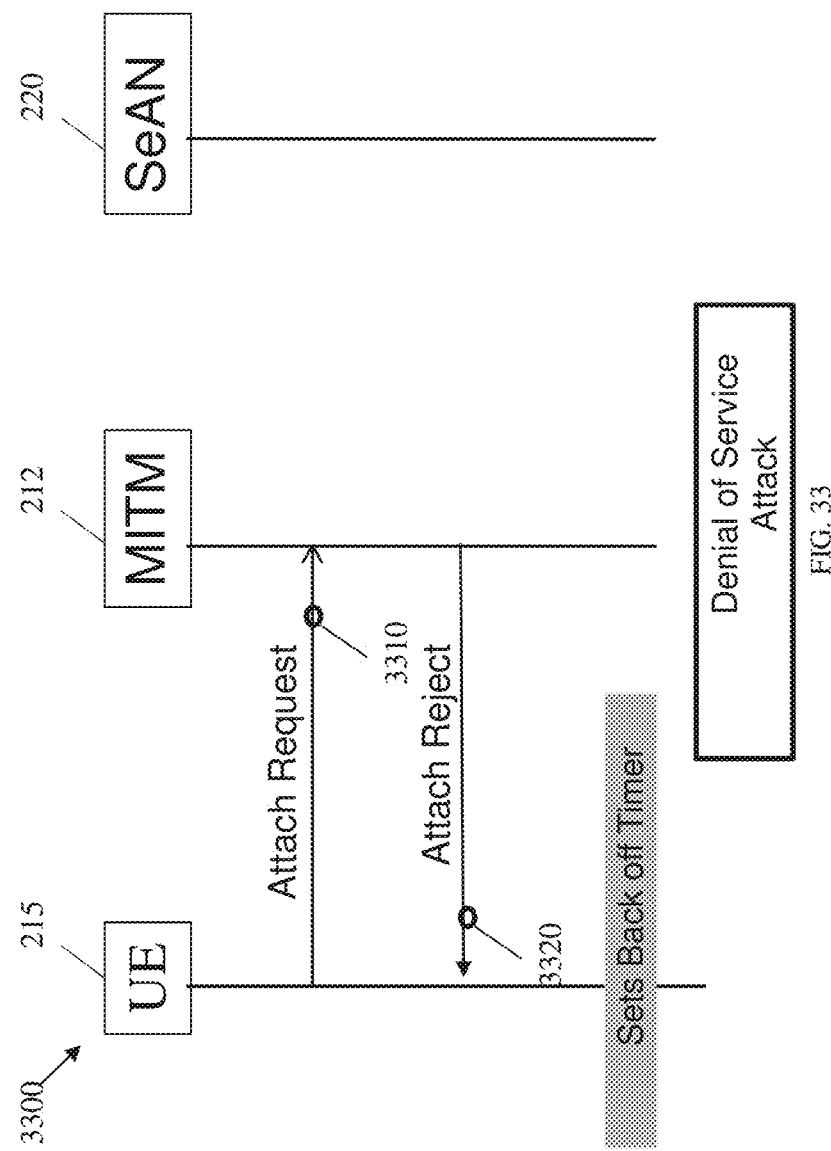
FIG. 33 is a diagram of a communications sequence in which a MITM uses an attach reject message to wage a denial of service attack on a UE.

As mentioned above, attach reject messages can be exploited by a MITM to wage a denial of service attack on a UE. FIG. 33 is a diagram of a communications sequence 3300 in which a MITM uses an attach reject message to wage a denial of service attack on a UE. In this example, the UE 215 sends an attach request 3310 that is intercepted by a MITM 212, which may be a fake base station (e.g., a malicious third-party posing as a base station). The MITM launches a denial of service attack by sending an attach reject 3320 to the UE 215. The attach reject 3320 indicates that the UE 215 could not be authenticated by the network, and prompts the UE 215 to set a back off timer, which may prevent the UE 215 from attempting to access another valid base station for a period of time (e.g., 24 hours, etc.).

Embodiments of this disclosure prevent, or at least inhibit, these types of attacks by requiring that a UE validate a received attach reject message prior to setting a back off timer. The attach reject message may be validated based on a MAC signature carried by the attach reject message.

Figure 34:
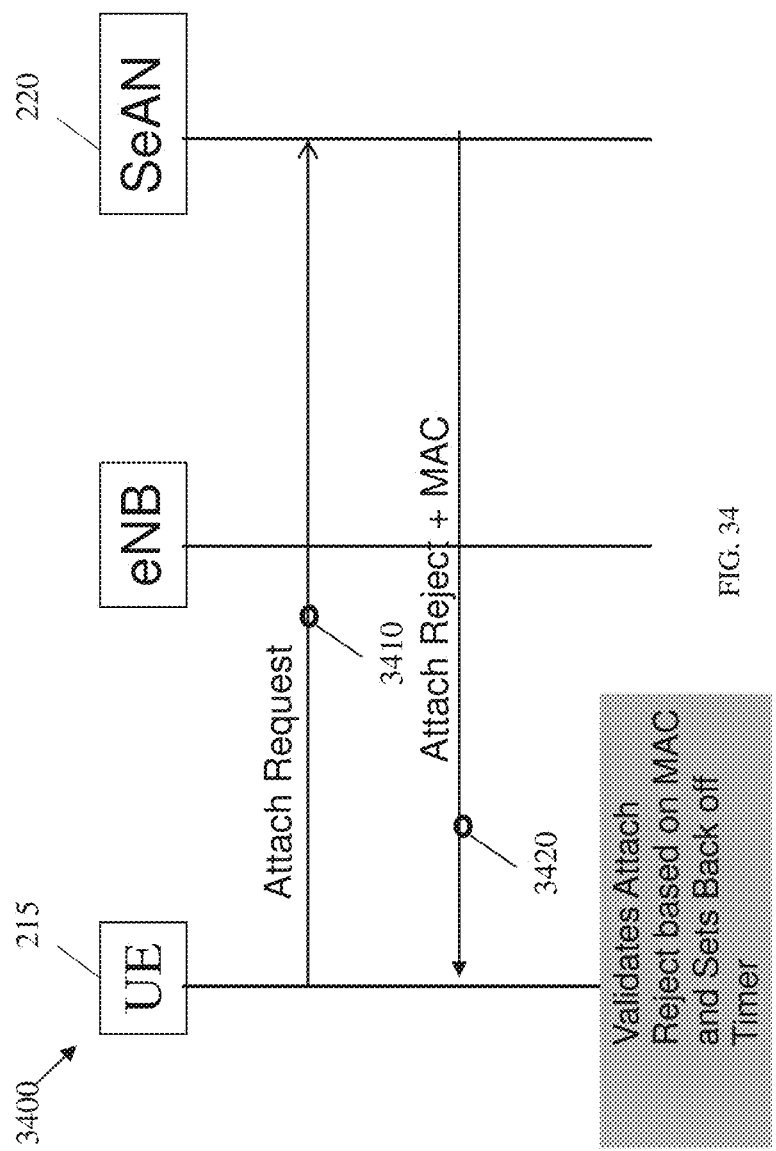
FIG. 34 is a diagram of a communications sequence in which a UE unsuccessfully attempts to attach to a wireless network.

FIG. 34 is a diagram of a communications sequence 3400 in which a UE unsuccessfully attempts to attach to a wireless network. Similar to the communications sequence 3200, the UE 215 sends an attach request 3410 to the SeAN 220, who is unable to authenticate the UE 215, and returns an attach reject 3420 to the UE 215 that indicates that the UE 215 could not be authenticated by the network. However, unlike the attach reject 3220, the attach reject 3420 includes a MAC signature, which is generated by the SeAN by computing a hash function of information carried by the attach reject message 3420 using a SPrK associated with the underlying serving network. Upon reception, the UE 215 attempts to validate the attach reject 3420 by processing the MAC signature according to a SPuK assigned to the serving network. The SPrK and the SPuK form a public-private key pair such that processing of a MAC signature using the SPuK will only result in successful validation of the attach reject 3420 if the MAC signature was generated using the SPrK. Because the MAC signature carried by the attach reject 3420 was generated using the SPrK, the UE 215 will determine that the attach reject 3420 is valid, and will set a back-off timer.

Figure 35:
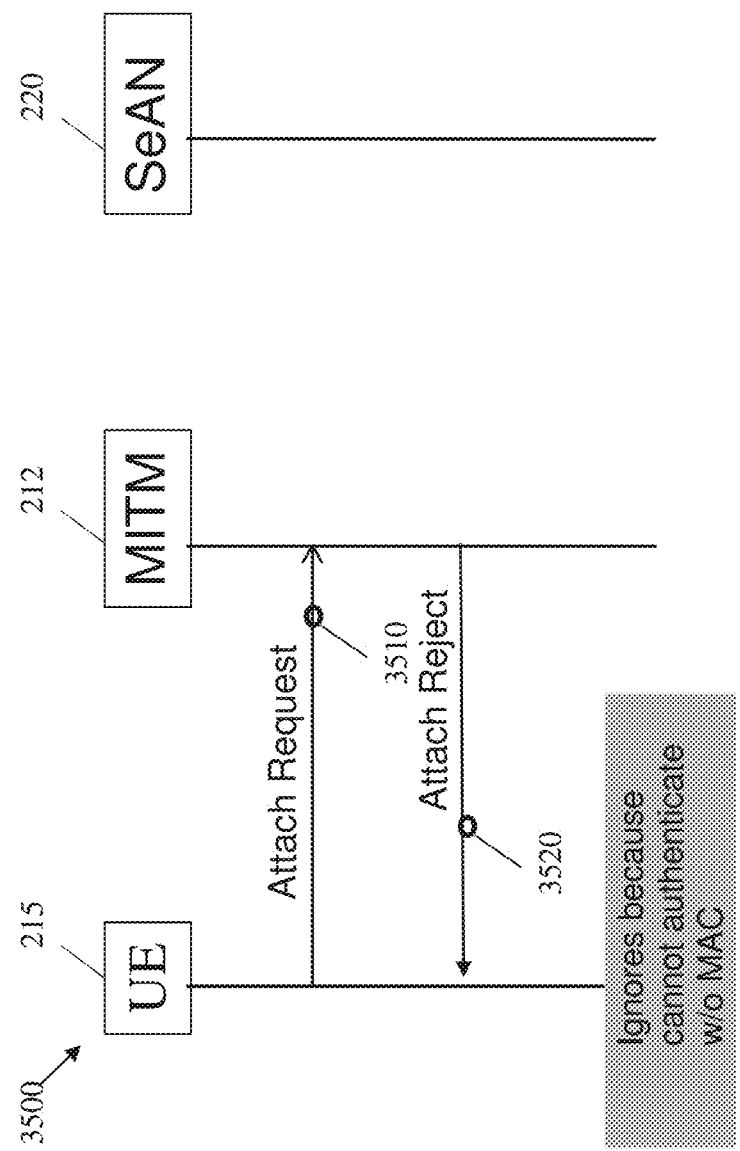
FIG. 35 is a diagram of a communications sequence in which a MITM unsuccessfully attempts to use an attach reject message to wage a denial of service attack.

Requiring validation of attach reject messages using MAC signatures may significantly reduce the likelihood of a MITM waging a successful denial of service attack. FIG. 35 is a diagram of a communications sequence 3500 in which a MITM unsuccessfully attempts to use an attach reject message to wage a denial of service attack. In this example, the UE 215 sends an attach request 3510 that is intercepted by a MITM 212. The MITM 212 attempts a denial of service attack by sending an attach reject 3520 to the UE 215. However, because the MITM 212 does not have access to the SPrK, the MITM 212 is unable to generate a MAC signature that will result in a positive validation if processed using the SPuK of the attach reject 3520. As a result, the UE 215 ignores the attach reject 3520, instead of setting a backoff timer, thereby thwarting the MITM's denial of service attack.

Figure 36:
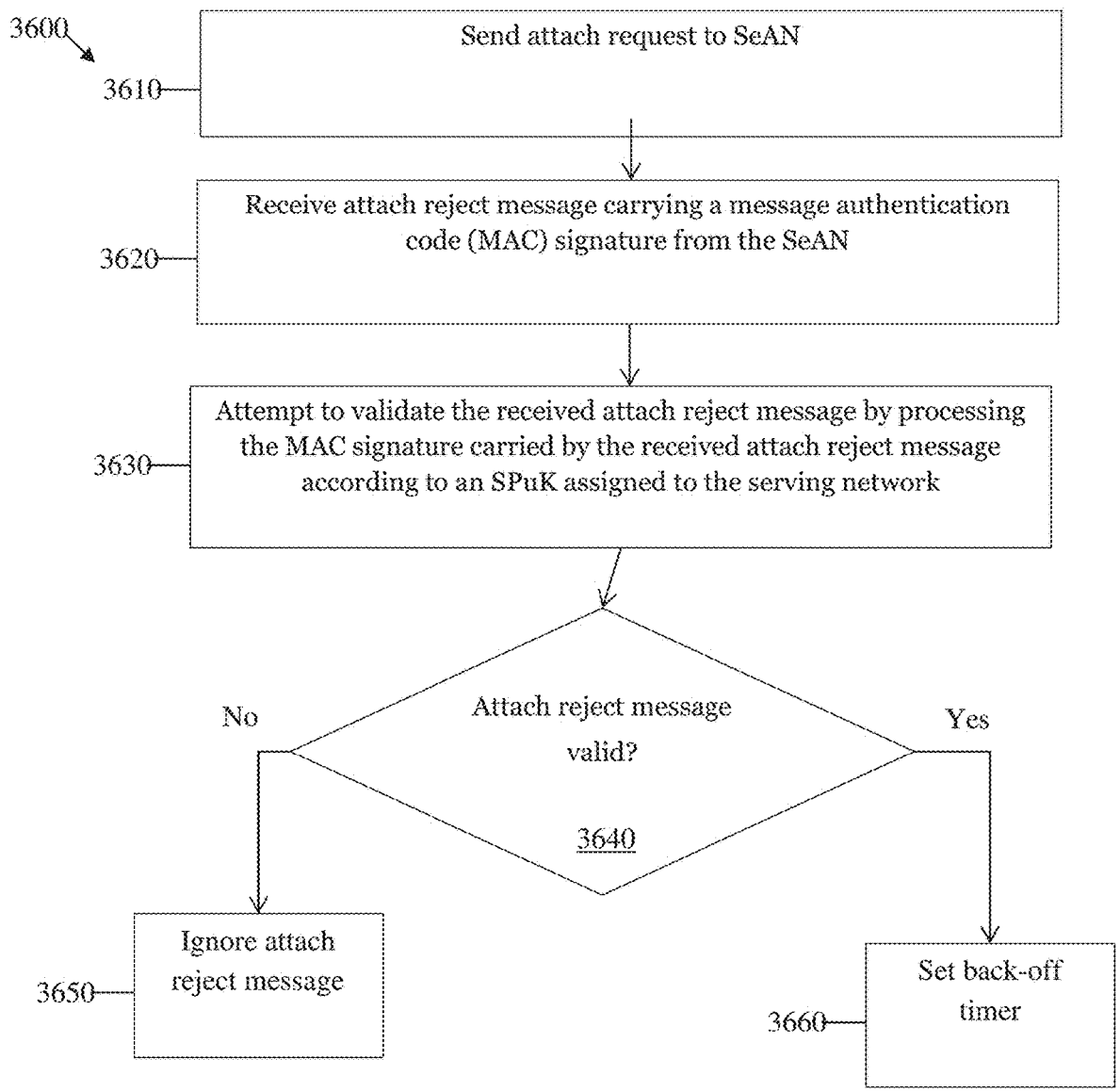
FIG. 36 is a flowchart of an embodiment method for processing attach reject messages.

FIG. 36 is a flowchart of an embodiment method 3600 for validating attach reject messages, as may be performed by a UE. At step 3610, the UE sends an attach request to an SeAN. At step 3620, the UE receives an attach reject message carrying a message authentication code (MAC) signature from the SeAN. At step 3630, the UE attempts to validate the received attach reject message by processing the MAC signature carried by the received attach reject message according to an SPuK assigned to the serving network. If the UE determines that the attach reject message is invalid at step 3640, then the UE ignores the attach reject message at 3650. Alternatively, if the UE determines that the attach reject message is valid at step 3640, then the UE sets a backoff timer based on the reject message at step 3660.

A similar technique can be used to verify system information messages received from an SeAN. For example, a UE may receive a system information message carrying its own a MAC signature from an SeAN, and attempt to validate the integrity of the received system information message by processing the MAC signature carried by the received system information message according to the SPuK. If the system information message is deemed invalid, then the UE may ignore the received system information message, as well as not make any attempts to connect, or otherwise refuse to connect, to the device (e.g., Fake base) from which the system information message was received. Alternatively, if the system information message is deemed valid, then the UE may process the system information message accordingly. A system information message may be a message that is broadcast by a base station over a broadcast channel, such as a broadcast control channel (BCCH). A few examples of system information blocks are listed in table 1:

TABLE 1

| LTE system information blocks | Description |
| --- | --- |
| MIB | Carries physical layer information of LTE cell which in turn help receive further SIs, i.e. system bandwidth |

TABLE 1-continued

| LTE system information blocks | Description |
| --- | --- |
| $SIB_1$ | Contains information regarding whether or not UE is allowed to access the LTE cell. It also defines the scheduling of the other SIBs. carries cell ID, MCC, MNC, TAC, SIB mapping. |
| $SIB_2$ | Carries common channel as well as shared channel information. It also carries RRC, uplink power control, preamble power ramping, uplink Cyclic Prefix Length, sub-frame hopping, uplink EARFCN |
| $SIB_3$ | carries cell re-selection information as well as Intra frequency cell re-selection information |
| $SIB_4$ | carries Intra Frequency Neighbors (on same frequency); carries serving cell and neighbor cell frequencies required for cell reselection as well handover between same RAT base stations (GSM BTS1 to GSM BTS2) and different RAT base stations (GSM to WCDMA or GSM to LTE or between WCDMA to LTE etc.). Covers E-UTRA and other RATs as mentioned |
| $SIB_5$ | Carries Inter Frequency Neighbors (on different frequency); carries E-UTRA LTE frequencies, other neighbor cell frequencies from other RATs. The purpose is cell reselection and handover. |
| $SIB_6$ | carries WCDMA neighbors information i.e. carries serving UTRA and neighbor cell frequencies useful for cell re-selection |
| $SIB_7$ | carries GSM neighbours information i.e. Carries GERAN frequencies as well as GERAN neighbor cell frequencies. It is used for cell re-selection as well as handover purpose. |
| SIB8 | carries CDMA-2000 EVDO frequencies, CDMA-2000 neighbor cell frequencies. |
| $SIB_9$ | carries HNBID (Home eNodeB Identifier) |
| $SIB_{10}$ | carries ETWS prim. notification |
| $SIB_{11}$ | carries ETWS sec. notification |

Figure 37:
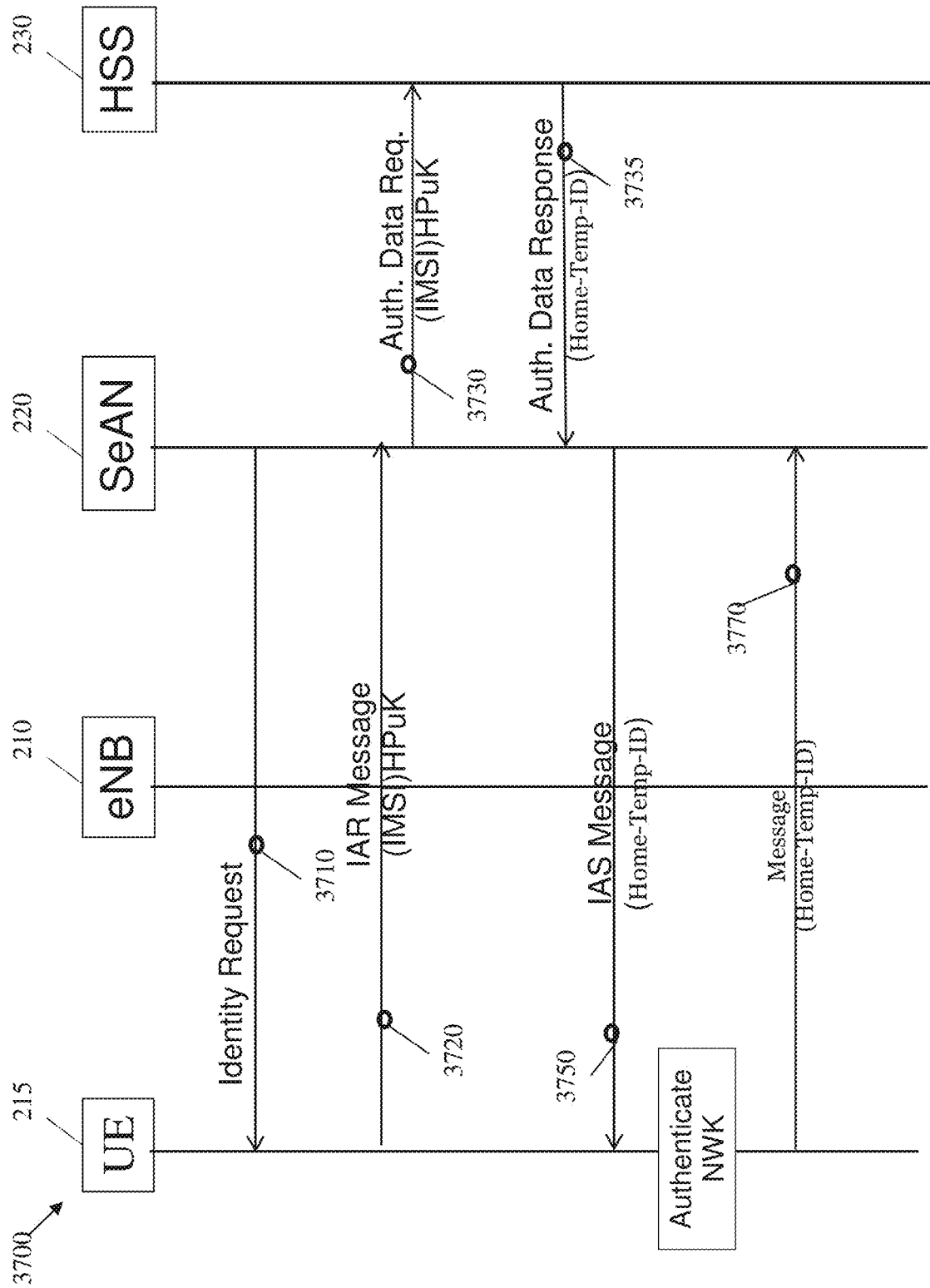
FIG. 37 is a protocol diagram of an embodiment communications sequence for securely transmitting a UE-specific ID to a serving network.

FIG. 37 illustrates a protocol diagram of an embodiment communications sequence 3700 for securely transmitting a UE-specific ID to a serving network. The identity request message 3710, the IAR message 3720, and the authentication and data request message 3730 may be similar to the identity request message 2410, the IAR message 2420, and the authentication and data request message 2430 described in conjunction with FIG. 24.

In some embodiments, the IAR message 3720 further includes a home security policy request indication. The home security policy request indication may be encrypted along with the IMSI and/or other UE specific information using the HPuK.

Upon receiving the authentication and data request message 3730, the HSS 230 decrypts the encrypted IMSI, and assigns a home network temporary ID (Home-Temp-ID) to the UE 215. In embodiments where the IAR message 3720 further includes a home security policy request indication, the HSS 230 also selects or assigns a home network security policy to the UE 215, which may indicate a recommendation as to how often non-access stratum (NAS) or access stratum (AS) security keys should be updated between the UE 215 and the SeAN 220. Thereafter, the HSS 230 sends an authentication and data response message 3735 that includes the Home-Temp-ID to the SeAN 220. The authentication and data response message 3735 may also include the home network security policy, as well as some or all of the information carried by the corresponding authentication and data response message 2435 described in conjunction with FIG. 24.

Upon receiving the authentication and data response message 3735, the SeAN 220 sends an IAS message 3750 that includes the Home-Temp-ID and, in some embodiments, the home network (HN_Sec_Pol). In some embodiments, the Home-Temp-ID and/or the home network security policy are encrypted using an encryption key, such as a KIASenc. It should be appreciate that the IAS message 3750 may include some or all of the additional information and/or layers of encryption/integrity protection included in the IAS message 2450 described in conjunction with FIG. 24.

Upon receiving the IAS message 2450, the UE 215 may authenticate the serving network, and send a message 3770 that includes the Home-Temp-ID to the SeAN 220. In one embodiment, the message 3770 is an attach request message. In another embodiment, the message 3770 is a security and authentication complete message, in which case the message 3770 may include all or some of the information and/or additional layers of encryption/integrity protection included in the corresponding security and authentication complete message 2400 described in conjunction with FIG. 24.

Figure 38:
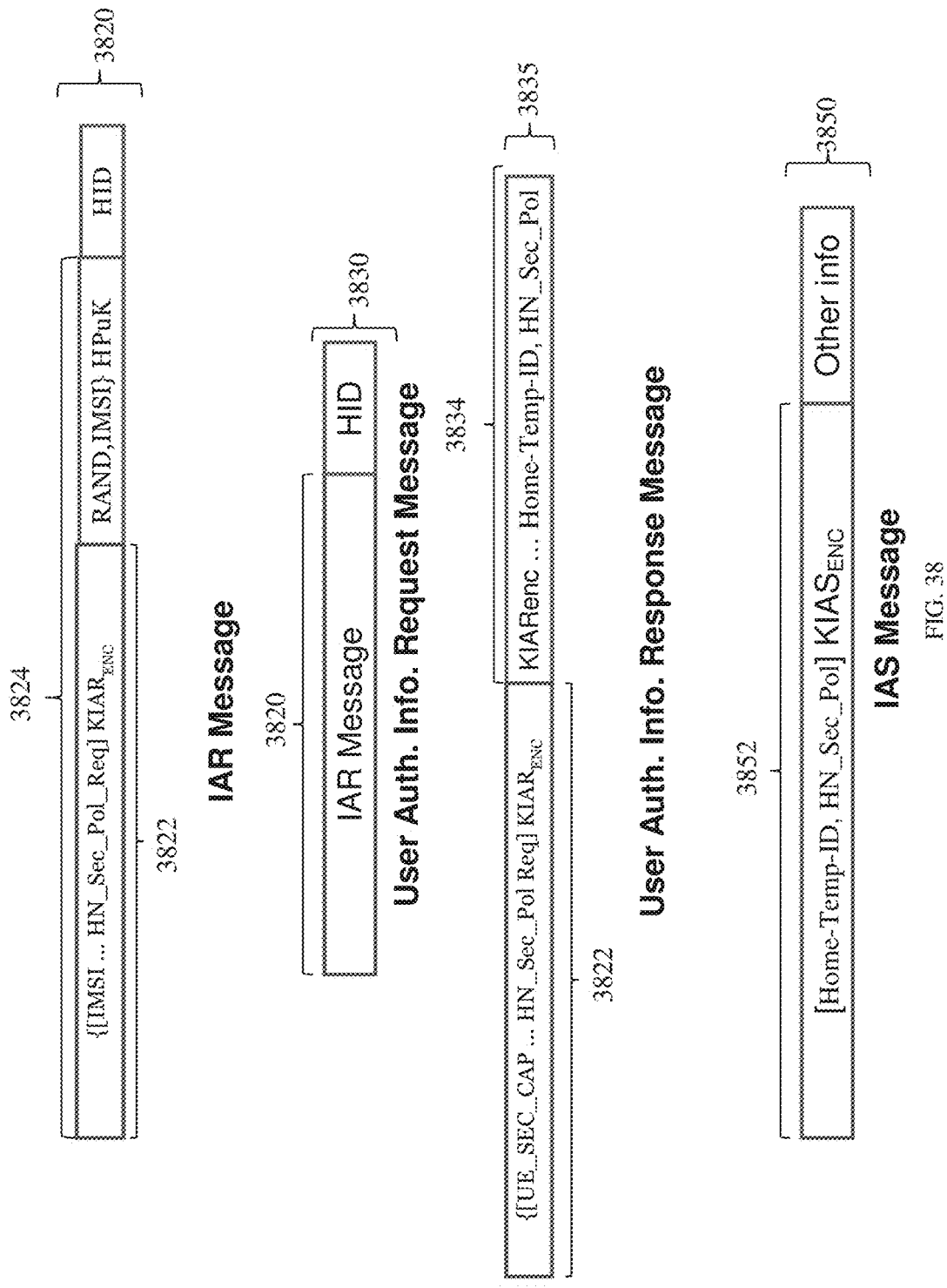
FIG. 38 is a diagram of embodiment frame formats for messages communicated in FIG. 37.

FIG. 38 illustrates frame formats for an embodiment IAR message 3820, an embodiment authentication and data request message 3830, an embodiment authentication and data response message 3835, and an embodiment IAS message 3850.

The embodiment IAR message 3820 corresponds to the IAR message 3780 sent from the UE 215 to the SeAN 220. In this example, the embodiment IAR message 3820 includes an encrypted inner portion 3822, an encrypted outer portion 3824, and an SID. The encrypted inner portion 3822 is formed by encrypting an IMSI assigned to the UE 215 and a home network security policy request (HN_Sec_Pol_Req) indication using a $KIAR_{ENC}$. It should be appreciated that other information may also be encrypted along with the IMSI and the HN_Sec_Pol_Req indication when forming the encrypted inner portion 3822, including all or some of the information in the respective encrypted inner portions 1222, 1822 described in conjunction with FIGS. 12 and 18. The encrypted outer portion 3824 may be generated in a similar fashion and/or include some or all of the information in the respective encrypted outer portions 1224, 1824 described in conjunction with FIGS. 12 and 18.

The embodiment authentication and data request message 3830 corresponds to the authentication and data request message 3730 sent from the SeAN 220 to the HSS 230. As shown, the embodiment authentication and data request message 3830 includes the IAR message 3820, as well as an HID.

The embodiment authentication and data response message 3835 corresponds to the authentication and data response message 3735 sent from the HSS 230 to the SeAN 220. As shown, the authentication and data response message 3835 includes the encrypted inner portion 3822 carried by the IAR message 3820, as well additional information 3834 such as a $KIAS_{ENC}$, a Home-TEMP-ID, and an HN_Sec_Pol.

The embodiment IAS message 3850 corresponds to the IAS message 3750 sent from the SeAN 220 to the UE 215. As shown, the IAS message 3850 includes an encrypted portion 3852, which is formed by encrypting the home-temp-ID and the HN_Sec_Pol using a KIASenc. It should be appreciated that other information may also be encrypted along with the home-temp-ID and the HN_Sec_Pol when forming the encrypted portion 3852, including some or all of the information in the respective encrypted portions 1252, 1852 described in conjunction with FIGS. 12 and 18. Additionally, the embodiment IAS message 3850 may include additional, non-encrypted information, including some or all of the information carried outside the encrypted portions 1252, 1852 of the IAS messages 1250, 1850 described in conjunction with FIGS. 12 and 18.

Figure 39:
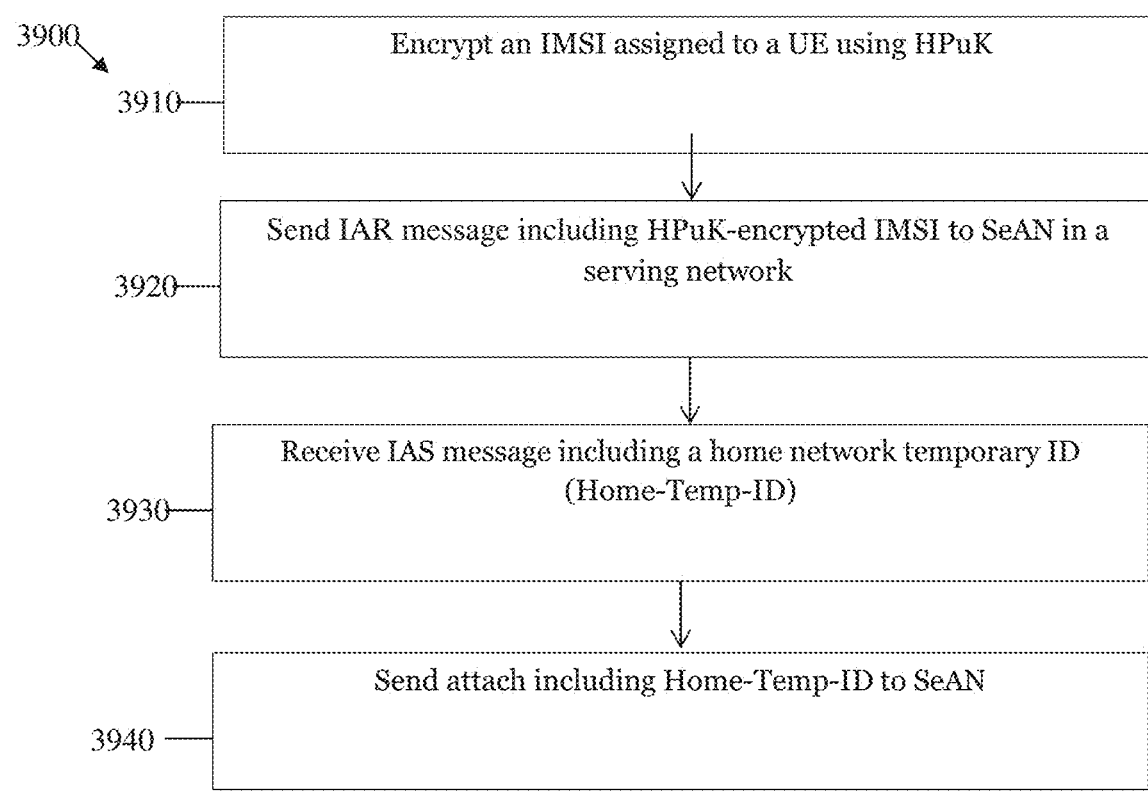
FIG. 39 is a flowchart of an embodiment method for securely transmitting a UE-specific ID to a serving network.

FIG. 39 is a flowchart of an embodiment method 3900 for securely transmitting a UE-specific ID to a serving network, as may be performed by a UE. At step 3910, the UE encrypts an IMSI assigned to a UE using HPuK. At step 3110, the UE sends an IAR message that includes the HPuK-encrypted IMSI to an SeAN in a serving network. At step 3930, the UE receives an IAS message including a home network temporary ID (Home-Temp-ID). At step 3940, the UE sends an attach request to the SeAN that includes the Home-Temp_ID. message that includes the $K_{IMSIenc}$-encrypted IMSI or the $K_{IMSIint}$-signed hash of the IMSI to the SeAN.

Figure 40:
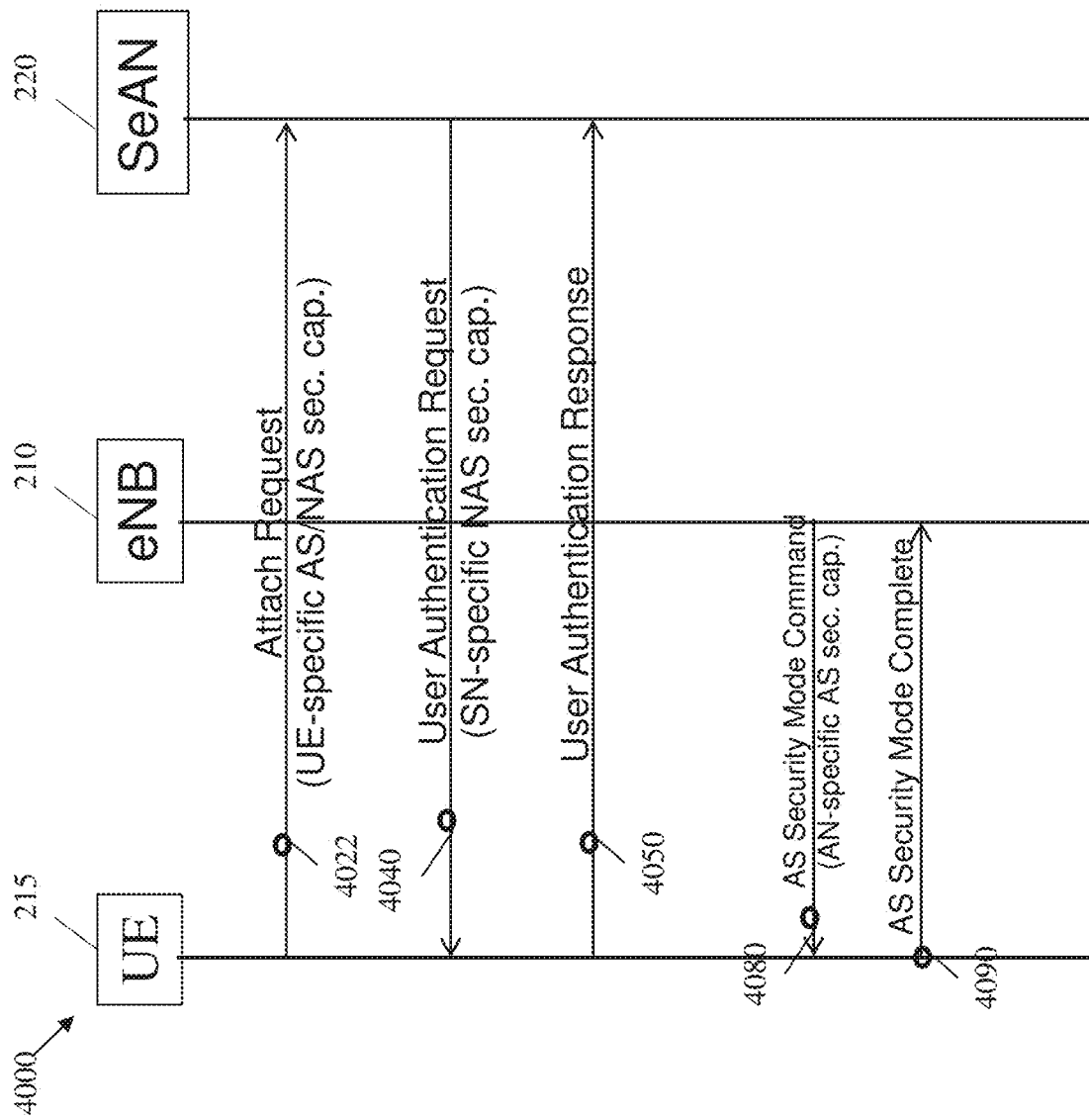
FIG. 40 is a protocol diagram of an embodiment communications sequence for securely negotiating NAS and/or AS layer security parameters.

Embodiments of this disclosure provide techniques for facilitating NAS and/or AS layer security negotiation between UEs and the serving network. FIG. 40 illustrates a protocol diagram of an embodiment communications sequence 4000 for securely negotiating NAS and/or AS layer security parameters. In this example, the UE 215 transmits an attach request 4022 to the SeAN 220 that includes UE-specific AS layer security capabilities (e.g., AS ciphering algorithms supported by the UE 215) and/or UE-specific NAS layer security capabilities (e.g., NAS ciphering algorithms supported by the UE 215). The SeAN 220 responds by sending a User Authentication Request 4040 that includes SN-specific NAS layer security capabilities to the UE 215 (e.g., NAS ciphering algorithms supported by the UE 215). In some embodiments, the User Authentication Request 4040 also includes access network specific (AN-specific) AS layer security capabilities, such as, inter alia, agreed upon encryption and/or integrity protection algorithms. The UE 215 then generates a NAS layer encryption key and a NAS layer integrity protection key based on the SN-specific NAS layer security capabilities. The NAS layer encryption key may then be used to encrypt contents of the NAS security mode complete message 4070, and the NAS layer integrity protection key may be used to generate a MAC signature of the contents of the NAS security mode complete message 4070, prior to the UE 215 sending the NAS security mode complete message 4070 to the SeAN 220. The SeAN 220 may independently generate the NAS layer encryption key and the NAS layer integrity protection key, and use those independently generated keys to decrypt and validate the NAS security mode complete message 4070.

Additionally, the UE 215 may receive an access stratum (AS) security mode command 4080 from the base station 210 that includes access network specific (AN-specific) AS layer security capabilities (e.g., AS ciphering algorithms supported by the base station 210). If the AN-specific AS layer security capabilities were included in the user authentication request 4040, then the AS security mode command 4080 may not be communicated, or may be communicated without the AN-specific AS layer security capabilities. The UE 215 then generates an AS layer encryption key and an AS layer integrity protection key based on the AN-specific AS layer security capabilities. Similar to the NAS layer keys, the AS layer encryption key may then be used to encrypt contents of the AS security mode complete message 4090, and the AS layer integrity protection key may be used to generate a MAC signature of the contents of the AS security mode complete message 4090, prior to the UE 215 sending the AS security mode complete message 4090 to the base station 220. Similar to the SeAN 220, the base station 210 may independently generate the AS layer encryption key and the AS layer integrity protection key, and use those independently generated keys to decrypt and validate the AS security mode complete message 4090.

Figure 41:
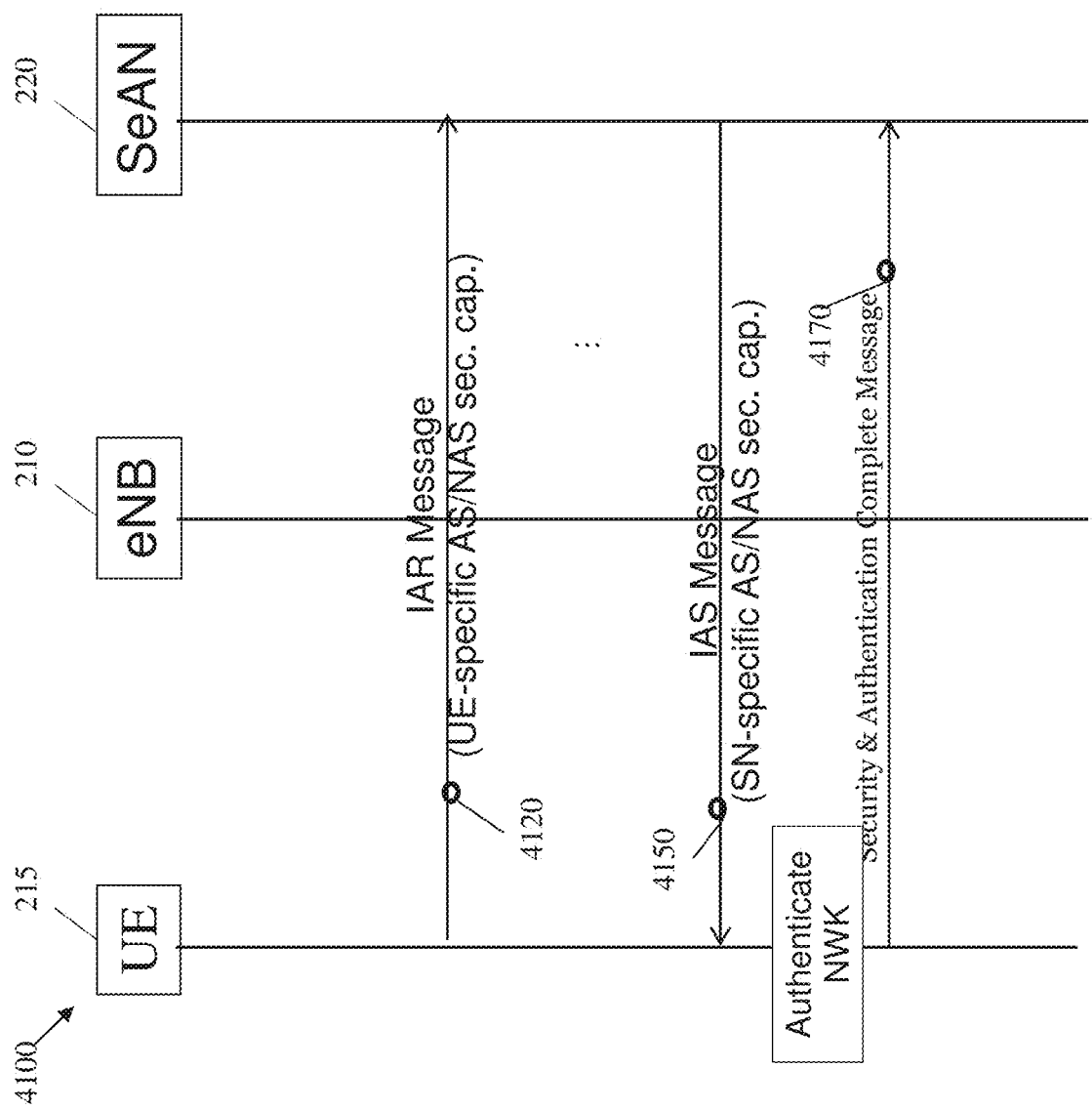
FIG. 41 is a protocol diagram of another embodiment communications sequence for securely negotiating NAS layer security parameters.

FIG. 41 illustrates a protocol diagram of an embodiment communications sequence 4100 for securely negotiating NAS layer security parameters. In this example, the UE 215 transmits an IAR message 4120 to the SeAN 220 that includes UE-specific AS layer security capabilities and/or UE-specific NAS layer security capabilities. The SeAN 220 responds by sending an IAS message 4150 that includes SN-specific NAS layer security capabilities to the UE 215. The IAS message 4150 may also include SN-specific AS layer security capabilities. The UE 215 then generates a NAS layer encryption key and a NAS layer integrity protection key based on the SN-specific NAS layer security capabilities. The NAS layer encryption key may then be used to encrypt contents of the security and authentication complete message 4170, and the NAS layer integrity protection key may be used to generate a MAC signature of the contents of the security and authentication complete message 4170, prior to the UE 215 sending the security and authentication complete message 4170 to the SeAN 220. The SeAN 220 may independently generate the NAS layer encryption key and the NAS layer integrity protection key, and use those independently generated keys to decrypt and validate the security and authentication complete message 4170. When the IAS message 4150 includes SN-specific AS layer security capabilities, the UE 215 may generate an AS layer encryption key and an AS layer integrity protection key based on the AN-specific AS layer security capabilities, which may be used to encrypt, as well as provide integrity protection for (e.g., compute MAC signatures, etc.), wireless transmissions between the UE 215 and the base station 210.

Figure 42:
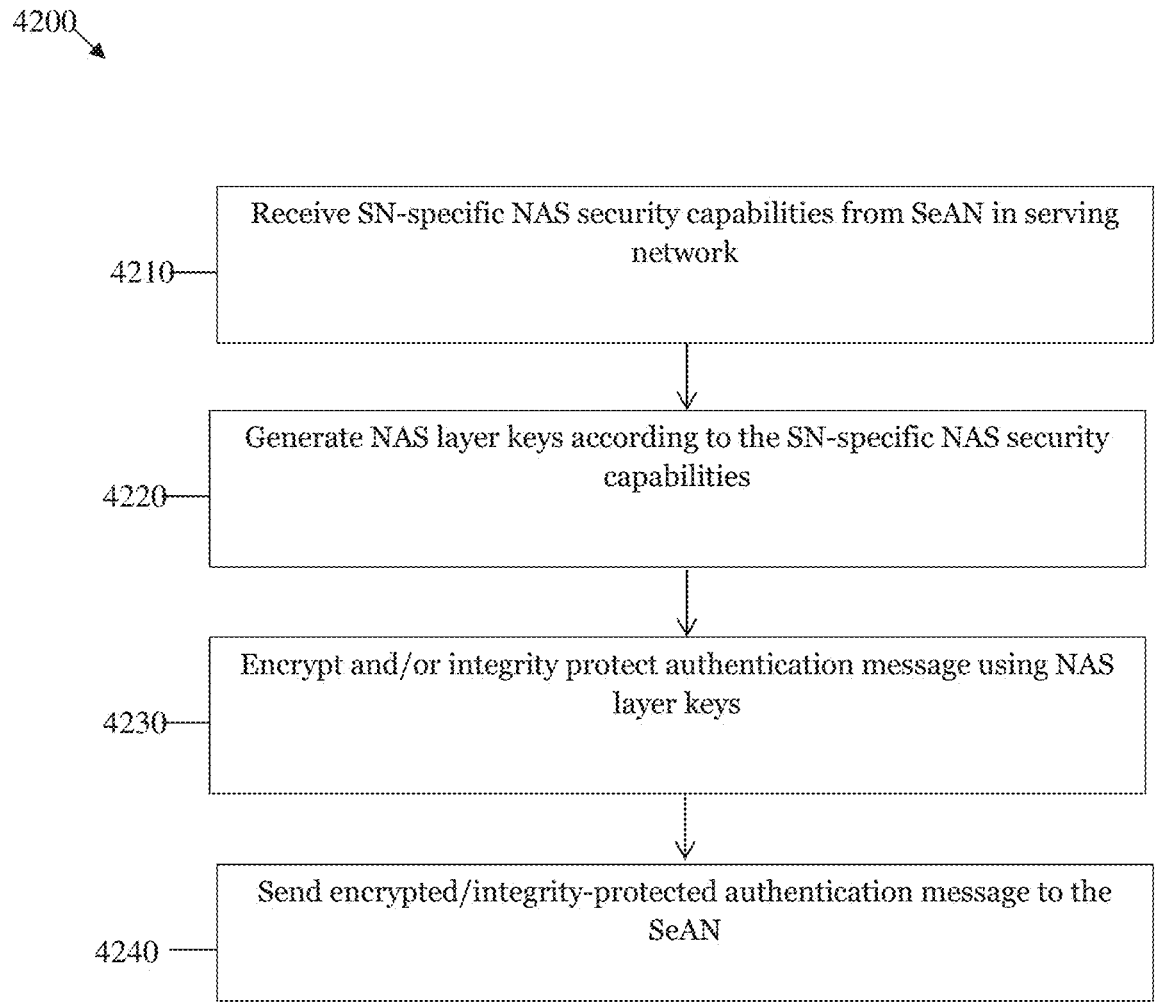
FIG. 42 is a flowchart of an embodiment method for NAS layer security parameter negotiation.

FIG. 42 is a flowchart of an embodiment method 4200 for NAS layer security parameter negotiation, as may be performed by a UE. At step 4210, the UE receives SN-specific NAS security capabilities from an SeAN in a serving network. At step 4220, the UE generates NAS layer keys according to the SN-specific NAS security capabilities. At step 4230, the UE encrypts and/or integrity protects an authentication message using the NAS layer keys. At step 4240, the UE sends the encrypted/integrity-protected authentication message to the SeAN.

Figure 43:
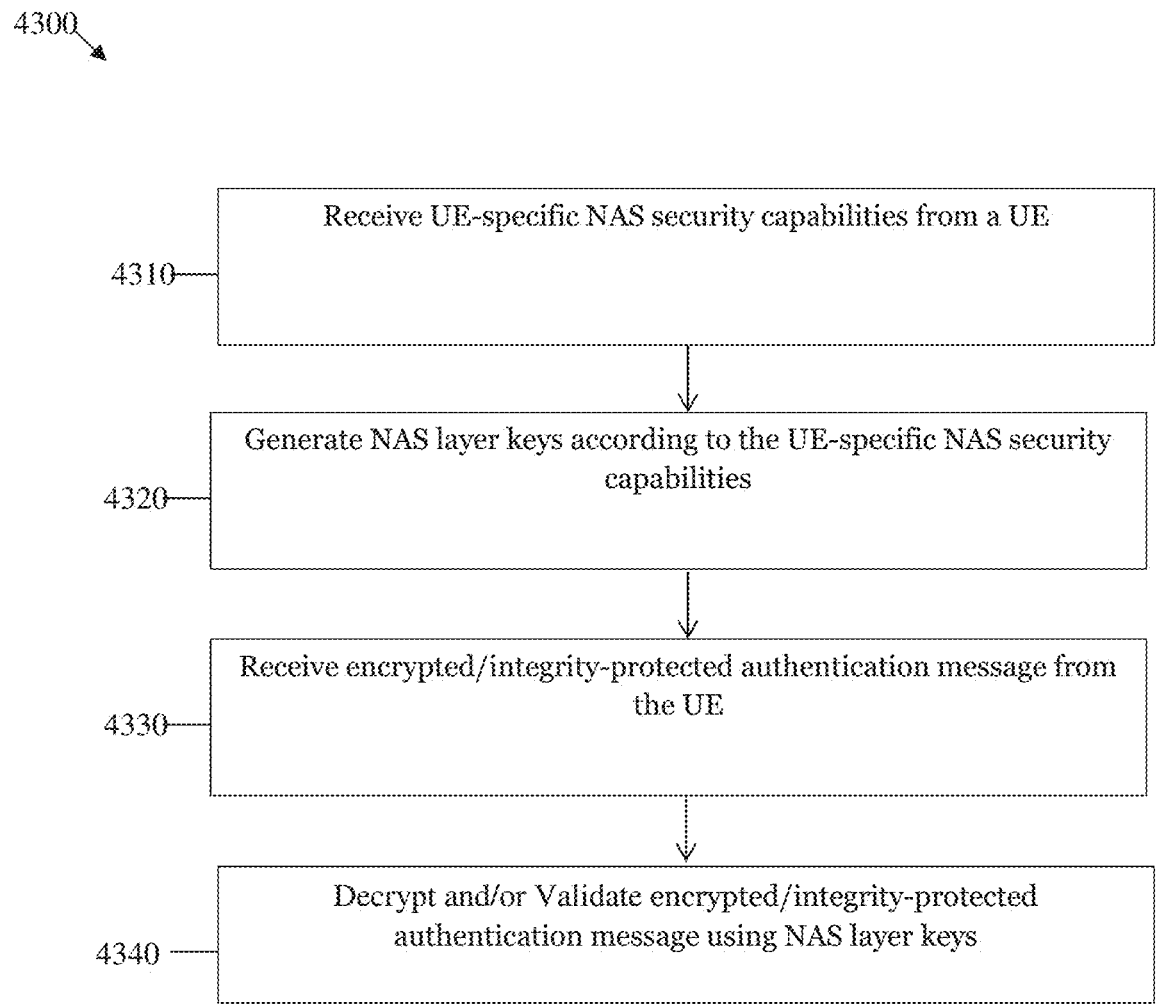
FIG. 43 is a flowchart of another embodiment method for NAS layer security parameter negotiation.

FIG. 43 is a diagram of an embodiment method 4300 for NAS layer security parameter negotiation, as may be performed by an SeAN. At step 4310, the SeAN receives UE-specific NAS security capabilities from a UE. At step 4320, the SeAN generates NAS layer keys according to the UE-specific NAS security capabilities. At step 4330, the SeAN receives an encrypted/integrity-protected authentication message from the UE. At step 4340, the SeAN decrypts the encrypted/integrity-protected authentication message using the NAS layer keys.

Figure 44:
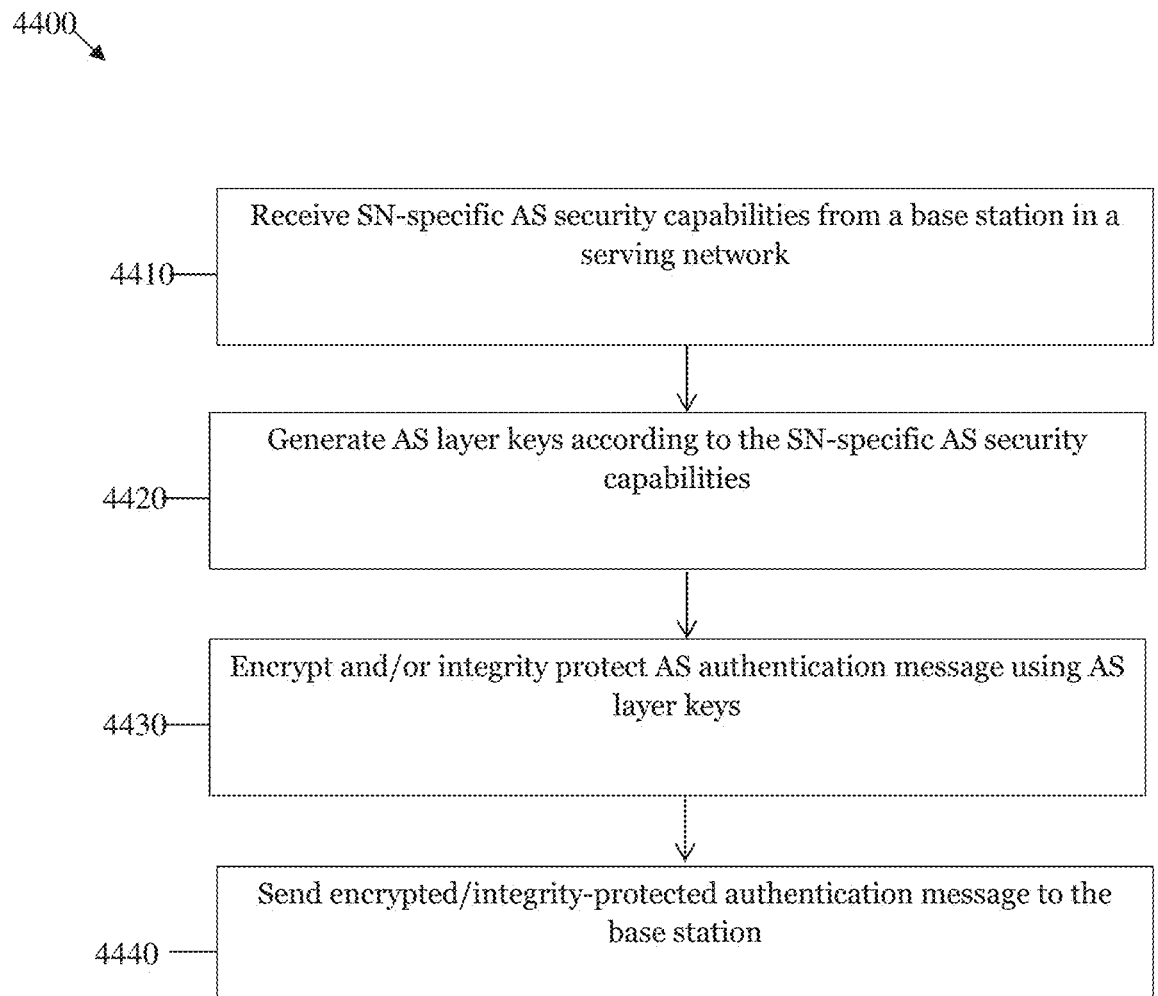
FIG. 44 is a flowchart of an embodiment method for AS layer security parameter negotiation.

FIG. 44 is a diagram of an embodiment method 4400 for NAS layer security parameter negotiation, as may be performed by a UE. At step 4410, the UE receives SN-specific AS security capabilities from a base station in a serving network. At step 4420, the UE generates AS layer keys according to the SN-specific AS security capabilities. At step 4430, the UE encrypts and/or integrity protects an authentication message using the AS layer keys. At step 4440, the UE sends the encrypted/integrity-protected authentication message to the base station.

Figure 45:
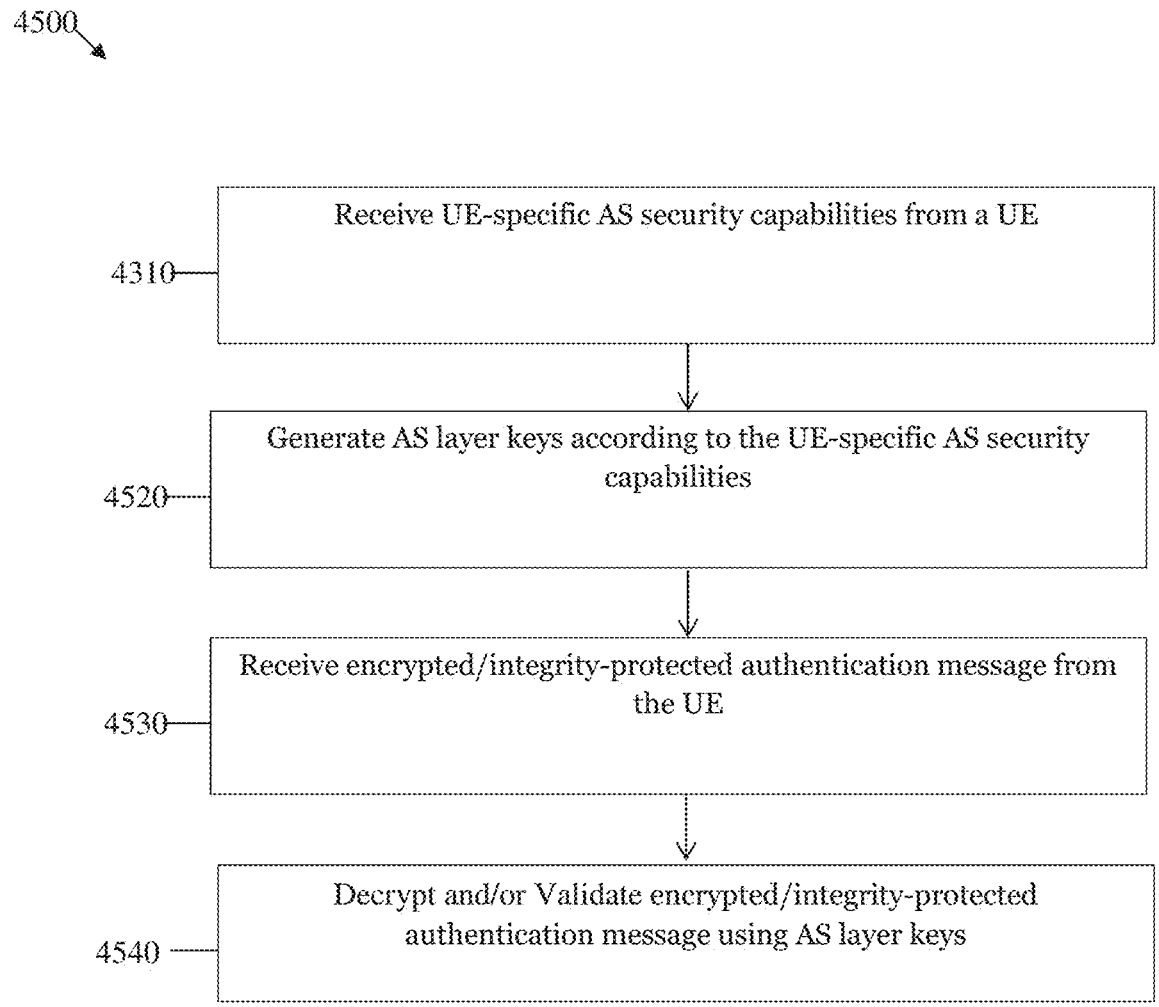
FIG. 45 is a flowchart of another embodiment method for AS layer security parameter negotiation.

FIG. 45 is a diagram of an embodiment method 4500 for NAS layer security parameter negotiation, as may be performed by a base station. At step 4510, the base station receives UE-specific AS security capabilities from either the UE or an SeAN. At step 4520, the base station generates AS layer keys according to the UE-specific AS security capabilities. At step 4530, the base station receives an encrypted/integrity-protected authentication message from the UE. At step 4540, the base station decrypts the encrypted/integrity-protected authentication message using the AS layer keys.

Figure 46:
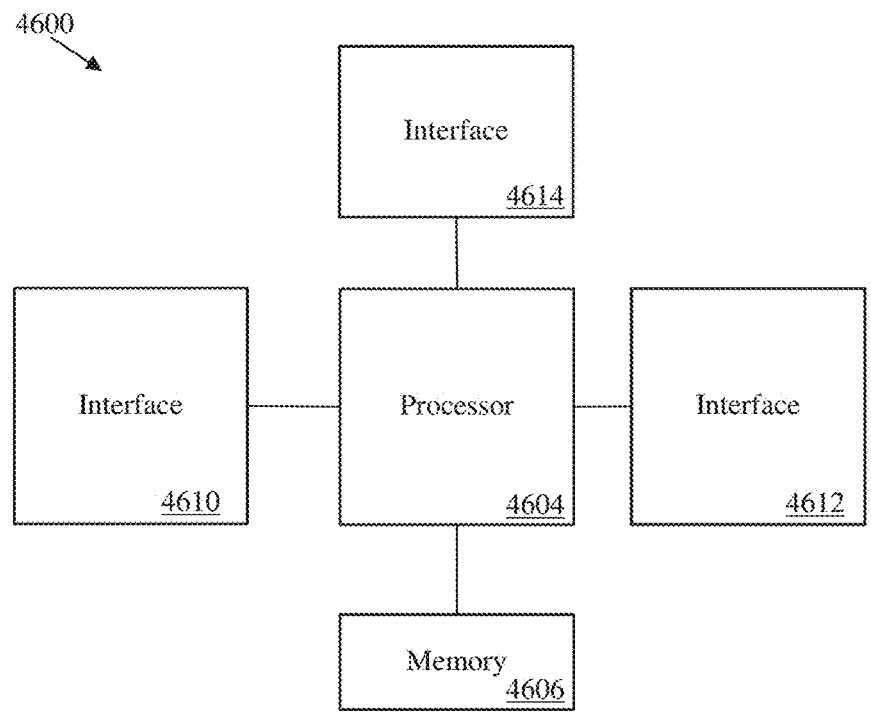
FIG. 46 is a diagram of an embodiment processing system.

FIG. 46 illustrates a block diagram of an embodiment processing system 4600 for performing methods described herein, which may be installed in a host device. As shown, the processing system 4600 includes a processor 4604, a memory 4606, and interfaces 4610-4614, which may (or may not) be arranged as shown in FIG. 46. The processor 4604 may be any component or collection of components adapted to perform computations and/or other processing related tasks, and the memory 4606 may be any component or collection of components adapted to store programming and/or instructions for execution by the processor 4604. In an embodiment, the memory 4606 includes a non-transitory computer readable medium. The interfaces 4610, 4612, 4614 may be any component or collection of components that allow the processing system 4600 to communicate with other devices/components and/or a user. For example, one or more of the interfaces 4610, 4612, 4614 may be adapted to communicate data, control, or management messages from the processor 4604 to applications installed on the host device and/or a remote device. As another example, one or more of the interfaces 4610, 4612, 4614 may be adapted to allow a user or user device (e.g., personal computer (PC), etc.) to interact/communicate with the processing system 4600. The processing system 4600 may include additional components not depicted in FIG. 46, such as long term storage (e.g., non-volatile memory, etc.).

In some embodiments, the processing system 4600 is included in a network device that is accessing, or part otherwise of, a telecommunications network. In one example, the processing system 4600 is in a network-side device in a wireless or wireline telecommunications network, such as a base station, a relay station, a scheduler, a controller, a gateway, a router, an applications server, or any other device in the telecommunications network. In other embodiments, the processing system 4600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 47:
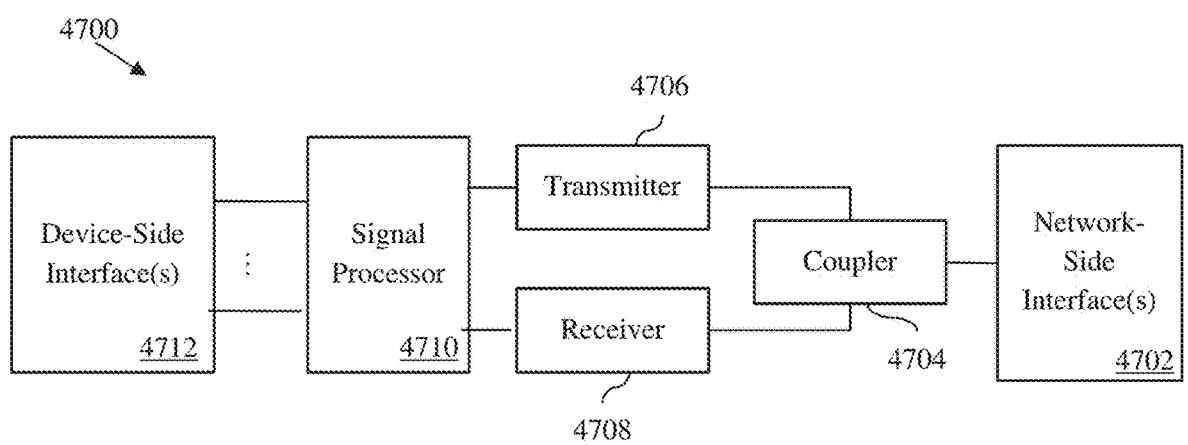
FIG. 47 is a diagram of an embodiment transceiver.

In some embodiments, one or more of the interfaces 4610, 4612, 4614 connects the processing system 4600 to a transceiver adapted to transmit and receive signaling over the telecommunications network. FIG. 47 illustrates a block diagram of a transceiver 4700 adapted to transmit and receive signaling over a telecommunications network. The transceiver 4700 may be installed in a host device. As shown, the transceiver 4700 comprises a network-side interface 4702, a coupler 4704, a transmitter 4706, a receiver 4708, a signal processor 4710, and a device-side interface 4712. The network-side interface 4702 may include any component or collection of components adapted to transmit or receive signaling over a wireless or wireline telecommunications network. The coupler 4704 may include any component or collection of components adapted to facilitate bi-directional communication over the network-side interface 4702. The transmitter 4706 may include any component or collection of components (e.g., up-converter, power amplifier, etc.) adapted to convert a baseband signal into a modulated carrier signal suitable for transmission over the network-side interface 4702. The receiver 4708 may include any component or collection of components (e.g., down-converter, low noise amplifier, etc.) adapted to convert a carrier signal received over the network-side interface 4702 into a baseband signal. The signal processor 4710 may include any component or collection of components adapted to convert a baseband signal into a data signal suitable for communication over the device-side interface(s) 4712, or vice-versa. The device-side interface(s) 4712 may include any component or collection of components adapted to communicate data-signals between the signal processor 4710 and components within the host device (e.g., the processing system 4600, local area network (LAN) ports, etc.).

The transceiver 4700 may transmit and receive signaling over any type of communications medium. In some embodiments, the transceiver 4700 transmits and receives signaling over a wireless medium. For example, the transceiver 4700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 4702 comprises one or more antenna/radiating elements. For example, the network-side interface 4702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 4700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for secure authentication, the method comprising:
sending, by a user equipment (UE), an encrypted International Mobile Subscriber Identity (IMSI) or a hash of the IMSI to a base station in a serving network, the encrypted IMSI or the hash of the IMSI having been generated using an IMSI encryption key ($K_{IMSIenc}$) or an IMSI integrity key ($K_{IMSIint}$) associated with a serving home network, wherein the $K_{IMSIenc}$ or the $K_{IMSIint}$ is derived by the UE based at least in part on a COUNTER received from the base station in the serving network.

2. The method of claim 1, further comprising:
computing, by the UE, a response parameter (RES) based on a pre-provisioned key (K_key) associated with the UE and a random number (RAND); and
sending the RES to the base station in the serving network.

3. The method of claim 1, wherein the $K_{IMSIenc}$ or the $K_{IMSIint}$ is a NAS encryption or integrity key.

4. The method of claim 1, wherein the $K_{IMSIenc}$ or the $K_{IMSIint}$ is further derived based on a shared key.

5. The method of claim 1, wherein the $K_{IMSIenc}$ or the $K_{IMSIint}$ is an IAS encryption or integrity key ($K_{IMSIenc}$).

6. The method of claim 1, wherein the $K_{IMSIenc}$ or the $K_{IMSIint}$ is further derived based on a shared key computed by the UE using at least a public key of the home network and the COUNTER received from the base station in the serving network.

7. The method of claim 1, wherein the $K_{IMSIenc}$ or the $K_{IMSIint}$ is a serving network public key (SPuK).

8. The method of claim 1, wherein the encrypted IMSI or the Hash of the IMSI is sent to the base station in the serving network via an initial authentication-request (IAR) message.

9. The method of claim 1, wherein the encrypted IMSI or the Hash of the IMSI is sent to the base station in the serving network via a user authentication request message.

10. A user equipment (UE) comprising:
a processor; and
a non-transitory computer readable storage medium storing programming for execution by the processor, the programming including instructions to:
send an encrypted International Mobile Subscriber Identity (IMSI) or a hash of the IMSI to a base station in a serving network, the encrypted IMSI or the hash of the IMSI having been generated using an IMSI encryption key ($K_{IMSIenc}$) or an IMSI integrity key ($K_{IMSIint}$) associated with a home network, wherein the $K_{IMSIenc}$ or the $K_{IMSIint}$ is derived by the UE based at least in part on a COUNTER received from the base station in the serving network.

11. The UE of claim 10, wherein the programming further includes instructions to:
compute a response parameter (RES) based on a pre-provisioned key (K_key) associated with the UE and a random number (RAND); and
send the RES to the base station in the serving network.

12. The UE of claim 10, wherein the $K_{IMSIenc}$ or the $K_{IMSIint}$ is a NAS encryption or integrity key.

13. The UE of claim 10, wherein the $K_{IMSIenc}$ or the $K_{IMSIint}$ is further derived based on a shared key.

14. The UE of claim 10, wherein the $K_{IMSIenc}$ or the $K_{IMSIint}$ is an IAS encryption or integrity key ($K_{IASenc}$).

15. The UE of claim 10, wherein the $K_{IMSIenc}$ or the $K_{IMSIint}$ is further derived based on a shared key computed by the UE using at least a public key of the home network and the COUNTER received from the base station in the serving network.

16. The UE of claim 10, wherein the $K_{IMSIenc}$ or the $K_{IMSIint}$ is a serving network public key (SPuK).

17. The UE of claim 10, wherein the encrypted IMSI or the Hash of the IMSI is sent to the base station in the serving network via an initial authentication-request (IAR) message.

18. The UE of claim 10, wherein the encrypted IMSI or the Hash of the IMSI is sent to the base station in the serving network via a user authentication request message.

19. A computer program product comprising a non-transitory computer readable storage medium storing programming, the programming including instructions to:
send an encrypted International Mobile Subscriber Identity (IMSI) or a hash of the IMSI from a user equipment (UE) to a base station in a serving network, the encrypted IMSI or the hash of the IMSI having been generated using an IMSI encryption key ($K_{IMSIenc}$) or an IMSI integrity key ($K_{IMSIint}$) associated with a home network, wherein the $K_{IMSIenc}$ or the $K_{IMSIint}$ is derived by the UE based at least in part on a COUNTER received from the base station in the serving network.

20. The computer program product of claim 19, wherein the programming further includes instructions to:
compute a response parameter (RES) based on a pre-provisioned key (K_key) associated with the UE and a random number (RAND); and
send the RES from the UE to the base station in the serving network.

21. The computer program product of claim 19, wherein the $K_{IMSIenc}$ or the $K_{IMSIint}$ is a NAS encryption or integrity key.

22. The computer program product of claim 19, wherein the $K_{IMSIenc}$ or the $K_{IMSIint}$ is further derived based on a shared key.

23. The computer program product of claim 19, wherein the $K_{IMSIenc}$ or the $K_{IMSIint}$ is an IAS encryption or integrity key ($K_{IASenc}$).

24. The computer program product of claim 19, wherein the $K_{IMSIenc}$ or the $K_{IMSIint}$ is further derived based on a shared key computed by the UE using at least a public key of the home network and the COUNTER received from the base station in the serving network.

25. The computer program product of claim 19, wherein the $K_{IMSIenc}$ or the $K_{IMSIint}$ is a serving network public key (SPuK).

26. The computer program product of claim 19, wherein the encrypted IMSI or the Hash of the IMSI is sent to the base station in the serving network via an initial authentication request (IAR) message.

27. The computer program product of claim 19, wherein the encrypted IMSI or the Hash of the IMSI is sent to the base station in the serving network via a user authentication request message.

* * * * *

UNITED STATES PATENT AND TRADEMARK OFFICE
CERTIFICATE OF CORRECTION

PATENT NO. : 10,873,464 B2
APPLICATION NO. : 15/670964
DATED : December 22, 2020
INVENTOR(S) : Ahmad Shawky Muhanna Page 1 of 1

It is certified that error appears in the above-identified patent and that said Letters Patent is hereby corrected as shown below:

In the Claims

In Column 34, Line 17, Claim 5, delete "($K_{IMSienc}$)" and insert --($K_{IAsenc}$)--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*